US012521008B2

(12) United States Patent
Yousefi et al.

(10) Patent No.: US 12,521,008 B2
(45) Date of Patent: Jan. 13, 2026

(54) OPHTHALMIC SYSTEM, OPHTHALMIC APPARATUS, INFORMATION PROCESSING METHODS, AND PROGRAM

(71) Applicant: DeepEyeVision Inc., Shimotsuke (JP)

(72) Inventors: Siamak Yousefi, Memphis, TN (US); Hidenori Takahashi, Shimotsuke (JP); Hazem Abdelmotaal, Assiut (EG); Rossen Mihaylov Hazarbassanov, São Paulo (BR); Ali H. Al-Timemy, Baghdad (IQ); Alexandru Lavric, Suceava (RO)

(73) Assignee: DeepEyeVision Inc., Shimotsuke (JP)

( * ) Notice: Subject to any disclaimer, the term of this patent is extended or adjusted under 35 U.S.C. 154(b) by 0 days.

(21) Appl. No.: 18/421,592

(22) Filed: Jan. 24, 2024

(65) Prior Publication Data
US 2024/0350002 A1 Oct. 24, 2024

Related U.S. Application Data

(60) Provisional application No. 63/481,526, filed on Jan. 25, 2023.

(51) Int. Cl.
A61B 3/00 (2006.01)
A61B 3/10 (2006.01)
(Continued)

(52) U.S. Cl.
CPC ............ *A61B 3/101* (2013.01); *A61B 3/0025* (2013.01); *A61B 3/14* (2013.01); *G06T 7/0016* (2013.01);
(Continued)

(58) Field of Classification Search
CPC .................. A61B 3/14; G16H 50/20; G16H 2207/20081; G16H 2207/30041; G06T 7/0012
See application file for complete search history.

(56) References Cited

FOREIGN PATENT DOCUMENTS

JP 2021-098043 A 7/2021

OTHER PUBLICATIONS

"Development of a classification system based on corneal biomechanical properties using artificial intelligence predicting keratoconus" by R. Herber et al. Eye and Vision. 8:21, 2021.*
(Continued)

Primary Examiner — Jason M Ip
(74) Attorney, Agent, or Firm — PROCOPIO, CORY, HARGREAVES & SAVITCH LLP

(57) ABSTRACT

An ophthalmic system includes an acquiring unit which acquires a moving image of a subject's eye captured by an imaging apparatus that opposes a subject, an analyzing unit which specifies an analysis object region in the subject's eye based on the moving image and which analyzes a spatial and/or temporal distribution of information related to characteristics of a surface of the subject's eye in the analysis object region, an assessing unit which assesses a possibility of the subject's eye being affected by a predetermined ophthalmic disease based on the distribution of information related to the characteristics and which generates a classification result of classifying the subject's eye into a predetermined classification group related to the affection of the ophthalmic disease in accordance with a degree of the possibility, and a diagnosis support information generating unit which generates diagnosis support information.

10 Claims, 45 Drawing Sheets

(51) Int. Cl.
*A61B 3/14* (2006.01)
*G06T 7/00* (2017.01)
*G16H 50/20* (2018.01)

(52) U.S. Cl.
CPC ... *G16H 50/20* (2018.01); *G06T 2207/10016* (2013.01); *G06T 2207/20021* (2013.01); *G06T 2207/20081* (2013.01); *G06T 2207/30041* (2013.01)

(56) References Cited

OTHER PUBLICATIONS

"Automated classification od dry eye type analyzing interference fringe color images of tear film using machine learning techniques" by K. Yabusaki et al. J Modeling Ophthal. 3:28-35, 2019.*

* cited by examiner

FIG.16A
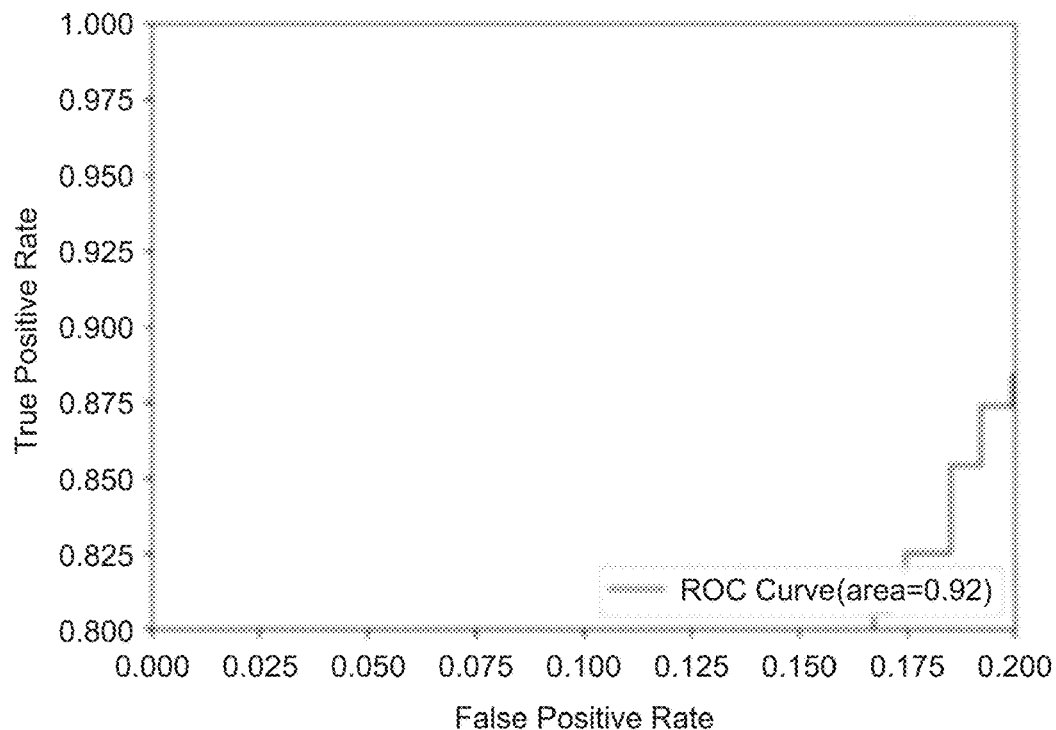
Zoomed-in view of the upper left corner of the ROC curve graph (InceptionV3)
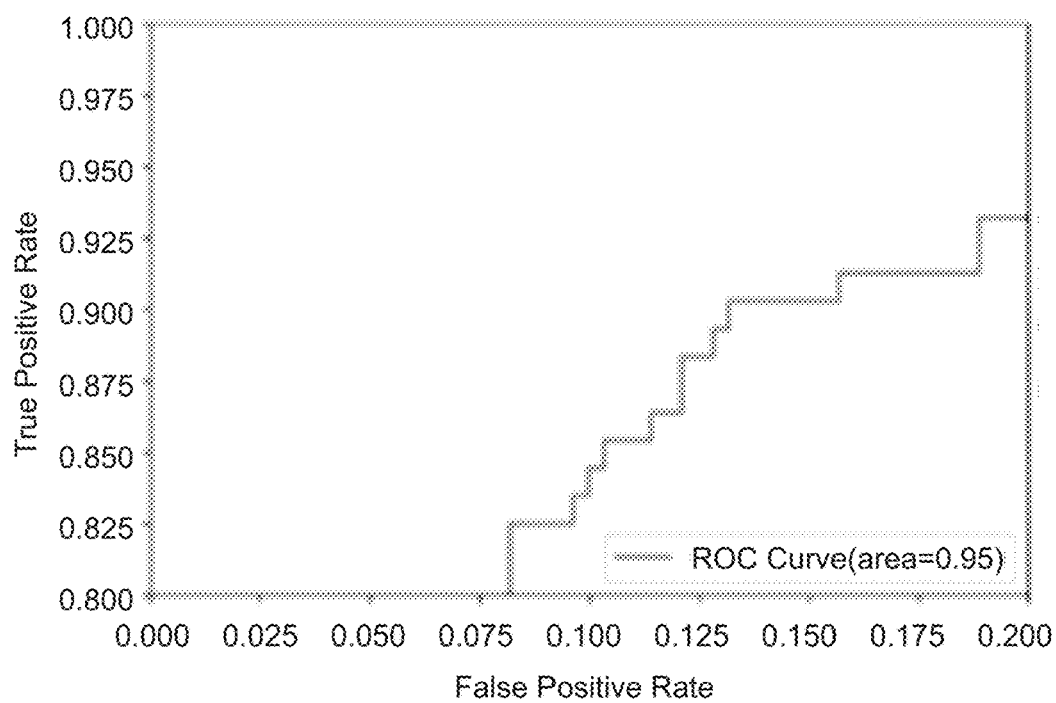
Zoomed-in view of the upper left corner of the ROC curve graph (DenseNet121)

FIG.16B
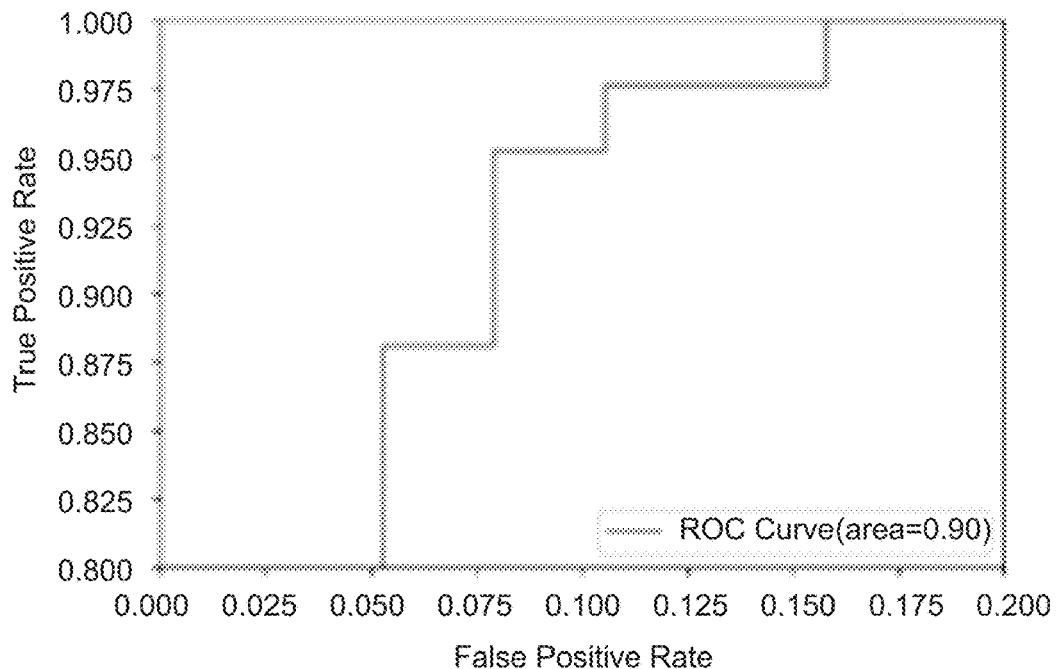
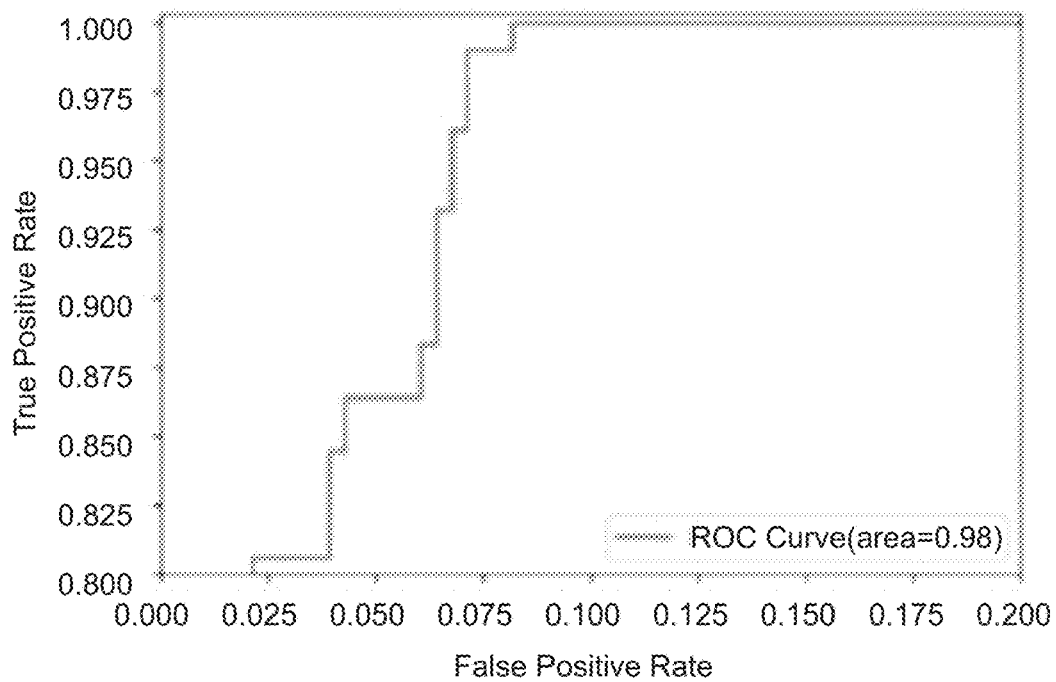

FIG.24A
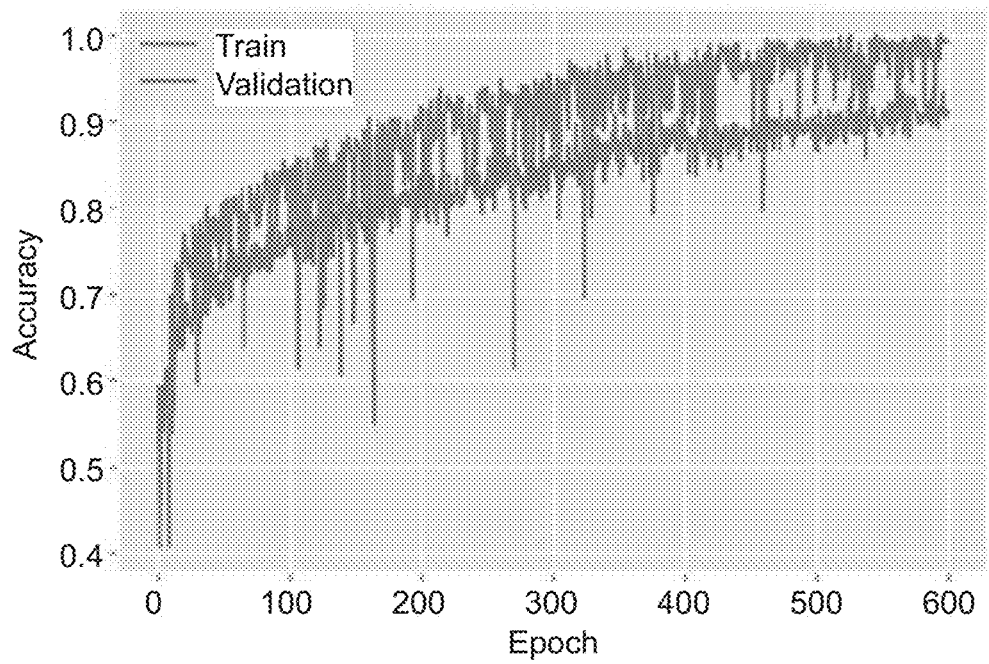
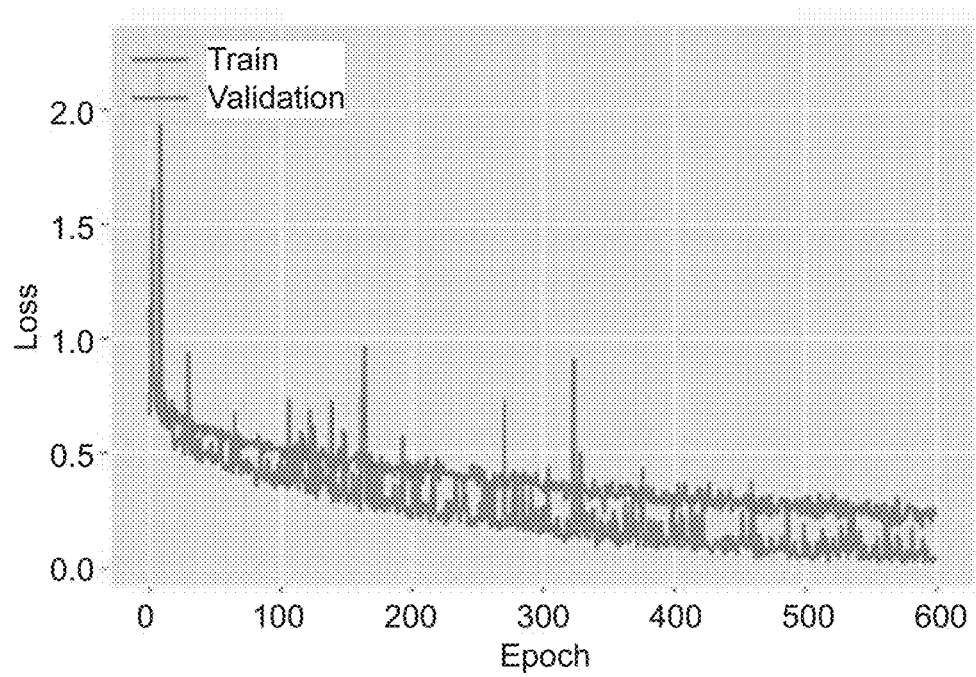

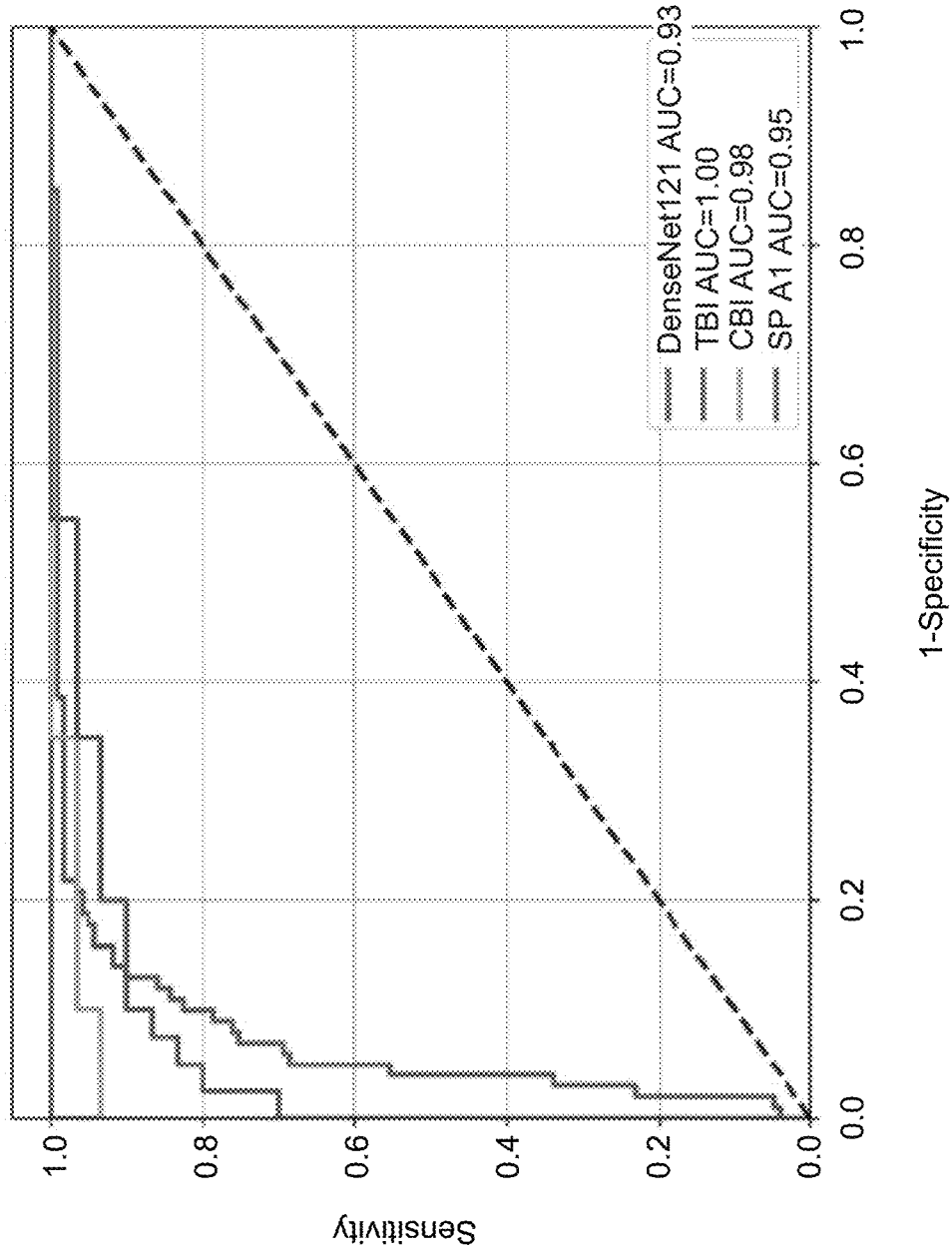

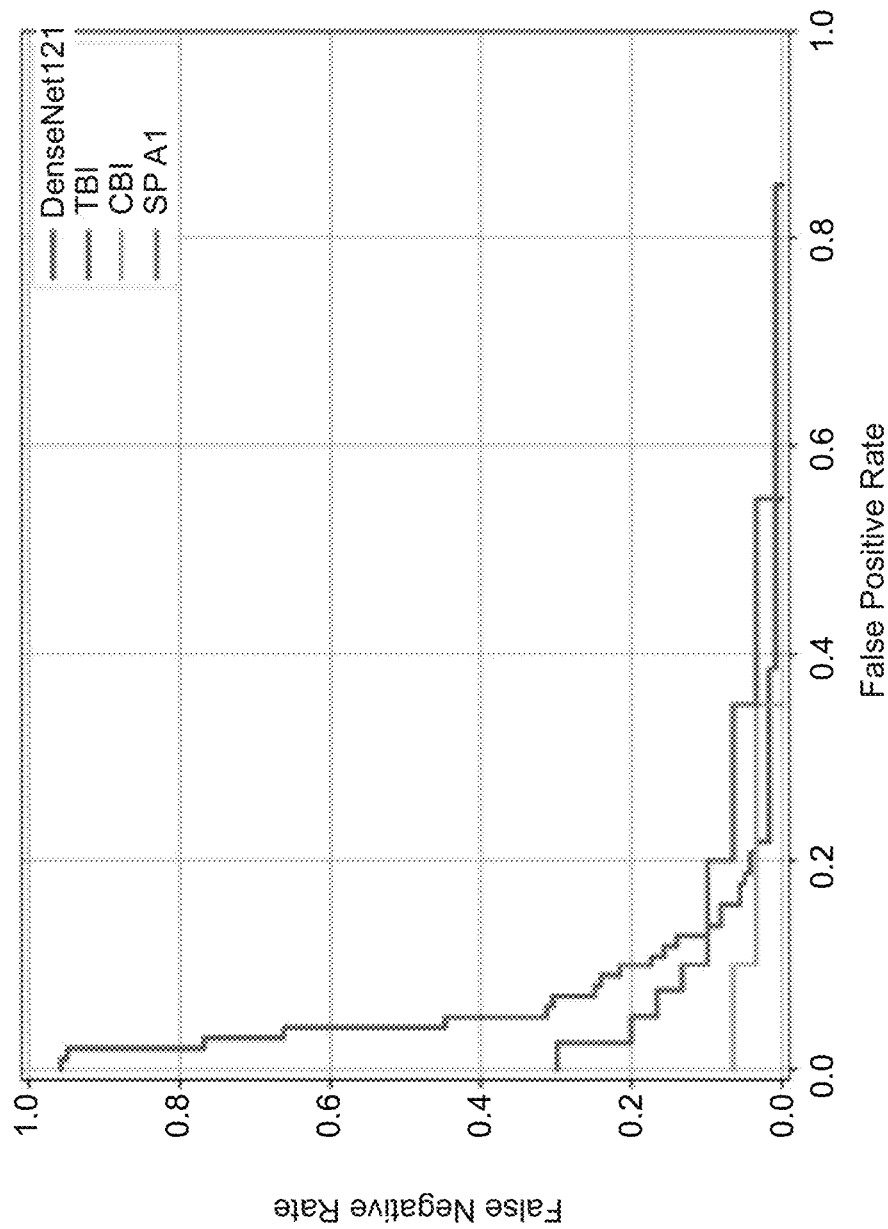

FIG. 28B
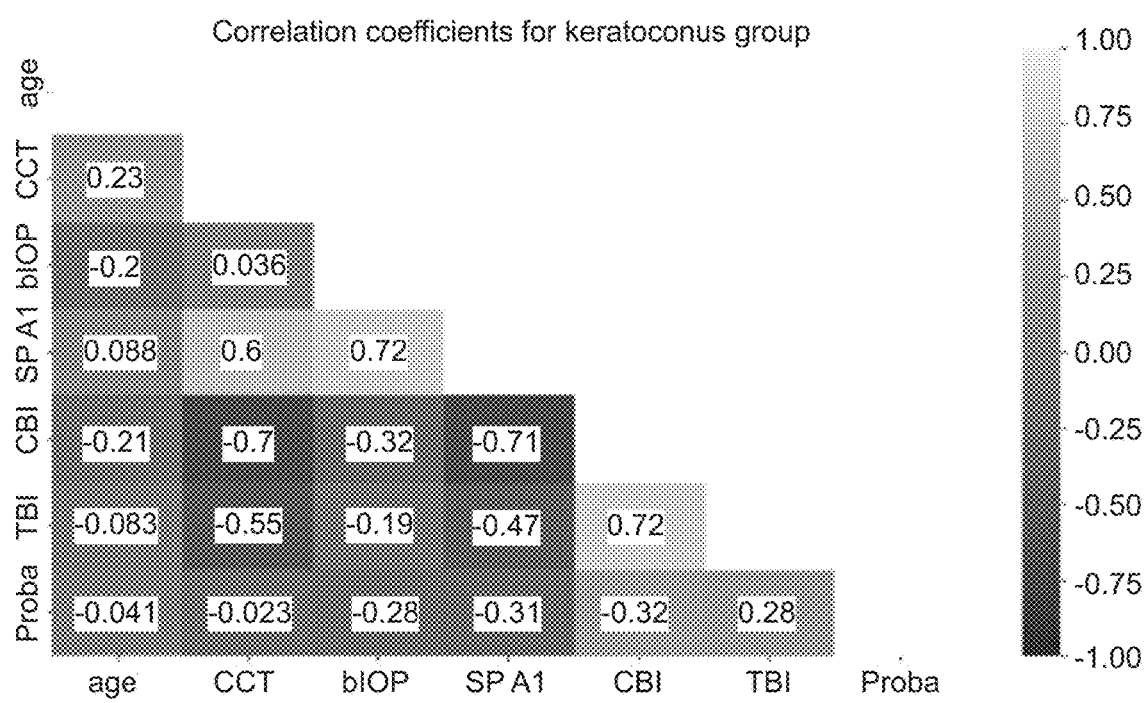
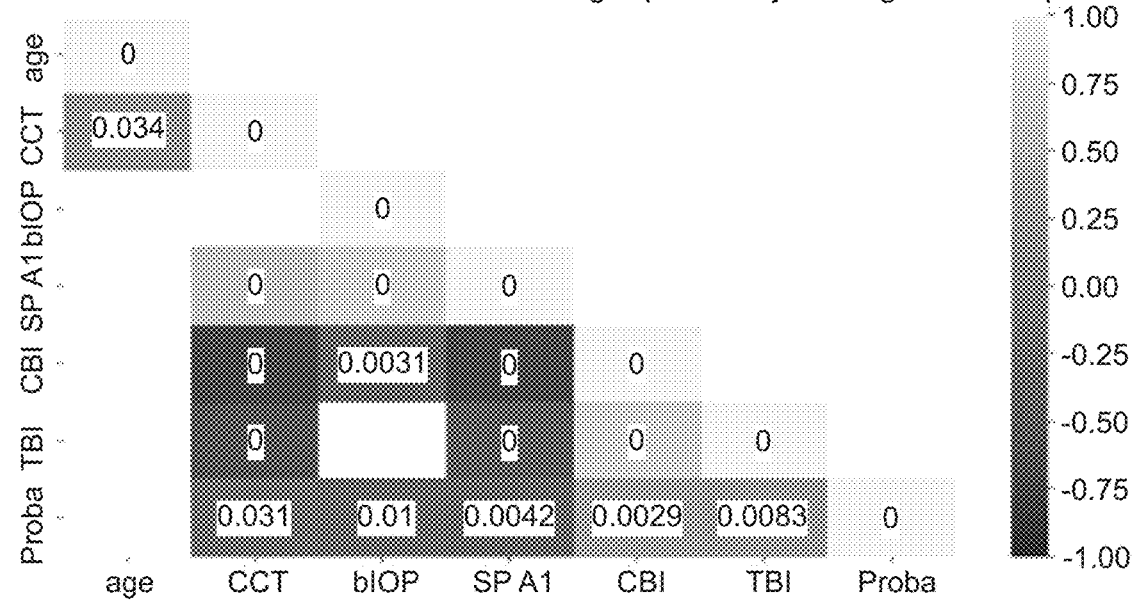

FIG. 29
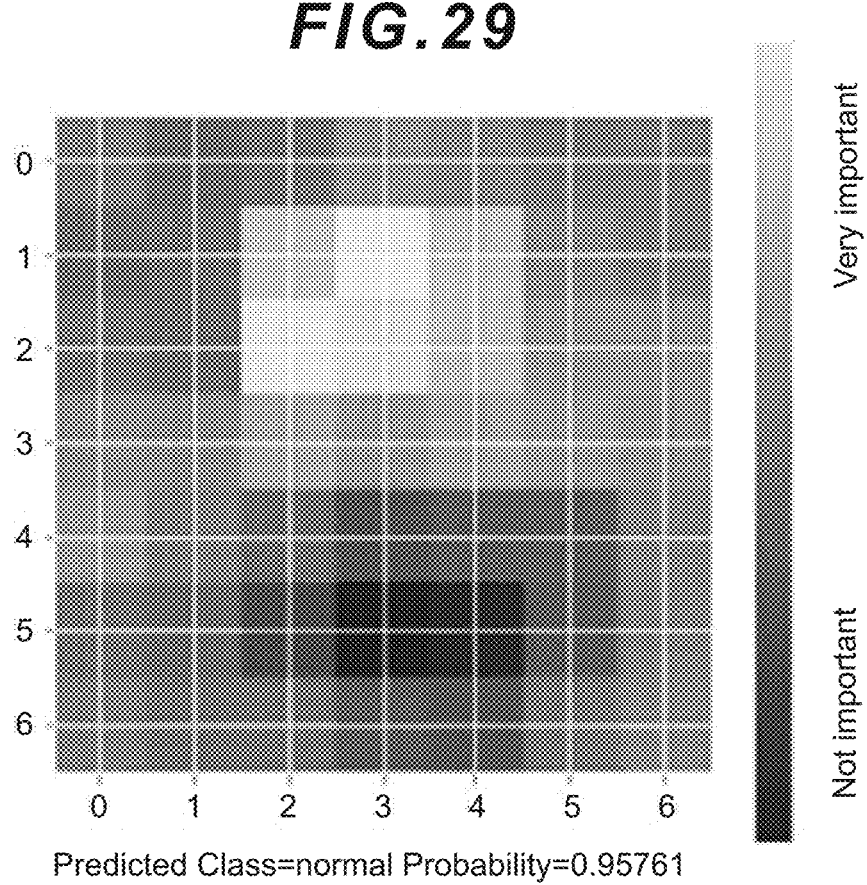
Predicted Class=normal Probability=0.95761
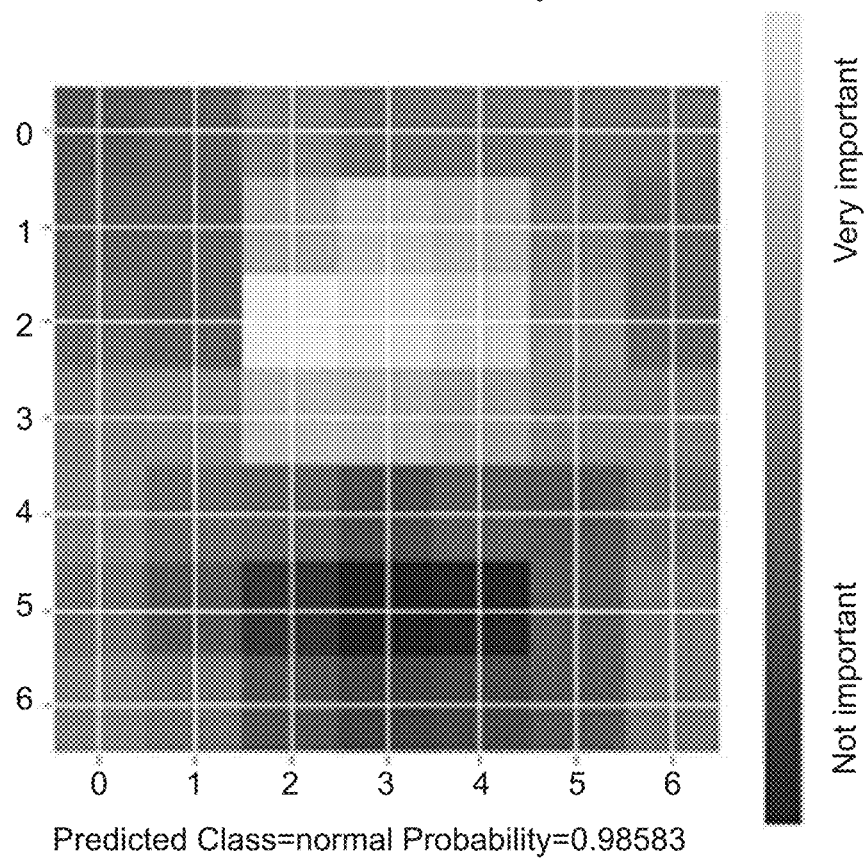
Predicted Class=normal Probability=0.98583

FIG. 30
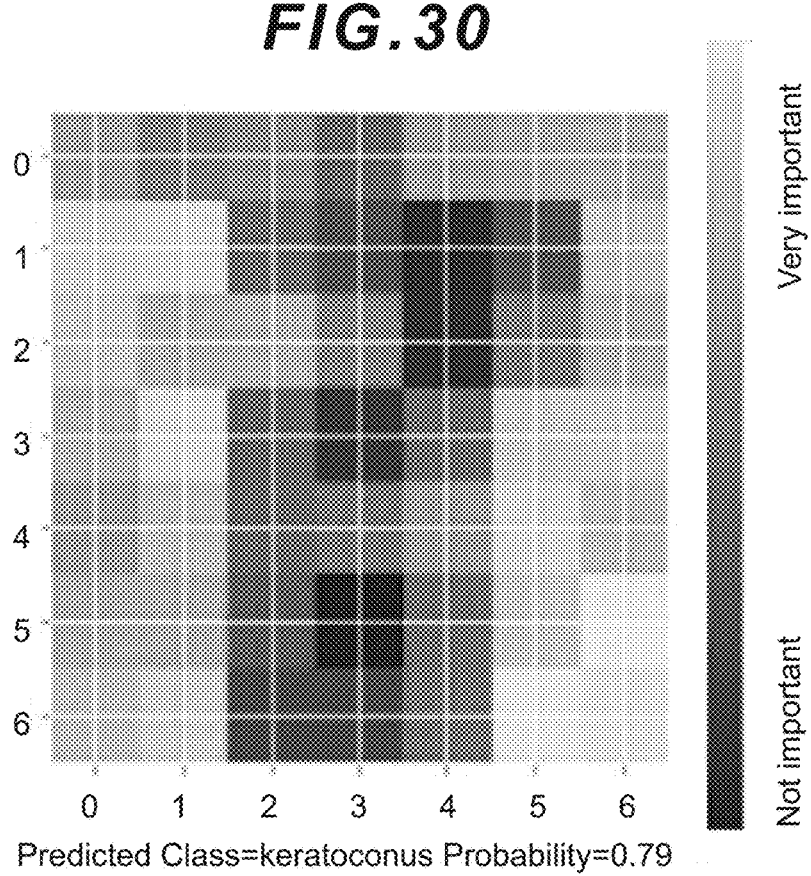
Predicted Class=keratoconus Probability=0.79
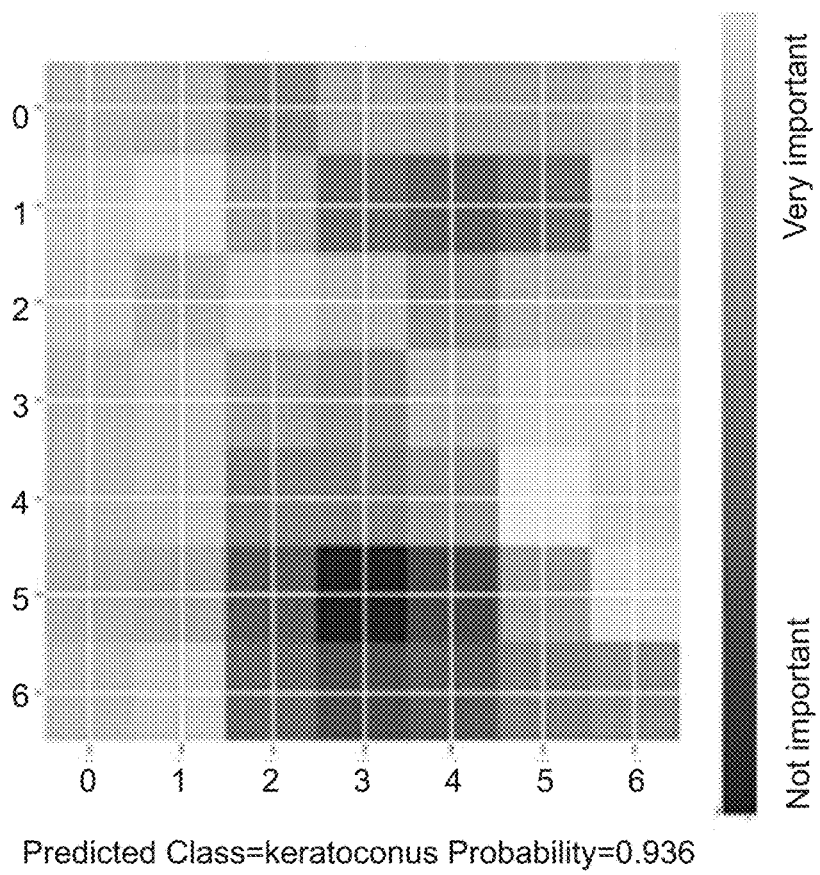
Predicted Class=keratoconus Probability=0.936

Fig. 31
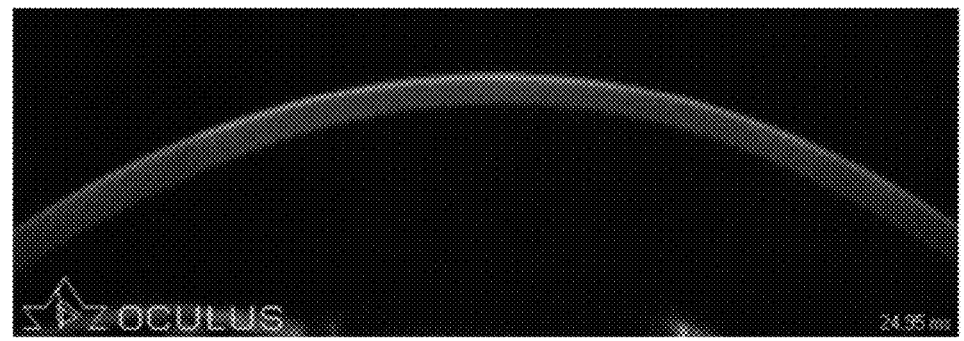
A) Initial corneal deformation video (first frame).
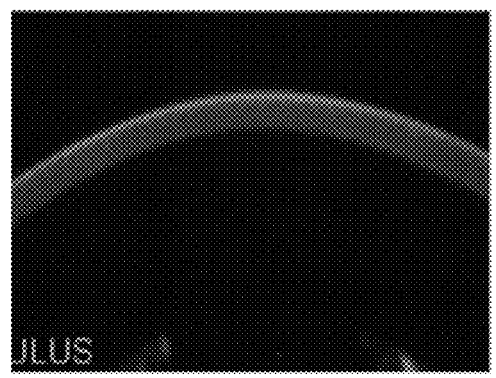
B) Cropped and resized corneal deformation video (first frame).
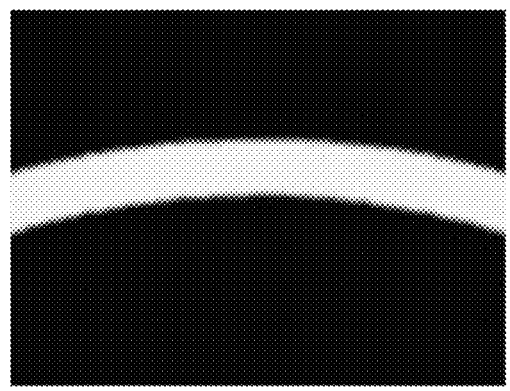
C) Final processed mask that texts were removed (first frame).

OPHTHALMIC SYSTEM, OPHTHALMIC APPARATUS, INFORMATION PROCESSING METHODS, AND PROGRAM

BACKGROUND OF THE INVENTION

Field of the Invention

The present disclosure relates to an ophthalmic system, an ophthalmic apparatus, an information processing method, and a program.

Description of the Related Art

In ophthalmology, it is common practice to evaluate a state of a subject's eye based on an image and make a diagnosis or a clinical judgment, and many means related to image processing of ophthalmic images have been developed. For example, as described in Japanese Patent Laid-Open No. 2021-98043, corneal topography is widely used in clinical practice in order to check a state of a subject's eye as means for evaluating a state of a cornea.

However, since a judgment using corneal topography is dependent on a result of a subjective observation of a topographic map, intervention of bias is a concern. In addition, development of means adaptable to various diseases such as keratoconus characterized by a forward protrusion of the cornea and dry eye (also known as keratoconjunctivitis sicca) characterized by destabilization of the tear film is desired.

SUMMARY OF THE INVENTION

An object of the present disclosure is to support efficient ophthalmic diagnoses.

An ophthalmic system according to an aspect of the present disclosure includes: an acquiring unit which acquires a moving image of a subject's eye captured by an imaging apparatus that opposes a subject; an analyzing unit which specifies an analysis object region in the subject's eye based on the moving image and which analyzes a spatial and/or temporal distribution of information related to characteristics of a surface of the subject's eye in the analysis object region; an assessing unit which assesses a possibility of the subject's eye being affected by a predetermined ophthalmic disease based on the distribution of information related to the characteristics and which generates a classification result of classifying the subject's eye into a predetermined classification group related to the affection of the ophthalmic disease in accordance with a degree of the possibility; a diagnosis support information generating unit which generates diagnosis support information that supports a diagnosis of the ophthalmic disease in the subject's eye based on the classification result; and an output control unit which controls output of the diagnosis support information.

According to this aspect, the ophthalmic system can support efficient ophthalmic diagnoses.

An ophthalmic system according to an aspect of the present disclosure is the ophthalmic system described above, wherein the ophthalmic disease is dry eye, and the characteristics of the surface of the subject's eye are an interference fringe before and after eyeblink and/or a tear meniscus height in the subject's eye.

According to this aspect, the ophthalmic system can support efficient diagnoses of dry eye.

An ophthalmic system according to an aspect of the present disclosure is the ophthalmic system described above, wherein the ophthalmic disease is keratoconus, and the characteristics of an ocular surface of the subject's eye are a change in a corneal shape of the subject's eye that occurs as a reaction to external stress with respect to the subject's eye.

According to this aspect, the ophthalmic system can support efficient diagnoses of keratoconus.

An ophthalmic system according to an aspect of the present disclosure is the ophthalmic system described above, wherein the classification group is a classification group in accordance with a degree of a possibility of the subject's eye being affected by the ophthalmic disease and includes a group of which the possibility is equal to or higher than a first reference value and a group of which the possibility is equal to or lower than a second reference value.

According to this aspect, the ophthalmic system can perform classification in accordance with the degree of the possibility of the subject's eye being affected by an ophthalmic disease and can support efficient ophthalmic diagnoses.

An ophthalmic system according to an aspect of the present disclosure is the ophthalmic system described above, wherein the analyzing unit and/or the assessing unit uses a learned mathematical model having been trained based on a moving image of a reference eye, and the moving image of a reference eye used for training of the learned mathematical model is a moving image which has been classified with respect to a predetermined ophthalmic disease using an index related to a subjective report submitted as a response by a patient with the reference eye and/or an index of a clinical parameter submitted as a response by a physician and which has been labeled with a result of the classification.

According to this aspect, the ophthalmic system can improve accuracy of classification using the learned mathematical model.

An ophthalmic system according to an aspect of the present disclosure is the ophthalmic system described above, wherein the analyzing unit analyzes a change over time of the distribution of information related to the characteristics by sequentially processing each of one or more frames constituting the moving image, and the assessing unit assesses a possibility that the subject's eye is affected by the ophthalmic disease based on at least one or more of the analysis object region, the distribution of information related to the characteristics, and the change over time of the distribution and generates a classification result of classifying the subject's eye into a predetermined classification group related to affection by a predetermined ophthalmic disease in accordance with the degree of the possibility.

According to this aspect, the ophthalmic system can make an assessment by tracking a change over time of information contained in a moving image of the subject's eye.

An ophthalmic system according to an aspect of the present disclosure is the ophthalmic system described above, wherein the analyzing unit analyzes a change over time of the distribution of information related to the characteristics by comparing results of processing one or more respective frames constituting the moving image, and the assessing unit assesses a possibility that the subject's eye is affected by the ophthalmic disease based on at least one or more of the analysis object region, the distribution of information related to the characteristics, and the change over time of the distribution and generates a classification result of classifying the subject's eye into a predetermined classification group related to affection by a predetermined ophthalmic disease in accordance with a degree of the possibility.

According to this aspect, the ophthalmic system can make an assessment by tracking a change over time of information contained in a moving image of the subject's eye.

An ophthalmic system according to an aspect of the present disclosure is the ophthalmic system described above, wherein the analyzing unit calculates a level of importance of one or more divisions obtained by dividing the analysis object region in a predetermined ratio based on the distribution of information related to the characteristics in the analysis object region and analyzes a spatial and/or temporal distribution of divisions of which the level of importance is equal to or higher than a predetermined threshold, and the assessing unit assesses a possibility that the subject's eye is affected by the ophthalmic disease based on at least one or more of the analysis object region, the distribution of information related to the characteristics, and the distribution of the divisions and generates a classification result of classifying the subject's eye into a predetermined classification group related to affection by the ophthalmic disease in accordance with a degree of the possibility.

According to this aspect, the ophthalmic system can make an assessment using a distribution of regions with a high level of importance based on a distribution of information related to characteristics of a surface of the subject's eye.

An ophthalmic system according to an aspect of the present disclosure is the ophthalmic system described above, wherein the classification group is a classification group in accordance with a degree of the possibility of the subject's eye being affected by the ophthalmic disease and includes a group of which the possibility is equal to or higher than a first reference value and a group of which the possibility is equal to or higher than a second reference value, and the diagnosis support information includes a classification result of classifying the subject's eye into the classification group and a still image and/or one or more moving images generated based on the one or more frames constituting a basis for the generation of the classification result.

According to this aspect, since the ophthalmic system can present, in a viewable manner, a user with a frame constituting a basis of a classification judgment made by the ophthalmic system according to the present embodiment, reliability of diagnosis support information can be improved.

An information processing method according to another aspect of the present disclosure includes steps executed by one or a plurality of computers of: acquiring a moving image of a subject's eye captured by an imaging apparatus that opposes a subject; specifying an analysis object region in the subject's eye based on the moving image and analyzing a spatial and/or temporal distribution of information related to characteristics of a surface of the subject's eye in the analysis object region; assessing a possibility of the subject's eye being affected by a predetermined ophthalmic disease based on the distribution of information related to the characteristics and generating a classification result of classifying the subject's eye into a predetermined classification group related to the affection of the ophthalmic disease in accordance with a degree of the possibility; generating diagnosis support information that supports a diagnosis of the ophthalmic disease in the subject's eye based on the classification result; and controlling output of the diagnosis support information.

According to this aspect, the information processing method can support efficient ophthalmic diagnoses.

A program according to another aspect of the present disclosure causes one or a plurality of computers to execute steps of: acquiring a moving image of a subject's eye captured by an imaging apparatus that opposes a subject; specifying an analysis object region in the subject's eye based on the moving image and analyzing a spatial and/or temporal distribution of information related to characteristics of a surface of the subject's eye in the analysis object region; assessing a possibility of the subject's eye being affected by a predetermined ophthalmic disease based on the distribution of information related to the characteristics and generating a classification result of classifying the subject's eye into a predetermined classification group related to the affection of the ophthalmic disease in accordance with a degree of the possibility; generating diagnosis support information that supports a diagnosis of the ophthalmic disease in the subject's eye based on the classification result; and controlling output of the diagnosis support information.

According to this aspect, the program can support efficient ophthalmic diagnoses.

An ophthalmic apparatus according to another aspect of the present disclosure includes: an acquiring unit which acquires a moving image of a subject's eye captured by an imaging apparatus that opposes a subject; an analyzing unit which specifies an analysis object region in the subject's eye based on the moving image and which analyzes a spatial and/or temporal distribution of information related to characteristics of a surface of the subject's eye in the analysis object region; an assessing unit which assesses a possibility of the subject's eye being affected by a predetermined ophthalmic disease based on the distribution of information related to the characteristics and which generates a classification result of classifying the subject's eye into a predetermined classification group related to the affection of the ophthalmic disease in accordance with a degree of the possibility; a diagnosis support information generating unit which generates diagnosis support information that supports a diagnosis of the ophthalmic disease in the subject's eye based on the classification result; and an output control unit which controls output of the diagnosis support information.

According to this aspect, the ophthalmic apparatus can support efficient ophthalmic diagnoses.

According to the present disclosure, efficient ophthalmic diagnoses can be supported.

BRIEF DESCRIPTION OF THE DRAWINGS

FIGS. 16A and 16B are diagrams for explaining the first test example;

FIGS. 24A and 24B are diagrams for explaining the second test example;

FIG. 26 is a diagram for explaining the second test example;

FIGS. 27A and 27B are diagrams for explaining the second test example;

FIGS. 28A and 28B are diagrams for explaining the second test example;

FIG. 29 is a diagram for explaining the second test example;

FIG. 30 is a diagram for explaining the second test example;

FIG. 31 is a diagram for explaining a third test example;

DETAILED DESCRIPTION OF THE PREFERRED EMBODIMENT

An embodiment of the present invention (hereinafter, referred to as a "present embodiment") will be described with reference to the accompanying drawings. It should be noted that the following embodiment is for facilitating understanding of the present invention and is not intended to limit the interpretation of the present invention. In addition, various modifications may be made to the present invention without departing from the spirit or scope of the present invention. For example, steps of information processing can be optionally reordered insofar as no contradictions arise in processing contents or the steps of information processing can be executed in parallel. Elements given the same reference signs in the respective drawings have same or similar configurations. Dimension ratios of the drawings are not limited to the illustrated ratios. It will thus be appreciated that those skilled in the art will be able to adopt embodiments in which the respective elements described below are replaced by equivalents and that such embodiments will also fall within the scope of the present invention.

<System Configuration>

Figure 1:
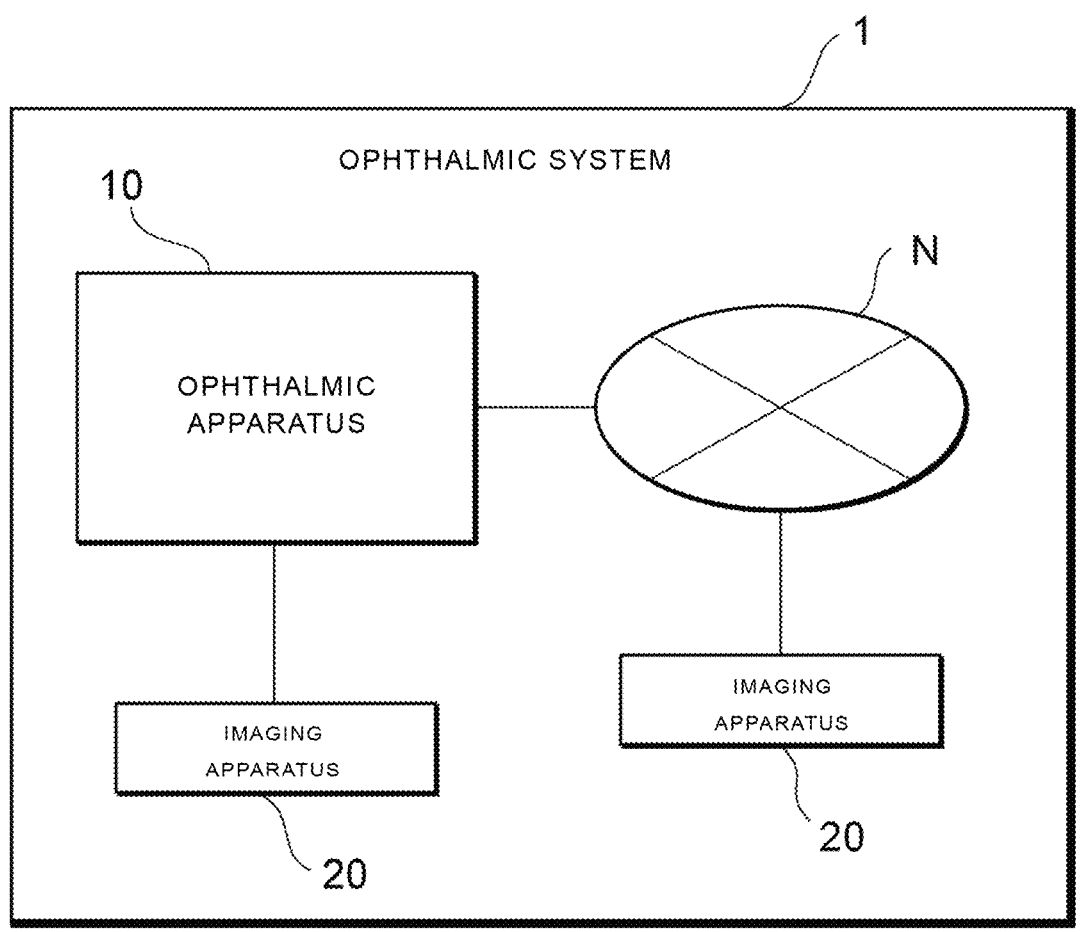
FIG. 1 is a diagram showing a configuration example of an ophthalmic system according to an aspect of the present disclosure.

FIG. 1 is a diagram showing a configuration example of an ophthalmic system 1 according to the present embodiment.

The ophthalmic system 1 shown in FIG. 1 includes an ophthalmic apparatus 10 and one or more imaging apparatuses 20. As shown in FIG. 1, the ophthalmic apparatus 10 and each imaging apparatus 20 may be connected to be capable of communicating with each other via a wireless or wired communication network such as the Internet, an intranet, a wireless LAN, or mobile communication.

While the ophthalmic system 1 will be described as including the imaging apparatus 20 in the present disclosure, the ophthalmic system 1 need not necessarily include the configuration of the imaging apparatus 20 as long as the ophthalmic system 1 includes the ophthalmic apparatus 10 and the functions of the imaging apparatus 20 may be served by the ophthalmic apparatus 10.

The ophthalmic apparatus 10 is an information processing apparatus which serves a function of supporting efficient diagnosis in ophthalmology. For example, the ophthalmic apparatus 10: acquires a moving image of a subject's eye; analyzes a spatial distribution and/or a temporal distribution of information related to characteristics of an ocular surface of the subject's eye based on the moving image; assesses a possibility of the subject's eye being affected by a predetermined ophthalmic disease based on the distribution; classifies the subject's eye into a predetermined classification group related to the ophthalmic disease; and generates information that supports a diagnosis based on a result of the classification.

The ophthalmic apparatus 10 may be constituted of one or a plurality of information processing apparatuses. The ophthalmic apparatus 10 may be constituted using a virtual server (a cloud server or the like). The ophthalmic apparatus 10 may be constituted of a computer.

The imaging apparatus 20 is not particularly limited as long as a moving image of an ocular surface of a subject's eye as an object can be photographed and conventionally known imaging apparatuses may be used. For example, the imaging apparatus 20 includes an illumination system capable of outputting infrared light and a photographing system including a digital camera capable of photographing moving images.

<Hardware Configuration>

Figure 2:
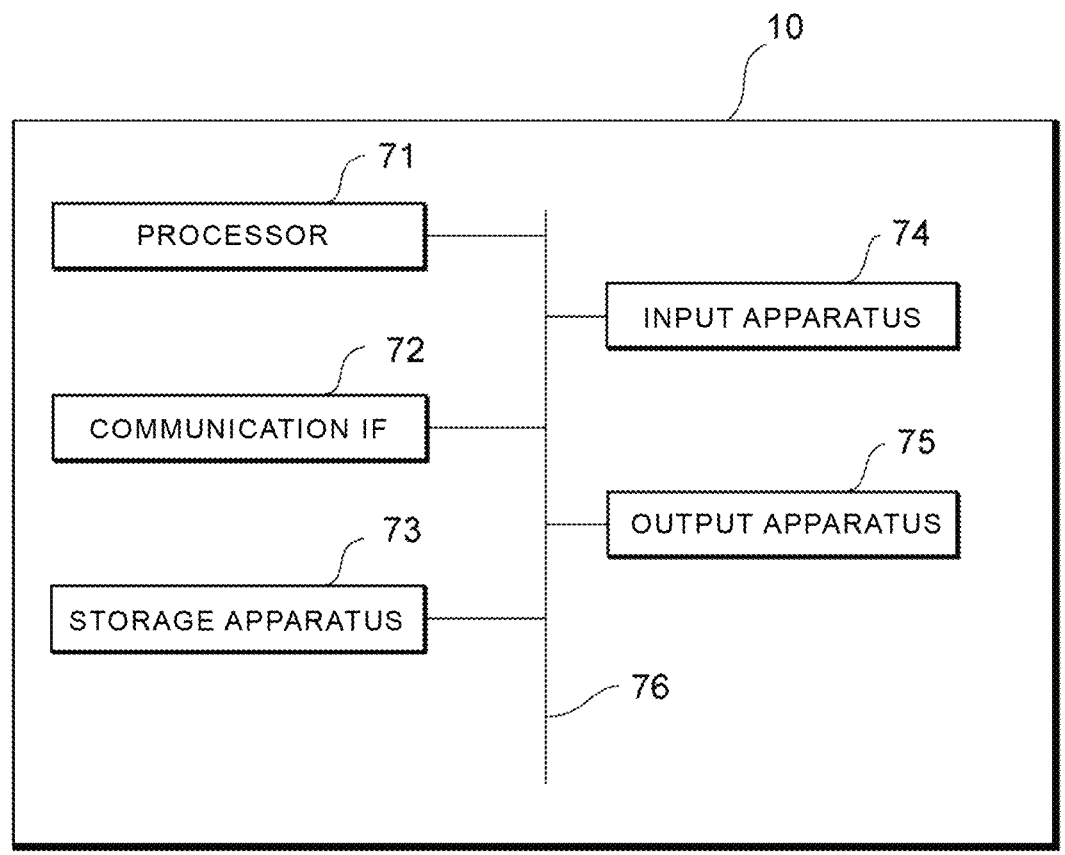
FIG. 2 is a diagram showing a hardware configuration example of an ophthalmic apparatus according to the aspect of the present disclosure.

FIG. 2 is a diagram showing a hardware configuration example of the ophthalmic apparatus 10. The ophthalmic apparatus 10 includes a processor 71 such as a CPU (central processing unit) or a GPU (graphical processing unit), a communication IF (interface) 72 which performs wireless or wired communication, a storage apparatus 73 such as a memory (for example, a RAM (random access memory) or a ROM (read only memory)), an HDD (hard disk drive) and/or an SSD (solid state drive), an input apparatus 74 which receives an input operation, and an output apparatus 75 which outputs information. The input apparatus 74 is, for example, a keyboard, a touch panel, a mouse and/or a microphone, or the like. The output apparatus 75 is, for example, a display, a touch panel and/or a speaker, or the like. The processor 71, the communication IF 72, the storage apparatus 73, the input apparatus 74, and the output apparatus 75 are connected by one or a plurality of communication buses 76.

<Functional Configuration>

Figure 3:
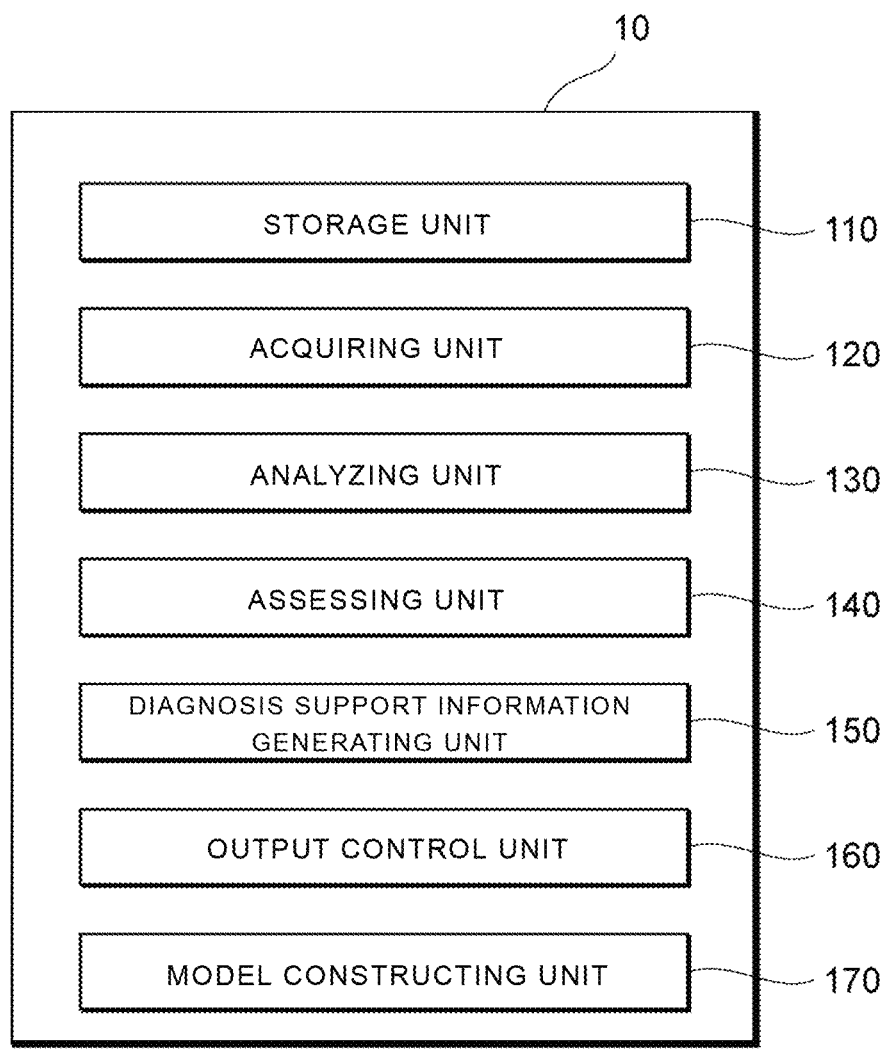
FIG. 3 is a diagram showing a functional configuration example of the ophthalmic apparatus according to the aspect of the present disclosure.

FIG. 3 is a diagram showing a functional configuration example of the ophthalmic apparatus 10. The ophthalmic apparatus 10 includes a storage unit 110, an acquiring unit 120, an analyzing unit 130, an assessing unit 140, a diagnosis support information generating unit 150, an output control unit 160, and a model constructing unit 170. The storage unit 110 can be realized using the storage apparatus 73 included in the ophthalmic apparatus 10. The acquiring unit 120, the analyzing unit 130, the assessing unit 140, the diagnosis support information generating unit 150, the output control unit 160, and the model constructing unit 170 can be realized by the processor 71 included in the ophthalmic apparatus 10 by executing a program stored in the storage apparatus 73. In addition, the program can be stored in a storage medium. The storage medium storing the program may be a non-transitory computer-readable medium. While the non-transitory storage medium is not particularly limited, for example, the non-transitory storage medium may be a storage medium such as an USB (universal serial bus) memory or a CD-ROM (compact disc read-only memory).

In the present disclosure, while the ophthalmic apparatus 10 will be described as including the storage unit 110, the acquiring unit 120, the analyzing unit 130, the assessing unit 140, the diagnosis support information generating unit 150, the output control unit 160, and the model constructing unit 170, the ophthalmic apparatus 10 need not necessarily include the model constructing unit 170 and functions of the model constructing unit 170 may be served by another information processing apparatus.

In addition, while one ophthalmic apparatus 10 will be described as including the storage unit 110, the acquiring unit 120, the analyzing unit 130, the assessing unit 140, the diagnosis support information generating unit 150, the output control unit 160, and the model constructing unit 170 in the present disclosure, all of the functional components described above need not necessarily be provided by one ophthalmic apparatus 10 and may be served by a plurality of ophthalmic apparatuses 10.

(Storage Unit)

The storage unit 110 stores various kinds of data necessary for the ophthalmic apparatus 10 to support efficient ophthalmic diagnoses.

(Acquiring Unit)

The acquiring unit 120 has a function of acquiring a moving image of a subject's eye. The moving image of the subject's eye is captured by the imaging apparatus 20 which opposes a subject.

In the present disclosure, "acquiring a moving image" includes receiving an input of the moving image. The moving image of the subject's eye which is input to the acquiring unit 120 may be transmitted from the imaging apparatus 20, transmitted from an external information processing apparatus, or transmitted from the imaging apparatus 20 via an external information processing apparatus.

A duration or a resolution of the moving image of the subject's eye is not particularly limited and may be a duration or a resolution of moving images captured by conventionally known imaging apparatuses used in ophthalmology.

In the present disclosure, while the moving image of the subject's eye will be described as being a moving image captured by the imaging apparatus 20 opposing the subject, the moving image of the subject's eye is not necessarily limited to moving images captured in this manner. Since the ophthalmic system 1 according to the present embodiment captures an abnormality occurring on an ocular surface reflected in a moving image of an eyeball and assesses a possibility of affection by an ophthalmic disease, it will be appreciated by those skilled in the art that moving images captured in a variety of different modes can also be used as long as the moving images include information related to characteristics of the surface of the subject's eye.

(Analyzing Unit)

The analyzing unit 130 has a function of specifying an analysis object region in the subject's eye based on the moving image acquired by the acquiring unit 120 and analyzing a spatial and/or temporal distribution of information related to characteristics of the surface of the subject's eye (hereinafter, sometimes simply referred to as "information related to characteristics") in the analysis object region.

In the present disclosure, the analysis object region is a region including information related to characteristics of the surface of the subject's eye. The analysis object region may be a part of or all of an image of the surface of the subject's eye.

In an embodiment, the analyzing unit 130 specifies the analysis object region in the subject's eye based on a moving image of the subject's eye. The analyzing unit 130 may specify the analysis object region by searching for a region including information related to characteristics of the surface of the subject's eye in one or more frames constituting a moving image of the subject's eye. Alternatively, the analyzing unit 130 may specify a region including information related to desired characteristics of the surface of the subject's eye as the analysis object region by applying a known process of image processing.

In the present disclosure, the information related to characteristics of the surface of the subject's eye is information that contributes to processing of classifying the subject's eye into a classification group related to a predetermined ophthalmic disease.

In an embodiment, the information related to characteristics of the surface of the subject's eye is information related to characteristics of an ocular surface of the subject's eye which is information related to characteristics of the surface of the subject's eye which presents a possibility of the subject's eye being affected by a predetermined ophthalmic disease.

In an embodiment, the characteristics of the ocular surface of the subject's eye which presents a possibility of the subject's eye being affected by a predetermined ophthalmic disease are characteristics of the ocular surface reflecting fragility of the cornea or the sclera. Since the ophthalmic system 1 according to the present embodiment assesses a possibility of being affected by an ophthalmic disease by capturing an abnormality occurring on an ocular surface that is reflected in a moving image of the eyeball, capturing characteristics of the ocular surface that reflects fragility of the cornea or the sclera enables classification related to ophthalmic diseases that exhibit fragility of the cornea or the sclera to be performed. The characteristics of the ocular surface that reflects fragility of the cornea or the sclera may be, for example, one or more characteristics selected from tenderness, brittleness, deformability, flexibility, and the like or a combination thereof.

In addition, for example, the characteristics of the ocular surface that reflects fragility of the cornea or the sclera may be a change in a shape of the cornea or the sclera of the subject's eye which occurs as a reaction to external stress with respect to the subject's eye. In this case, the external stress with respect to the subject's eye can be created by an operation of applying physical pressure such as an air pulse. Such an operation may be an operation which is generally performed when, for example, examining intraocular pressure. Furthermore, such an operation may be a contact-type operation or a non-contact operation. Since the ophthalmic system 1 according to the present embodiment captures an abnormality occurring on an ocular surface reflected in a moving image of an eyeball and assesses a possibility of affection by an ophthalmic disease, it will be appreciated by those skilled in the art that moving images which capture a response to external stress as information related to characteristics of the surface of the subject's eye enable external stress to be applied to the subject's eye in a variety of different modes.

In an embodiment, the characteristics of the ocular surface of the subject's eye which presents a possibility of the subject's eye being affected by a predetermined ophthalmic disease are one or more characteristics selected from an interference fringe before and after eyeblink, a composition of the tear film, and a tear meniscus height or a combination thereof.

In an embodiment, the characteristics of the ocular surface which presents a possibility of being affected by a predetermined ophthalmic disease are a lesion occurring on the ocular surface. Since the ophthalmic system 1 according to the present embodiment assesses a possibility of being affected by an ophthalmic disease by capturing an abnormality occurring on an ocular surface that is reflected in a moving image of the eyeball, classification related to ophthalmic diseases causing a lesion on the ocular surface can be performed. In this case, depending on a still image that is captured by the imaging apparatus 20 opposing the subject, the lesion occurring on the ocular surface may be a lesion that is difficult to confirm. The lesion occurring on the ocular surface may be a lesion which a physician or other experts may find it difficult to confirm by visual inspection on a moving image.

Examples of ophthalmic diseases which represent fragility of the cornea or the sclera or which cause a lesion on the ocular surface include glaucoma, corneal degeneration, corneal opacity, lagophthalmos, keratoconus, dry eye, Mooren's ulcer, allergic conjunctivitis, infectious conjunctivitis, scleritis, narrow angle, uveitis, angle or iris neovascularization, retinal detachment, choroidal detachment, vitreous opacity, and high myopia. In addition, the ophthalmic disease may be corneal dystrophy. Since these ophthalmic diseases cause fragility to be exhibited in the cornea or the sclera or a lesion to occur on the ocular surface, the ophthalmic diseases can be classified by the ophthalmic system 1 according to the present embodiment.

In addition, dry eye is divided into the following two subtypes: evaporative DED, and acquisition DED which is mainly caused by Sjögren syndrome. Causes of acquisition DED include autoimmune diseases such as rheumatoid arthritis, systemic lupus erythematosus, and psoriatic arthritis. Therefore, by assessing the possibility of being affected by dry eye with the ophthalmic system 1 according to the present embodiment, classification related to such diseases can also be performed.

With the ophthalmic system 1 according to the present embodiment, even in the case of an ophthalmic disease which progresses slowly and of which early detection or the detection itself is difficult depending on photography of a still image, a possibility of affection by the ophthalmic disease can be readily detected from a moving image of an eyeball.

In the present disclosure, the spatial distribution of information related to characteristics of the surface of the subject's eye indicates how information related to the characteristics is arranged in an image of the surface of the subject's eye in each of one or more frames constituting a moving image of the subject's eye. Examples of the spatial distribution of information related to characteristics of the surface of the subject's eye include localization of information related to the characteristics of the surface of the subject's eye, localization of regions containing a reference value or more of information related to the characteristics of the surface of the subject's eye, an area of regions containing a reference value or more of information related to the characteristics of the surface of the subject's eye, an amount of the information related to the characteristics of the surface of the subject's eye which is present per unit area in the image of the surface of the subject's eye, a pattern in which the information related to the characteristics of the surface of the subject's eye is arranged on the image of the surface of the subject's eye, and a manner in which the information related to the characteristics of the surface of the subject's eye is scattered.

In the present disclosure, the temporal distribution of information related to characteristics of the surface of the subject's eye indicates how information related to the characteristics is arranged in each time unit when one or more frames constituting a moving image of the subject's eye are lined up along a time series. Examples of the spatial distribution of information related to characteristics of the surface of the subject's eye include an occurrence rate of the information related to the characteristics in a part of or all of the moving image and an occurrence rate of the information related to the characteristics in each of one or more frames constituting the moving image.

In the present disclosure, a change in the spatial distribution of information related to characteristics of the surface of the subject's eye over time indicates how a distribution of information related to the characteristics changes with the passage of time when one or more frames constituting a moving image of the subject's eye are lined up along a time series.

In an embodiment, the analyzing unit 130 uses a learned mathematical model having been trained based on a moving image of a reference eye, the moving image of a reference eye used for training of the learned mathematical model being a moving image which has been classified with respect to a predetermined ophthalmic disease using an index related to a subjective report submitted as a response by a patient with the reference eye and/or an index of a clinical parameter submitted as a response by a physician and which has been labeled with a result of the classification.

The learned mathematical model used by the analyzing unit 130 may be a mathematical model constructed by the model constructing unit 170 according to the present disclosure or a mathematical model input from an information processing apparatus that differs from the ophthalmic apparatus 10. While mathematical models with a same specification are preferably used when the analyzing unit 130 and the assessing unit 140 use learned mathematical models, the analyzing unit 130 and the assessing unit 140 are not necessarily limited to using mathematical models with the same specification and may respectively use mathematical models with different specifications.

The analyzing unit 130 may use a learned mathematical model in a part of processing performed by the analyzing unit 130 or may use a learned mathematical model in all of the processing performed by the analyzing unit 130.

According to this aspect, the ophthalmic system 1 can improve accuracy of classification using the learned mathematical model.

In an embodiment, when performing processing with respect to one or more frames constituting a moving image of the subject's eye, the analyzing unit 130 determines whether or not to end an analysis process and, based on a result of the determination, continues or ends processing with respect to the one or more frames.

The analyzing unit 130 may determine to end the analysis process in correspondence to the confirmation of the presence of a frame including a predetermined reference value or more of information that contributes to classification related to the predetermined ophthalmic disease. The analyzing unit 130 may determine to end the analysis process in correspondence to the confirmation of a predetermined reference value or more of the presence of the information that contributes to classification related to the predetermined ophthalmic disease. The analyzing unit 130 may determine to end the analysis process in correspondence to the confirmation of the presence of a predetermined number or more frames including a predetermined reference value or more of the information that contributes to classification related to the predetermined ophthalmic disease. The analyzing unit 130 may determine to end the analysis process in correspondence to the confirmation of the presence of a predetermined number or more consecutive frames including a predetermined reference value or more of the information that contributes to classification related to the predetermined ophthalmic disease. The analyzing unit 130 may determine to end the analysis process based on a degree of progress of a process of assessment by the assessing unit 140.

According to this aspect, even when processing a plurality of frames constituting a moving image of the subject's eye, the ophthalmic apparatus 1 can automatically perform analyses and can support efficient ophthalmic diagnoses by eliminating the time and labor that are required of the user.

(Assessing Unit)

The assessing unit 140 has a function of assessing a possibility of the subject's eye being affected by a predetermined ophthalmic disease based on a distribution of information related to characteristics of the surface of the subject's eye and generating a classification result of classifying the subject's eye into a predetermined classification group related to the ophthalmic disease in accordance with a degree of the possibility.

In an embodiment, the assessing unit 140 generates a classification result of classifying the subject's eye into two or more classification groups in accordance with a degree of the possibility that the subject's eye is affected by the predetermined ophthalmic disease.

According to this aspect, the ophthalmic system 1 can perform classification in accordance with the degree of the possibility of the subject's eye being affected by an ophthalmic disease and can support efficient ophthalmic diagnoses.

The classification result is not limited to being one of a diseased eye group and a normal eye group. In addition, which of the classification groups are to be assessed as "normal eye" is not particularly limited and may be appropriately judged by the user. For example, the classification result is a result of classification into "a group with a high degree of possibility of being affected by ophthalmic disease A" of which the possibility of being affected by the ophthalmic disease A is equal to or higher than a first reference value, "a group with a moderate degree of possibility of being affected by ophthalmic disease A" of which the possibility is equal to or higher than a second reference value and lower than the first reference value, and "a group with a low degree of possibility of being affected by ophthalmic disease A" of which the possibility is lower than the second reference value (where first reference value>second reference value). For example, the classification result is a result of classification into "a group with a possibility of being affected by ophthalmic disease B" of which the possibility of being affected by the ophthalmic disease B is equal to or higher than a first reference value and "a group without a possibility of being affected by ophthalmic disease B" of which the possibility is equal to or lower than a second reference value (where first reference value>second reference value). For example, the classification result is a result of classification into "a group with a possibility of being affected by ophthalmic disease C" of which the possibility of being affected by the ophthalmic disease C is equal to or higher than a first reference value and "a group without a possibility of being affected by ophthalmic disease C" of which the possibility is lower than the first reference value.

The reference values of the degree of possibility used during classification may be instructed by a subject, instructed by a physician, or specified by a computer. One or more, two or more, or three or more reference values may be used.

In an embodiment, the assessing unit 140 uses a learned mathematical model having been trained based on a moving image of a reference eye, the moving image of a reference eye used for training of the learned mathematical model being a moving image which has been classified with respect to a predetermined ophthalmic disease using an index related to a subjective report submitted as a response by a patient with the reference eye and/or an index of a clinical parameter submitted as a response by a physician and which has been labeled with a result of the classification.

The learned mathematical model used by the assessing unit 140 may be a mathematical model constructed by the model constructing unit 170 according to the present disclosure or a mathematical model input from an information processing apparatus that differs from the ophthalmic apparatus 10.

The assessing unit 140 may use a learned mathematical model in a part of processing performed by the assessing unit 140 or may use a learned mathematical model in all of the processing performed by the assessing unit 140.

According to this aspect, the ophthalmic system 1 can improve accuracy of classification using the learned mathematical model.

(Diagnosis Support Information Generating Unit)

The diagnosis support information generating unit 150 has a function of generating diagnosis support information for supporting a diagnosis of an ophthalmic disease in a subject's eye based on the classification result generated by the assessing unit 140. The diagnosis support information is provided to physicians and patients to support efficient diagnoses.

In an embodiment, the diagnosis support information includes a classification result of classifying the subject's eye into a predetermined classification group and a still image and/or a moving image generated based on one or more frames constituting a basis for the generation of the classification result.

When the classification result by the assessing unit 140 includes a plurality of classification groups, the diagnosis support information includes a still image and/or a moving image generated based on one or more frames constituting a basis for judgment of each classification group.

According to this aspect, since the user can be presented with, in a viewable manner, a frame constituting a basis of a classification judgment made by the ophthalmic system 1 according to the present embodiment, reliability of diagnosis support information can be improved.

In an embodiment, the diagnosis support information includes other supplementary information acquired when analyzing the moving image of the subject's eye. The supplementary information may include information related to a treatment, a physician, or a medical institution in accordance with a degree of possibility of being affected by an ophthalmic disease as assessed by the assessing unit 140. The supplementary information may include information related to confidence of the classification result calculated based on the degree of possibility of the subject's eye being affected by a predetermined ophthalmic disease as assessed by the assessing unit 140. The supplementary information may include information created by superimposing a heat map visualizing regions having contributed to the classification on a moving image of the subject's eye acquired by the acquiring unit 120 or on one or more frames constituting the moving image of the subject's eye by alpha blending.

According to this aspect, since information that is readily understood by the user can be presented, efficient ophthalmic diagnoses can be supported.

(Output Control Unit)

The output control unit 160 has a function of controlling output of the diagnosis support information generated by the diagnosis support information generating unit 150. In the present disclosure, the diagnosis support information is provided to physicians, technicians, patients, nurses, or the like to support efficient diagnoses in ophthalmology.

(Model Constructing Unit)

The model constructing unit 170 has a function of constructing a mathematical model M for analyzing a moving image of a subject's eye. In the present disclosure, the mathematical model M is a mathematical model capable of at least performing processing of an image. In the present disclosure, "constructing a mathematical model" includes creating a mathematical model and learning a mathematical model. In the present disclosure, "learning" may be used synonymously with "training". In the present disclosure, the mathematical model M for analyzing a moving image of a subject's eye is a mathematical model which receives the moving image of the subject's eye as input data, makes an inference based on the input data, and classifies the subject's eye into either a diseased eye group or a normal eye group.

In an embodiment, the model constructing unit 170 constructs the mathematical model M using, as training data, a moving image of a reference eye which has been classified with respect to a predetermined ophthalmic disease using an index related to a subjective report submitted as a response by a patient with the reference eye and/or an index of a clinical parameter submitted as a response by a physician and which has been labeled with a result of the classification. In other words, the mathematical model M for analyzing the moving image of the subject's eye is a learned mathematical model having been trained by machine learning based on training data of a moving image of a reference eye which has been classified with respect to a predetermined ophthalmic disease using an index related to a subjective report submitted as a response by a patient with the reference eye and/or an index of a clinical parameter submitted as a response by a physician and which has been labeled with a result of the classification.

In an embodiment, the label of the training data includes information based on an index related to a subjective report submitted as a response by a patient with the reference eye and/or information based on an index of a clinical parameter submitted as a response by a physician.

According to this aspect, the model constructing unit 170 can cause the mathematical model M to learn an extent of symptoms, a progress of an ophthalmic disease, and a judgment by a physician who is an expert. In addition, the model constructing unit 170 can improve a classification accuracy of the mathematical model M to be constructed. Furthermore, according to the mathematical model M constructed by learning in this manner, processing of classification having improved classification accuracy can be performed.

In an embodiment, the index related to a subjective report submitted as a response by the patient with the reference eye includes information related to a presence or absence of subjective symptoms. For example, the index includes information submitted as a response to the Ocular Surface Disease Index (OSDI) questionnaire. For example, when using the OSDI questionnaire, a total OSDI score can be calculated within a range of 0 to 100 according to [(sum of scores for all questions)×100]/[total number of answered questions)×4] and used as an index in such a manner that the higher the total OSDI score, the greater the disorder.

In an embodiment, the index of a clinical parameter submitted as a response by a physician includes information obtained by assessing the subject's eye based on diagnostic items of an ophthalmic disease used when the physician performs a physical examination in clinical practice. For example, the index includes information related to TMH, NIKBUT, a defect of the eyelid of the subject's eye observed using a slit lamp microscopy or the like, Schirmer's test, staining of cornea or conjunctiva surface using a fluorescein dye, corneal topography, and a tomographic image of the eyeball.

In an embodiment, the mathematical model M for analyzing a moving image of the subject's eye includes one or more mathematical models among convolutional neural networks (CNNs), neural networks of types other than convolutional neural networks, and mathematical models of types other than neural networks such as long short-term memory (LSTM) models.

In an embodiment, the convolutional neural networks include a fully convolutional network (FCN) that does not include a fully connected layer, a support vector machine, and a recurrent neural network (RNN).

Figure 12:
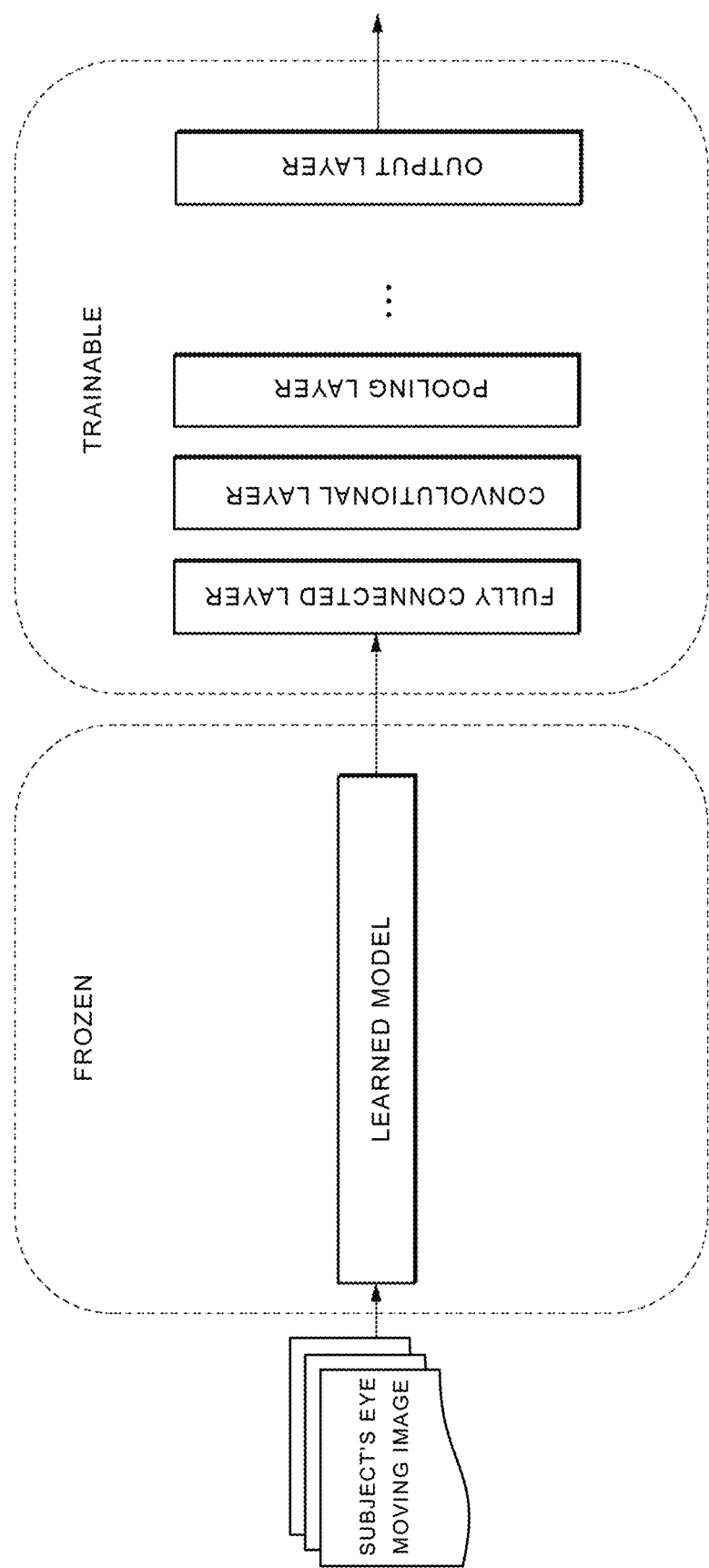
FIG. 12 is a diagram showing a configuration example of a learned mathematical model.

In an embodiment, the model constructing unit 170 constructs the mathematical model M using transfer learning. In other words, the model constructing unit 170 constructs the mathematical model M using a trained neural network of which machine learning using other training data has already been performed and parameters have been adjusted. The trained neural network may be constructed using a known, open-source neural network architecture. FIG. 12 is an example of a conceptual diagram of the mathematical model M constructed using transfer learning.

In an embodiment, the model constructing unit 170 constructs the mathematical model M using any method such as a support vector machine, a Bayes classifier, boosting, kernel density estimation, principal component analysis, a k-means method, independent component analysis, a self-organizing map, random forest, or a generative adversarial network (GAN).

In an embodiment, the model constructing unit 170 constructs the mathematical model M using one or more training methods among supervised learning, unsupervised learning, and reinforcement learning.

In an embodiment, the model constructing unit 170 updates the constructed mathematical model M by having the mathematical model M undergo training on a regular or irregular basis.

In an embodiment, the model constructing unit 170 trains the mathematical model M using a moving image acquired by the acquiring unit 120 as learning data.

In an embodiment, a classification result that is classified by the mathematical model M is a result of the assessing unit 140 assessing a possibility that a subject's eye is affected by an ophthalmic disease in accordance with a degree of coincidence with training data or a degree of deviation from training data and classifying the subject's eye into one or more classification groups according to a degree of possibility.

In an embodiment, the model constructing unit 170 trains the mathematical model M so as to minimize an error between a result estimated by the mathematical model M and training data including labeled learning data.

In an embodiment, the model constructing unit 170 constructs the mathematical model M using a processed image obtained by processing, by a computer, a moving image collected from a reference eye. Examples of the processed image include a processed image having been processed by data augmentation.

According to this aspect, the model constructing unit 170 can construct a mathematical model M that reduces a risk of over-learning.

<Operations>

Figure 4:
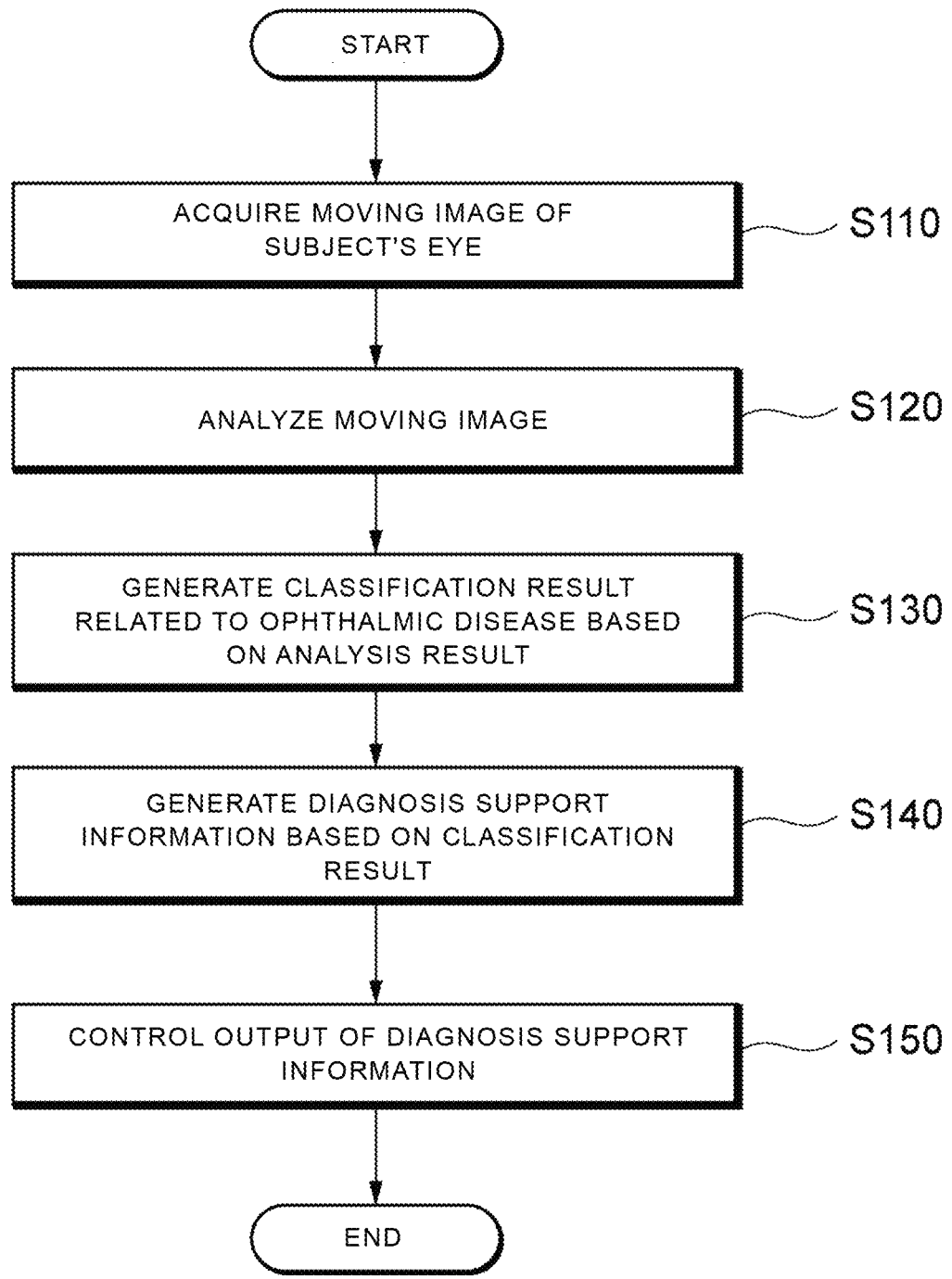
FIG. 4 is a diagram showing a processing flow example of the ophthalmic system according to the aspect of the present disclosure.

First Operation Example: Refer to FIG. 4

FIG. 4 is a diagram showing a processing flow example by the ophthalmic system 1. The ophthalmic system 1 acquires a moving image of a subject's eye with the acquiring unit 120 (step S110). The ophthalmic system 1 analyzes the moving image of the subject's eye with the analyzing unit 130 (step S120). The ophthalmic system 1 generates, based on the analysis result by the analyzing unit 130, a classification result of classifying the subject's eye with respect to a predetermined ophthalmic disease with the assessing unit 140 (step S130). The ophthalmic system 1 generates diagnosis support information based on the classification result generated by the assessing unit 140 with the diagnosis support information generating unit 150 (step S140). The ophthalmic system 1 controls output of the diagnosis support information with the output control unit 160 (step S150).

Figure 5:
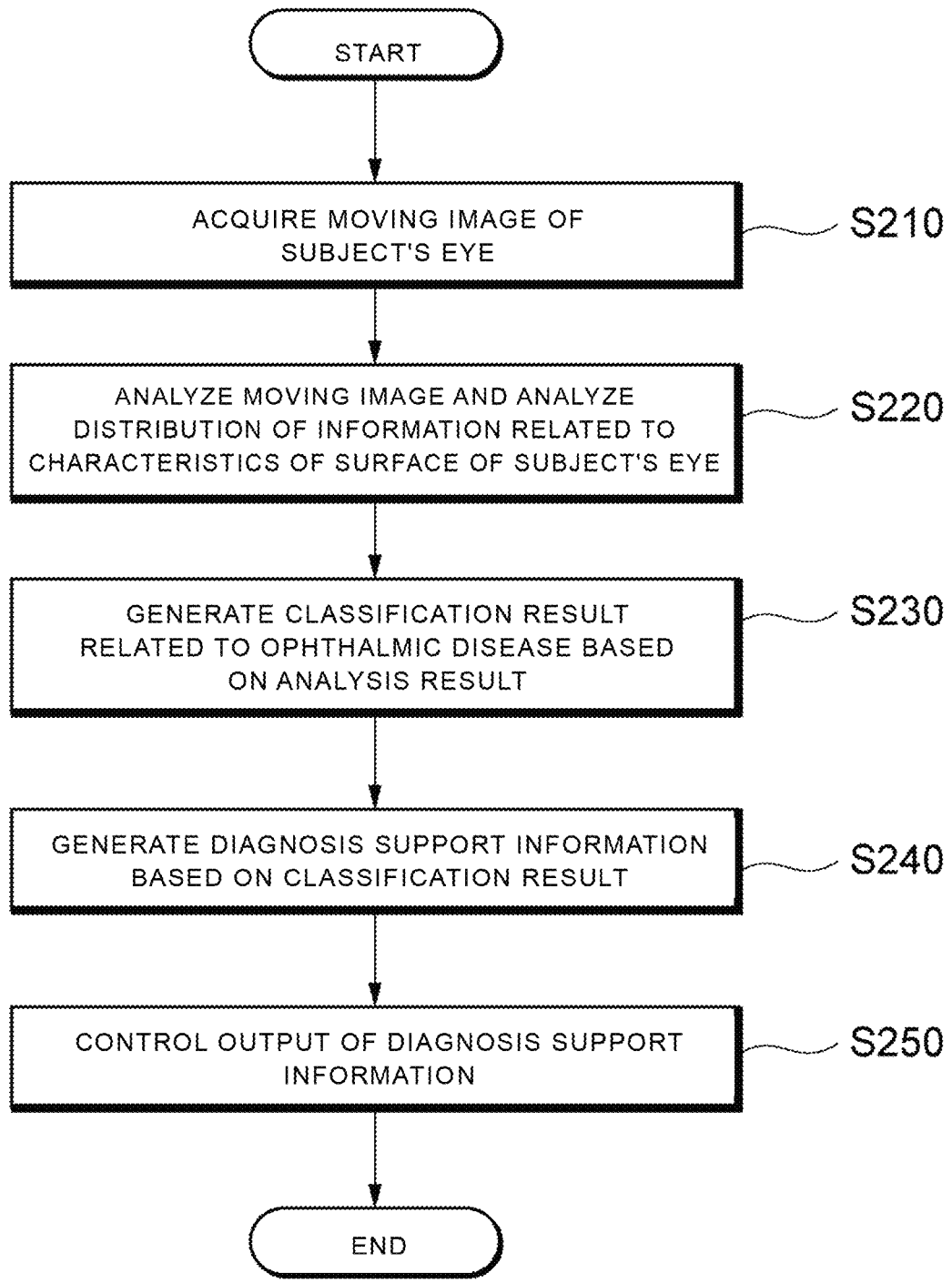
FIG. 5 is a diagram showing a processing flow example of the ophthalmic system according to the aspect of the present disclosure.

Second Operation Example: Refer to FIG. 5

FIG. 5 is a diagram showing a processing flow example by the ophthalmic system 1. The ophthalmic system 1 acquires a moving image of a subject's eye with the acquiring unit 120 (step S210). The ophthalmic system 1 analyzes a spatial and/or temporal distribution of information related to characteristics of a surface of the subject's eye based on the moving image of the subject's eye with the analyzing unit 130 (step S220). The ophthalmic system 1 generates, based on the analysis result by the analyzing unit 130, a classification result of classifying the subject's eye with respect to a predetermined ophthalmic disease with the assessing unit 140 (step S230). The ophthalmic system 1 generates diagnosis support information based on the classification result generated by the assessing unit 140 with the diagnosis support information generating unit 150 (step S240). The ophthalmic system 1 controls output of the diagnosis support information with the output control unit 160 (step S250).

Figure 6:
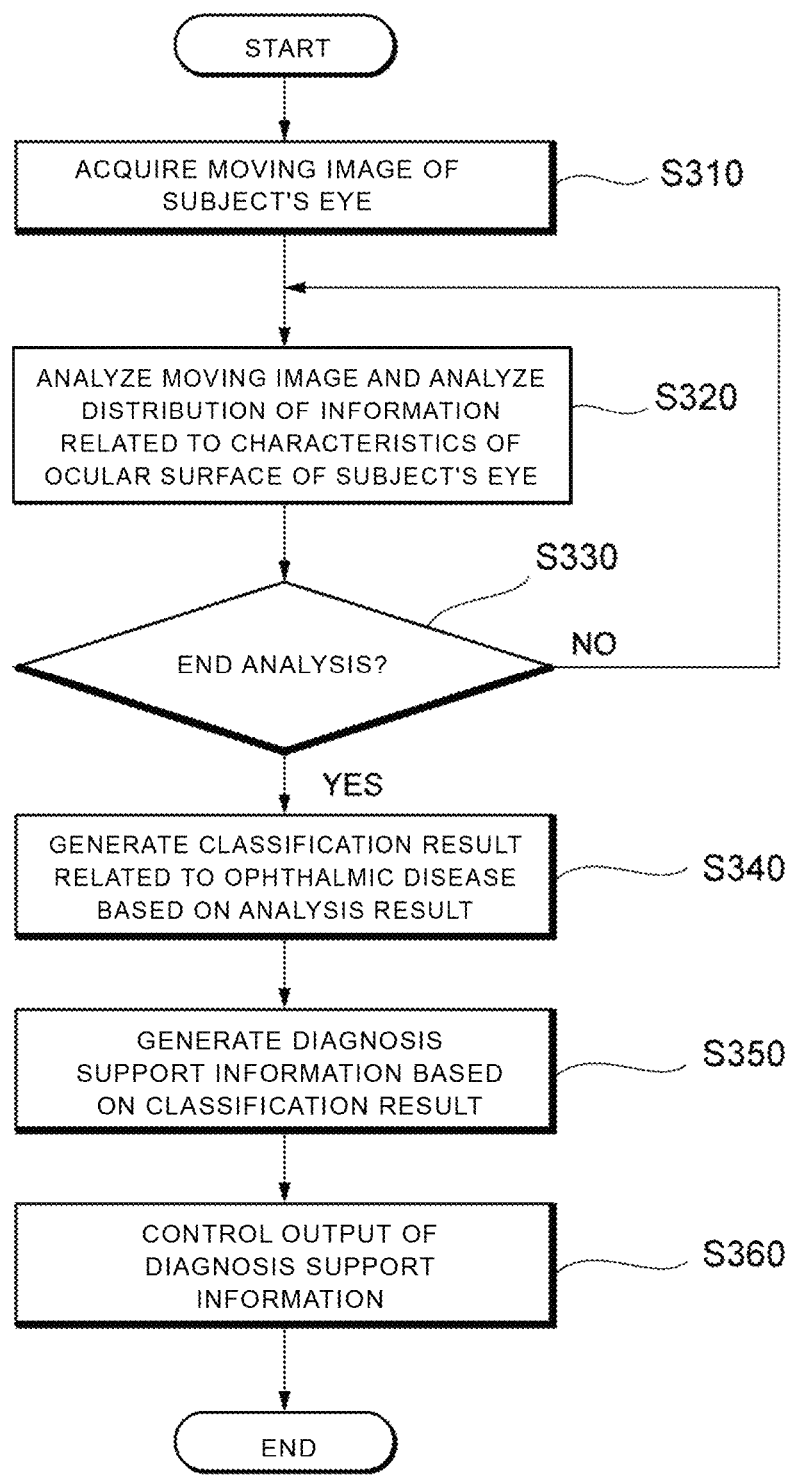
FIG. 6 is a diagram showing a processing flow example of the ophthalmic system according to the aspect of the present disclosure.

Third Operation Example: Refer to FIG. 6

FIG. 6 is a diagram showing a processing flow example by the ophthalmic system 1. The ophthalmic system 1 acquires a moving image of a subject's eye with the acquiring unit 120 (step S310). The ophthalmic system 1 analyzes a spatial and/or temporal distribution of information related to characteristics of a surface of the subject's eye based on the moving image of the subject's eye with the analyzing unit 130 (step S320). The ophthalmic system 1 determines whether or not to end the analysis process with the analyzing unit 130 (step S330).

When the analysis is not to be ended (step S330: NO), the ophthalmic system 1 returns to step S320 and repeats processing until a determination to end the analysis is made. When the analysis is to be ended (step S330: YES), the ophthalmic system 1 generates, based on the analysis result by the analyzing unit 130, a classification result of classifying the subject's eye with respect to a predetermined ophthalmic disease with the assessing unit 140 (step S340). The ophthalmic system 1 generates diagnosis support information based on the classification result generated by the assessing unit 140 with the diagnosis support information generating unit 150 (step S350). The ophthalmic system 1 controls output of the diagnosis support information with the output control unit 160 (step S360).

Figure 7:
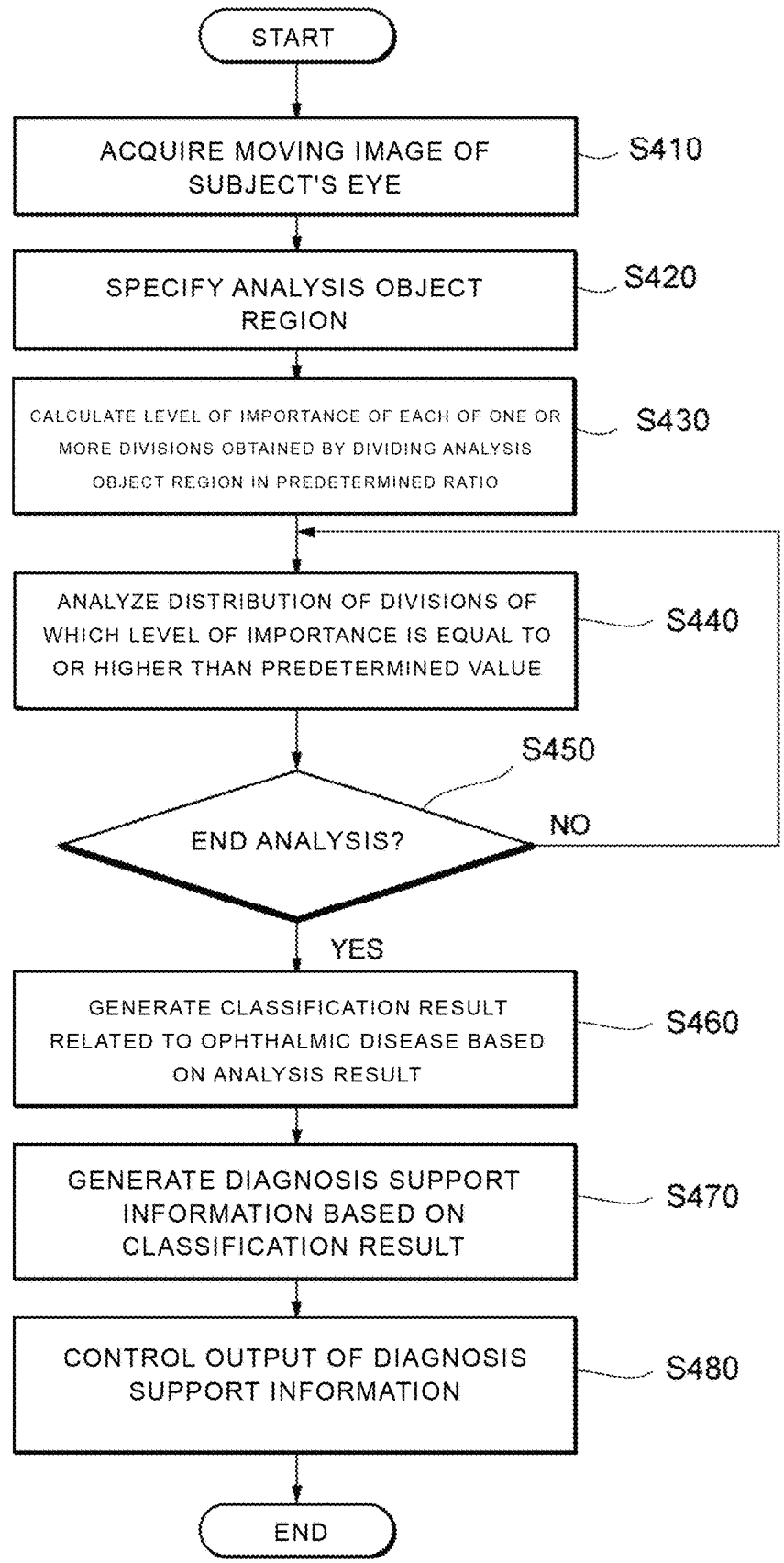
FIG. 7 is a diagram showing a processing flow example of the ophthalmic system according to the aspect of the present disclosure.

Fourth Operation Example: Refer to FIG. 7

FIG. 7 is a diagram showing a processing flow example by the ophthalmic system 1. The ophthalmic system 1 acquires a moving image of a subject's eye with the acquiring unit 120 (step S410). The ophthalmic system 1 specifies an analysis object region in the subject's eye based on the moving image of the subject's eye with the analyzing unit 130 (step S420).

The ophthalmic system 1 calculates a level of importance of one or more divisions obtained by dividing the analysis object region in a predetermined ratio with the analyzing unit 130 (step S430). The level of importance may be calculated based on one or more selected from a degree of dissociation from a predetermined criterion set in advance, a degree of deviation from the predetermined criterion, a degree of coincidence with the predetermined reference, and the like.

The ophthalmic system 1 analyzes a spatial and/or temporal distribution of divisions of which the level of importance is equal to or higher than a predetermined value with the analyzing unit 130 (step S440). The ophthalmic system 1 determines whether or not to end the analysis process with the analyzing unit 130 (step S450). When the analysis is not to be ended (step S450: NO), the ophthalmic system 1 returns to step S440 and repeats processing until the analysis is ended. When the analysis is to be ended (step S450: YES), the ophthalmic system 1 generates, based on the result of the analysis by the analyzing unit 130, a classification result of classifying the subject's eye with respect to a predetermined ophthalmic disease with the assessing unit 140 (step S460). The ophthalmic system 1 generates diagnosis support information based on the classification result generated by the assessing unit 140 with the diagnosis support information generating unit 150 (step S470). The ophthalmic system 1 controls output of the diagnosis support information with the output control unit 160 (step S480).

Figure 8:
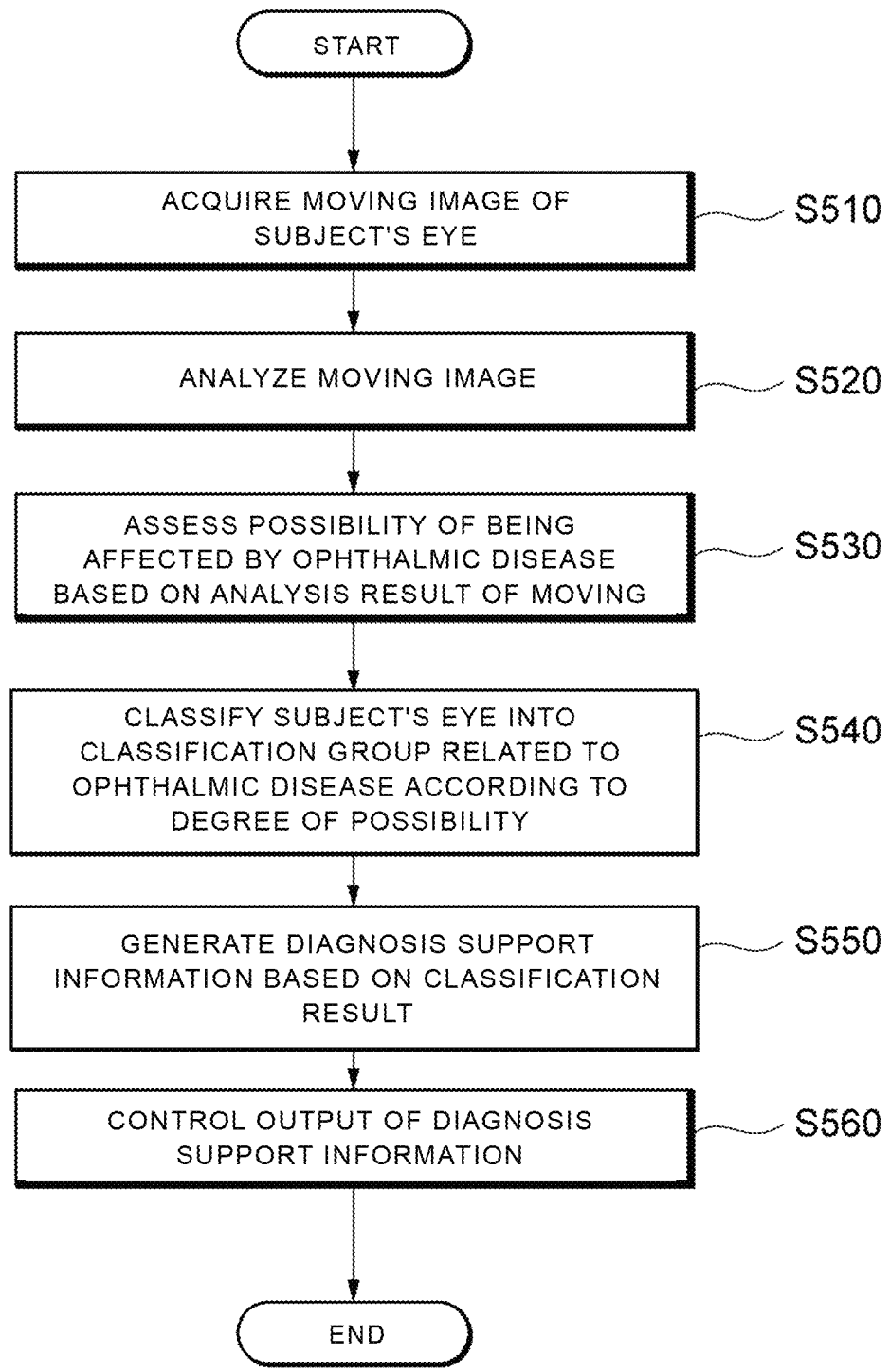
FIG. 8 is a diagram showing a processing flow example of the ophthalmic system according to the aspect of the present disclosure.

Fifth Operation Example: Refer to FIG. 8

FIG. 8 is a diagram showing a processing flow example by the ophthalmic system 1. The ophthalmic system 1 acquires a moving image of a subject's eye with the acquiring unit 120 (step S510). The ophthalmic system 1 analyzes the moving image of the subject's eye with the analyzing unit 130 (step S520). The ophthalmic system 1 assesses the possibility of the subject's eye being affected by a predetermined ophthalmic disease based on the analysis result by the analyzing unit 130 (step S530) and classifies the subject's eye into a classification group related to the ophthalmic disease in accordance with a degree of the possibility with the assessing unit 140 (step S540). The ophthalmic system 1 generates diagnosis support information based on the classification result generated by the assessing unit 140 with the diagnosis support information generating unit 150 (step S550). The ophthalmic system 1 controls output of the diagnosis support information with the output control unit 160 (step S560).

Figure 9:
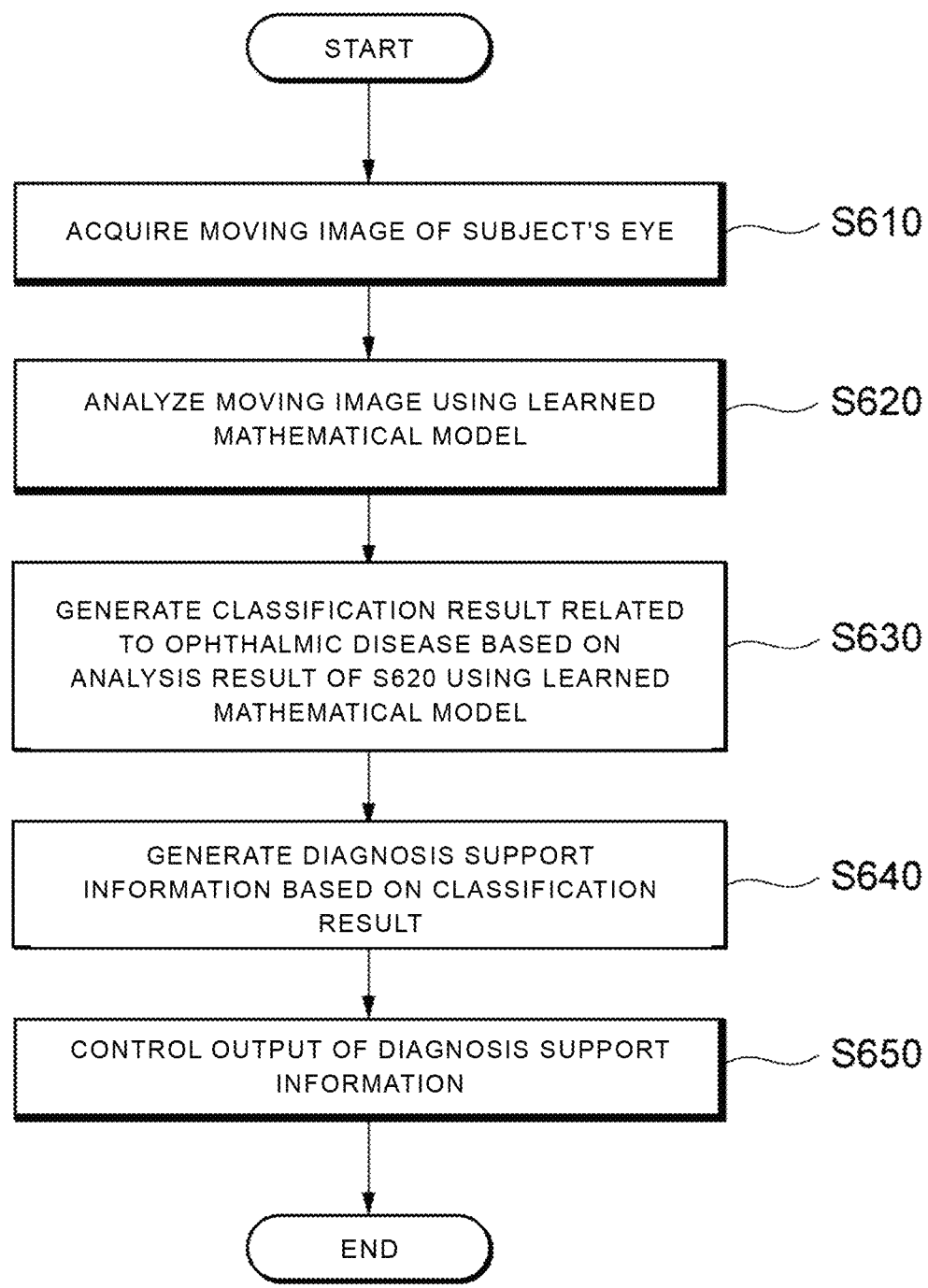
FIG. 9 is a diagram showing a processing flow example of the ophthalmic system according to the aspect of the present disclosure.

Sixth Operation Example: Refer to FIG. 9

FIG. 9 is a diagram showing a processing flow example by the ophthalmic system 1. The ophthalmic system 1 acquires a moving image of a subject's eye with the acquiring unit 120 (step S610). The ophthalmic system 1 analyzes the moving image of the subject's eye using a learned mathematical model with the analyzing unit 130 (step S620). The ophthalmic system 1 generates a classification result related to the ophthalmic disease using the learned mathematical model with the assessing unit 140 (step S630). At this point, the learned mathematical model may use the analysis result having been analyzed in step S620. The ophthalmic system 1 generates diagnosis support information based on the classification result generated by the assessing unit 140 with the diagnosis support information generating unit 150 (step S640). The ophthalmic system 1 controls output of the diagnosis support information with the output control unit 160 (step S650).

Figure 10:
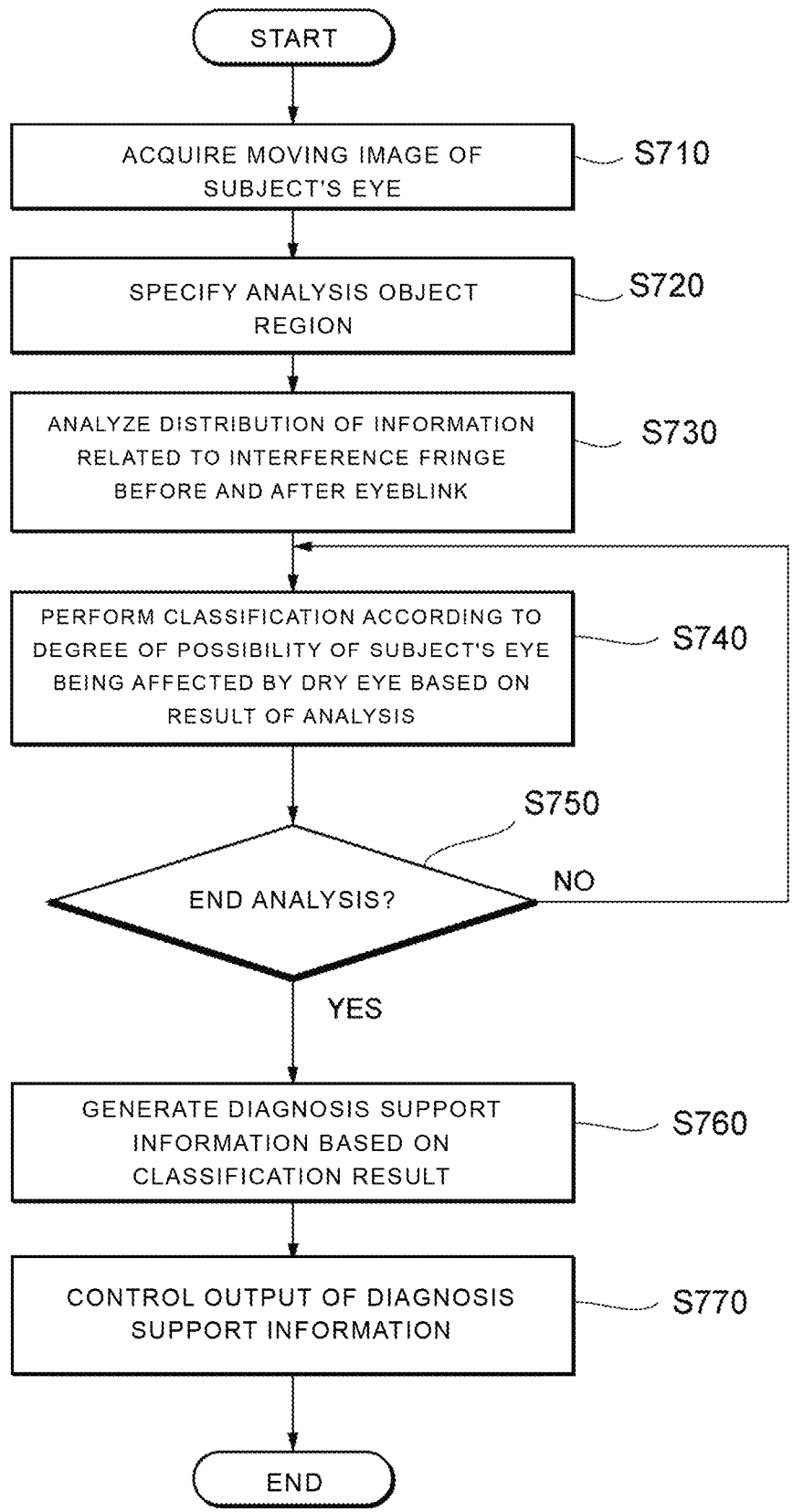
FIG. 10 is a diagram showing a processing flow example of the ophthalmic system according to the aspect of the present disclosure.

Seventh Operation Example: Refer to FIG. 10

FIG. 10 is a diagram showing a processing flow example by the ophthalmic system 1. The ophthalmic system 1 acquires a moving image of a subject's eye with the acquiring unit 120 (step S710). The ophthalmic system 1 specifies an analysis object region in the subject's eye based on the moving image of the subject's eye (step S720) and analyzes a distribution of information that contributes to processing of classifying the subject's eye into a classification group in accordance with a degree of possibility of being affected by dry eye (in this case, information related to an interference fringe before and after eyeblink) with the analyzing unit 130 (step S730). The ophthalmic system 1 assesses the possibility of the subject's eye being affected by dry eye based on the analysis result by the analyzing unit 130 and classifies the subject's eye in accordance with a degree of the possibility with the assessing unit 140 (step S740).

The ophthalmic system 1 determines whether or not to end the analysis process with the analyzing unit 130 (step S750). When the analysis is not to be ended (step S750: NO), the ophthalmic system 1 returns to step S740 and repeats processing until the analysis is ended. When the analysis is to be ended (step S750: YES), the ophthalmic system 1 generates, based on the analysis result by the analyzing unit 130, a classification result of classifying the subject's eye with respect to dry eye (in this case, a classification result of classifying the subject's eye in accordance with a degree of possibility of being affected by dry eye) with the assessing unit 140 (step S760). The ophthalmic system 1 controls output of the diagnosis support information with the output control unit 160 (step S770).

Figure 11:
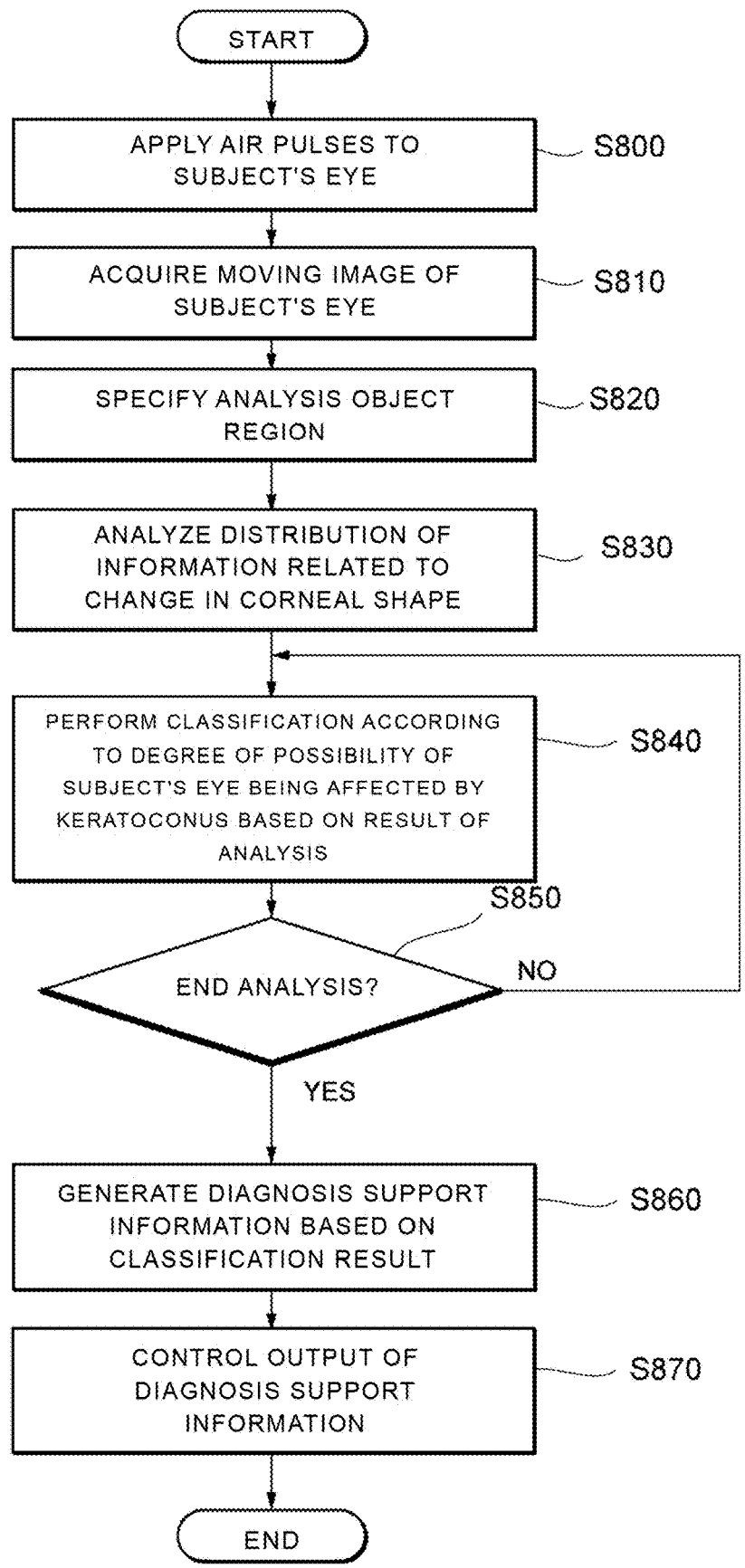
FIG. 11 is a diagram showing a processing flow example of the ophthalmic system according to the aspect of the present disclosure.

Eighth Operation Example: Refer to FIG. 11

FIG. 11 is a diagram showing a processing flow example by the ophthalmic system 1. Air pulses are applied to a subject's eye to impart external stress (step S800). The ophthalmic system 1 acquires a moving image capturing a change in a corneal shape of the subject's eye that occurs as a reaction to the air pulses with the acquiring unit 120 (step S810). The ophthalmic system 1 specifies an analysis object region in the subject's eye based on the moving image of the subject's eye (step S820) and analyzes a distribution of information that contributes to processing of classifying the subject's eye into a classification group in accordance with a degree of possibility of being affected by keratoconus (in this case, information related to a change in a corneal shape of the subject's eye that occurs as a reaction to the air pulses) with the analyzing unit 130 (step S830). The ophthalmic system 1 assesses the possibility of the subject's eye being affected by keratoconus based on the analysis result by the analyzing unit 130 and classifies the subject's eye in accordance with a degree of the possibility with the assessing unit 140 (step S840).

The ophthalmic system 1 determines whether or not to end the analysis process with the analyzing unit 130 (step S850). When the analysis is not to be ended (step S850: NO), the ophthalmic system 1 returns to step S840 and repeats processing until the analysis is ended. When the analysis is to be ended (step S850: YES), the ophthalmic system 1 generates, based on the analysis result by the analyzing unit 130, a classification result of classifying the subject's eye with respect to keratoconus (in this case, a classification result of classifying the subject's eye in accordance with a degree of possibility of being affected by keratoconus) with the assessing unit 140 (step S860). The ophthalmic system 1 controls output of the diagnosis support information with the output control unit 160 (step S870).

EXAMPLES

First Example

In an embodiment, the assessing unit 140 performs classification with respect to a plurality of ophthalmic diseases.

In an embodiment, assessment information related to ophthalmic diseases includes information specifying two or more ophthalmic diseases which the subject's eye is affected by or which there is a possibility that the subject's eye is affected by.

Since the ophthalmic system 1 according to the present embodiment assesses a possibility of being affected by an ophthalmic disease by capturing an abnormality occurring on an ocular surface that is reflected in a moving image of the eyeball, classification into eyeballs with fragility of the cornea or the sclera or eyeballs affected by or having a possibility of being affected by an ophthalmic disease that can cause a lesion on the ocular surface and into normal eyes can be performed and the ophthalmic system 1 can be applied to classification related to various ophthalmic diseases. Therefore, during classification related to a predetermined ophthalmic disease, classification related to other underlying ophthalmic diseases may be performed in parallel.

The diagnosis support information generating unit 150 generates diagnosis support information for supporting a diagnosis of the plurality of ophthalmic diseases in a subject's eye based on the result of the plurality of classifications generated by the assessing unit 140.

According to this aspect, since a possibility of being affected by a plurality of ophthalmic diseases can be learned, efficient ophthalmic diagnoses can be supported.

Second Example

In an embodiment, the analyzing unit 130 analyzes a change over time of a spatial and/or temporal distribution of information related to characteristics of the ocular surface of the subject's eye by sequentially processing each of one or more frames constituting a moving image of the subject's eye.

The assessing unit 140 assesses a possibility of the subject's eye being affected by an ophthalmic disease based on at least one or more of an analysis object region, a distribution of information related to the characteristics, and the change over time of the distribution, and classifies the subject's eye into a classification group related to a predetermined ophthalmic disease in accordance with a degree of the possibility.

According to this aspect, the ophthalmic system 1 can make an assessment by tracking a change over time of information contained in a moving image of the subject's eye.

Third Example

In an embodiment, the analyzing unit 130 analyzes a change over time of a spatial and/or temporal distribution of information related to characteristics of the surface of the subject's eye by comparing results of processing one or more frames constituting a moving image of the subject's eye.

For example, the analyzing unit 130 may analyze a change over time of a spatial and/or temporal distribution of information related to characteristics of the surface of the subject's eye by comparing average values of the spatial and/or temporal distribution of information related to characteristics of the surface of the subject's eye between a first frame group including one or more frames in a first period and a second frame group including one or more frames in a second period. The analyzing unit 130 may analyze a change over time of a spatial distribution of information related to characteristics of the surface of the subject's eye by comparing spatial distributions of the information related to characteristics of the surface of the subject's eye between a first frame at a first time point and a second frame at a second time point.

The assessing unit 140 assesses a possibility of the subject's eye being affected by an ophthalmic disease based on at least one or more of an analysis object region, a distribution of information related to the characteristics, and the change over time of the distribution, and classifies the subject's eye into a classification group related to a predetermined ophthalmic disease in accordance with a degree of the possibility.

According to this aspect, the ophthalmic system 1 can make an assessment by tracking a change over time of information contained in a moving image of the subject's eye.

Fourth Example

In an embodiment, the analyzing unit 130 calculates a level of importance of one or more divisions obtained by dividing an analysis object region in a predetermined ratio based on the distribution of information related to characteristics of the ocular surface of the subject's eye in the analysis object region and analyzes a spatial and/or temporal distribution of divisions of which the level of importance is equal to or higher than a predetermined threshold.

The assessing unit 140 assesses a possibility of the subject's eye being affected by an ophthalmic disease based on at least one or more of the analysis object region, a distribution of information related to the characteristics, and the distribution of the divisions, and classifies the subject's eye into a classification group related to a predetermined ophthalmic disease in accordance with a degree of the possibility.

The level of importance of a division is calculated by collating, for example, information related to characteristics cl which is included in a moving image of training data (correct answer data) of a diseased eye affected by an ophthalmic disease A and which indicates that the diseased eye is affected by the ophthalmic disease A and information related to characteristics cl which is included in a moving image of the subject's eye and which indicates that the subject's eye is affected by the ophthalmic disease A in the learned mathematical model M. In other words, the level of importance is calculated based on a degree of dissociation from correct answer data with a moving image of the subject's eye as a sample. The degree of dissociation from correct answer data may be determined based on brightness of each pixel.

In an embodiment, the predetermined ophthalmic disease is dry eye, and the assessing unit 140 assesses a possibility that the subject's eye is affected by dry eye based on a manner in which divisions where the level of importance calculated by the analyzing unit 130 is equal to or higher than a predetermined threshold are spatially scattered.

In an embodiment, the predetermined ophthalmic disease is keratoconus, and the assessing unit 140 assesses a possibility that the subject's eye is affected by keratoconus based on a manner in which divisions where the level of importance calculated by the analyzing unit 130 is equal to or higher than a predetermined threshold are temporally scattered. In addition, for example, the assessing unit 140 assesses a possibility that the subject's eye is affected by keratoconus based on a manner in which divisions where the level of importance calculated by the analyzing unit 130 is equal to or higher than a predetermined threshold are spatially scattered.

Fifth Example

In an embodiment, the predetermined ophthalmic disease is dry eye and the characteristics of an ocular surface of the subject's eye are an interference fringe before and after eyeblink or a tear meniscus height.

Hereinafter, test examples with respect to diagnosis support of dry eye will be shown.

First Test Example: Diagnosis Support of Dry Eye

Dry eye is an ophthalmic disease in which stability of the tear film declines due to various causes and results in discomfort and visual disturbances and, in some cases, a disorder of the ocular surface. With dry eye, when tear volume decreases or quality drops, stability of the tear film declines and a period of time during which the tear film can be maintained in a stable distribution without blinking becomes shorter. The degree or occurrence of a decrease in the tear volume or a drop in quality varies from one person to the next.

The diagnosis of dry eye by a person requires making a comprehensive judgment based on a plurality of clinical parameters and even a specialist will find it difficult to diagnose dry eye solely based on a moving image of the ocular surface. For example, even with a specialist, it is difficult to accurately confirm kinetics such as a slight change in a mire ring image or an interference fringe of the tear film which are included in a moving image of the ocular surface.

In recent years, although simple dry eye diagnostic systems have been developed from the perspective of streamlining ophthalmic diagnoses, since judgments are made based on a subjective index submitted as a response by a patient without performing a clinical examination, it is difficult to eliminate a risk of a presence of a discrepancy with clinical findings.

The present inventors carried out tests involving supporting diagnoses of dry eye using a moving image of an ocular surface of a subject's eye. Methods and results were as described below.

1. Method
1-1. Subject's Eye

A total of 128 eyes of 128 patients with dry eye having visited ophthalmic medical institutions and a total of 116 eyes of normal people were considered subjects' eyes.

1-2. Preliminarily Classification of Diseased Eyes and Normal Eyes

With respect to all subjects, examinations were performed by posing questions with respect to the presence or absence of subjective eye symptoms and by using clinical parameter indexes.

The examination involving posing questions with respect to the presence or absence of subjective eye symptoms was assessed on a numerical scale of 0 to 4 according to a 12-item Ocular Surface Disease Index (OSDI) questionnaire. A total OSDI score was calculated based on the following formula: OSDI=[(sum of scores for all questions)×100]/[total number of answered questions)×4]. A total OSDI indicates that, within a range of 0 to 100, the higher the score, the greater the disorder.

The examination using clinical parameter indexes was performed with respect to the following items.
(1) Measurement of TMH and NIBUT,
(2) observation of eyelid with a slit lamp microscopy,
(3) measurement of fluorescein break-up time (FBUT),
(4) staining of corneal and conjunctival surface using a fluorescein dye, and
(5) Schirmer's test.

FBUT was measured by applying a fluorescein strip to the inferior palpebral conjunctiva after instilling a drop of normal saline. A mean time of three attempts was recorded.

After the measurement of FBUT, corneal and conjunctival staining was assessed from 0 to 3 according to the National Eye Institute (NEI) Industry Workshop scale and assessed from 0 to 33 based on the pattern of fluorescein staining observed on a slit lamp microscopy.

Schirmer's test I was performed without topical anesthesia and the amount of wetting after 5 minutes was recorded.

A normal eye was defined using the following criteria:
(1) OSDI of less than 12,
(2) absence of corneal or conjunctival epithelial erosion as evidenced by fluorescein staining,
(3) absence of tear film abnormality (NIKBUT (>5 seconds), FBUT (>5 seconds), TMH≥0.20 mm, and Schirmer's test value>5 mm after 5 minutes), and
(4) absence of lid margin abnormality.

A diseased eye was defined using the following criteria:
(1) presence of DE symptoms (OSDI≥12),
(2) presence of corneal or conjunctival epithelial erosion evidenced by fluorescein staining, and
(3) abnormal tear film stability as determined by NIKBUT (≤5 seconds) and/or FBUT (≤5 seconds) TBUT, and/or abnormal tear production determined by TMH<0.20 mm and/or Schirmer's test I (≤5 mm after 5 minutes).

1-3. Photography of Moving Image

A moving image of the subject's eye was photographed using Keratograph 5M (Oculus Gmbh). The moving image was photographed at a speed of 32 frames/second. In addition, the subject was instructed to blink normally and a video recording was extended for the duration of two to three blinks. The photography was performed using white-light Placido ring illumination and adjusting magnification at 5-mm field of view in which interference fringes occur in the tear film.

1-4. Pre-Processing of Moving Image

A total of 244 video clips were collected from all subjects' eyes. The diseased eye group included 128 videos and the normal eye group included 116 videos. Recorded videos were sampled in Matroska video (MKV) and audio video interleaved (AVI) formats at a resolution of 1360×1024 at 8 frames/second. 20 videos were randomly chosen from each group and set aside to be used as a final re-test subset independent of the development (training/testing) datasets.

1-5. Preparation of Training Subset and Testing Subset

Moving image frames of a total of 204 eyes were extracted and horizontally trimmed to the central square maintaining the same image height to get images with 1024×1024 pixels resolution. Next, one researcher reviewed the entire image set (images) manually to exclude images with poor quality, and to manually label all images in which the lids were closed or semi-closed during blinking in both the dry eye group and the normal group. These images were classified as "blinking" group. Then all images were resized to a 224×224 pixel resolution.

The same processes were performed to prepare 40 moving images including a final re-test subset. All image processing steps were performed using Open CV library (version 4.5.4).

1-6. Construction of Mathematical Model

Transfer learning based on three CNN architectures (DenseNet121, Resnet50V2, and InceptionV3) trained in advance with fewer than 27 million parameters was adopted. The models were adjusted to be compatible with input images of size 224×224, and the output (classification) layer was truncated and replaced by a custom model with trainable weights on top with Softmax activation to provide likelihoods of the three classes including diseased eyes, normal eyes, and blinking.

Figure 13:
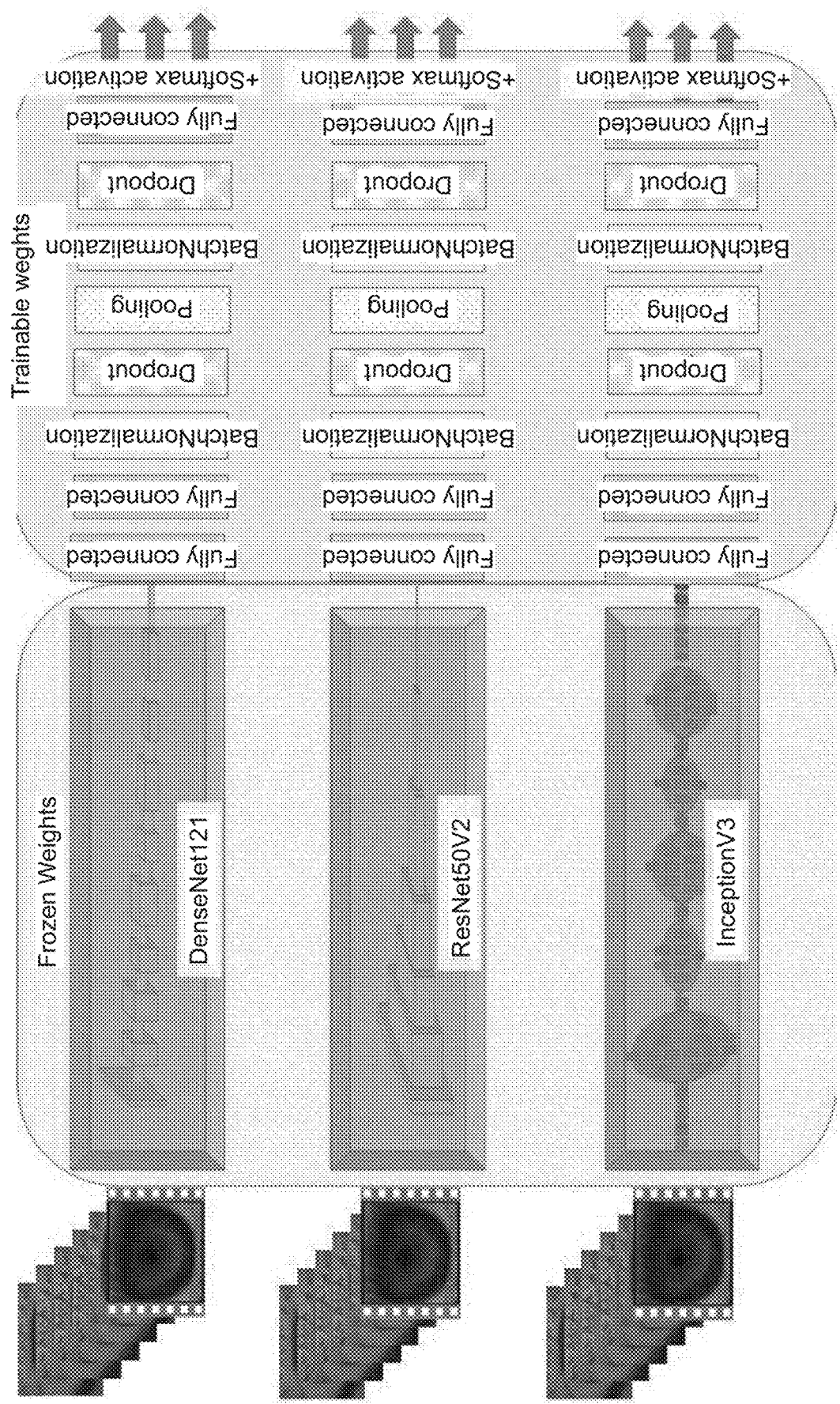
FIG. 13 is a diagram for explaining a first test example.

FIG. 13 shows architectures of the constructed models. The CNN architectures trained in advance were initialized with the loaded ImageNet weights and these weights were kept frozen (not trainable) while the custom-designed models were being trained.

1-7. Data Augmentation and Model Training

In order to minimize the risk of overfitting, traditional image augmentation was performed as augmentation processing for artificially increasing the number of training images. The augmentation processing included minimal rotation, width shift, height shift, scaling, horizontal flip, and zoom. Each model was trained for 200 epochs (iterations) and Categorical cross-entropy was used as loss function. Optimization was performed using an Adam optimizer Batch size was set to 8 for all models.

1-8. Model Testing

After training, the best performance model with the lowest cross-entropy loss was selected. The performance of the selected model was assessed based on the re-set subset. Several objective metrics (accuracy, recall, precision, specificity, F1 score, confusion matrix, receiver operating characteristic (ROC) curve, AUC, and the like) were used for the assessment.

1-9. Comparison of Performance with Human Expert

In order to compare the performance of the models against human experts, 100 frames were selected from the normal eye group and the diseased eye group and 10 duplicate images were included to measure the test-retest variability of the masked experts. Two experienced corneal specialists reviewed the images to infer the correct image classes. The same procedure was repeated on 10 moving images (of which five moving images correspond to the dry eye group (class) and five moving images correspond to the normal group (class)). Inference results for the three CNN models on this binary classification task were also obtained.

To obtain an benchmark performance metrics that allow comparison with each network performance, a support vector machine (SVM) trained as binary classifier to distinguish the diseased eye group based on age, OSDI score, and other ocular examination parameters (TMH, NIKBUT, FBUT, fluorescein staining score, Schirmer's test records, and the like) was also used.

The performances of CNN models and the performance of the SVM model were compared using confusion matrix, ROC curve, AUC, as well as a detection error tradeoff (DET) curve. A DET curve is more useful than an ROC curve when visually assessing a performance of an entire classification algorithm. In addition, a DET curve makes operating point analysis easier for extraction of the point at which a false-negative error rate will improve.

To test unseen moving images, a Python script was developed to initialize a moving image stream, make a prediction on each frame and update the prediction queue by iteratively averaging predictions over previous predictions then timely drawing the prediction activity on the output frame, and finally saving the frames in a moving image format.

The number of predictions in a queue was optimized. More specifically, the number of predictions in a queue (that should be averaged to obtain the final label) was gradually increased to a threshold that effectively prevent prediction flickering when frames are classified by models.

The accuracy of classification of these moving images was defined based on the number of correctly classified frames after averaging the predictions over 20 frames. It was considered that all videos were correctly classified when 50% or more of the total number of averaged predictions were correct.

1-10. Class Activation Map (CAM)

A class activation map (CAM) for a particular class which highlights a region was more important for the CNN that identifies each class. It thus enables a visual inspection of the CNN model decision basis. A desirable CAM was produced by projecting back the weights of the output layer before the final Softmax activation.

In order to better understand a most important image region having affected model decision, an average of images of test subsets and a corresponding averaged CAM were generated. All misclassified frames and CAMs corresponding thereto were excluded. To calculate an mean image of each category, a principal component analysis (PCA) for dimensionality reduction was adopted and CAMs were generated using ResNet50V2. Furthermore, consecutive CAMs were generated using consecutive frames. The CAM frames were used to create a whole CAM video clip which shows regions that inference model's prediction.

1-11. Statistical Analysis

All statistical analyses were performed using SciPy (a computing tool for Python) and Python's scikit-learn libraries (version 0.21.3.35). The scikit-learn is a Python module for machine learning built on SciPy. The subject data were presented as mean±SD. Normality of variables was checked using the Kolmogorov-Smirnov test.

Scores of vital staining and records of Schirmer's test were analyzed using a pair of Student's t-tests. In all analyses, P≤0.05 was considered statistically significant.

McNemar test was performed to compare binary classification performance between CNN models and corneal specialists.

A one-versus-all approach was applied to extend the use of the ROC curve to this three-class problem, in which a class was defined as positive class and the other class defined as a negative class, respectively. The DET curve was used to compare the performance of binary classifiers.

Python programming language (version 3.9.9) was used for the code scripts. Keras Open-source software library (version 2.7.0) was used as an interface for TensorFlow library (version 2.7.0).

NumPy (Numerical Python) which is a core calculation library for Python was used to calculate sample sizes. For the two independent samples, TTestIndPower was used for calculating statistical power using t-tests. A sample size of at least 114 subjects was required for each group (effect size=0.35, alpha error=0.05, power=0.75).

Deep learning calculations were performed on a graphical processing unit (GPU) composed of a personal computer with a Geforce RTX 2060 SUPER graphic card powered by an Nvidia Turing architecture with a CUDA 11.0.126 drive.

2. Result

Figure 14A:
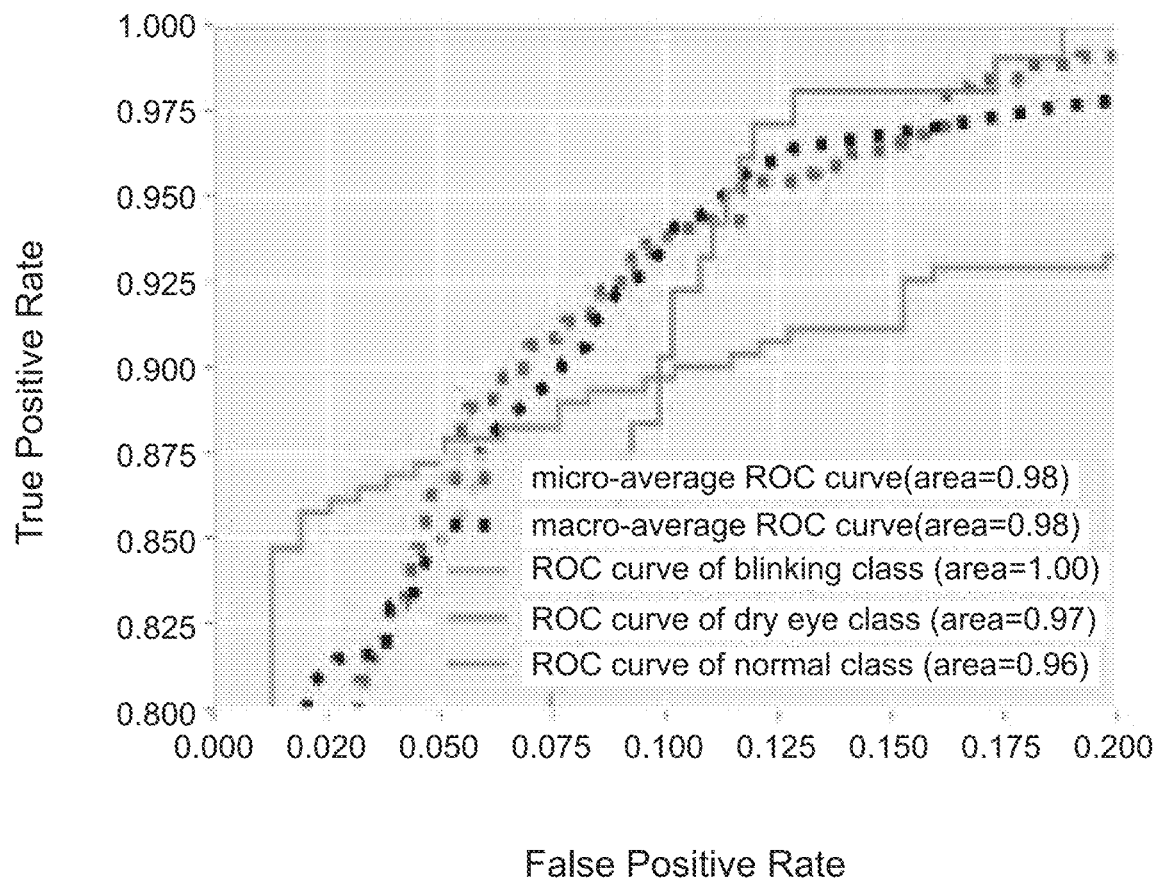
FIGS. 14A, 14B, and 14C are diagrams for explaining the first test example.
Figure 14B:
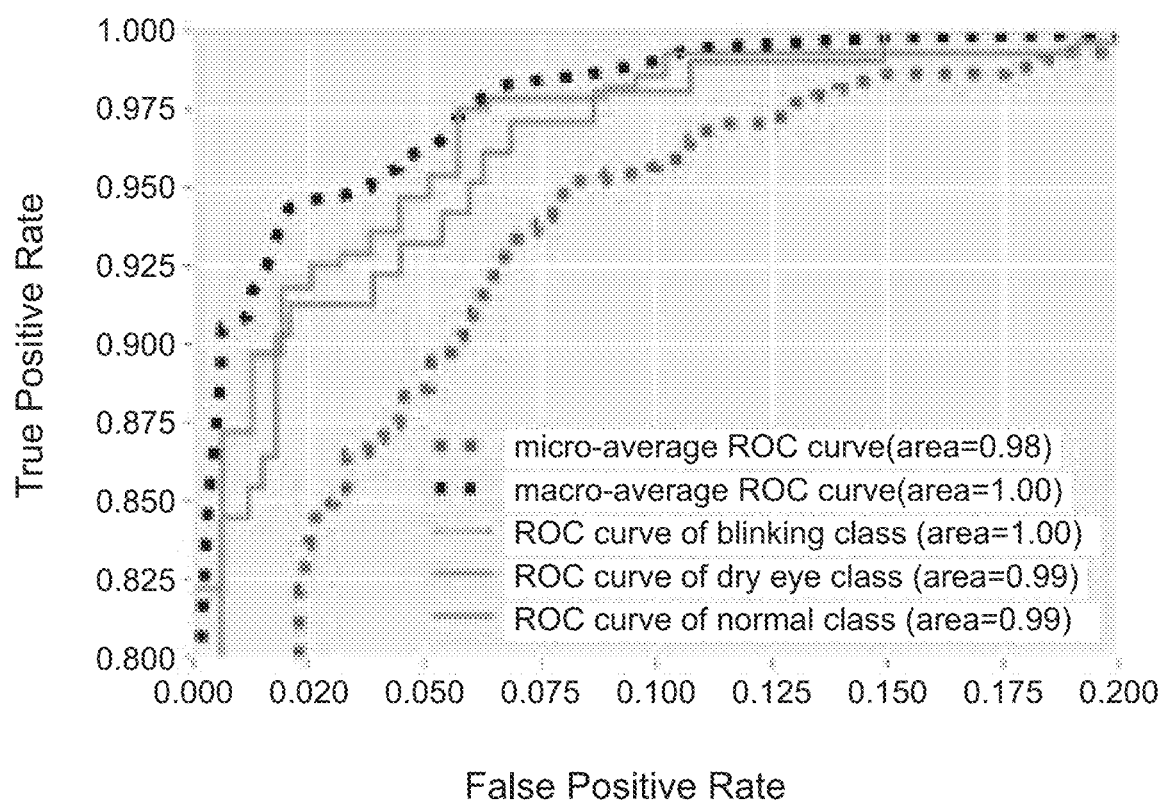
Figure 14C:
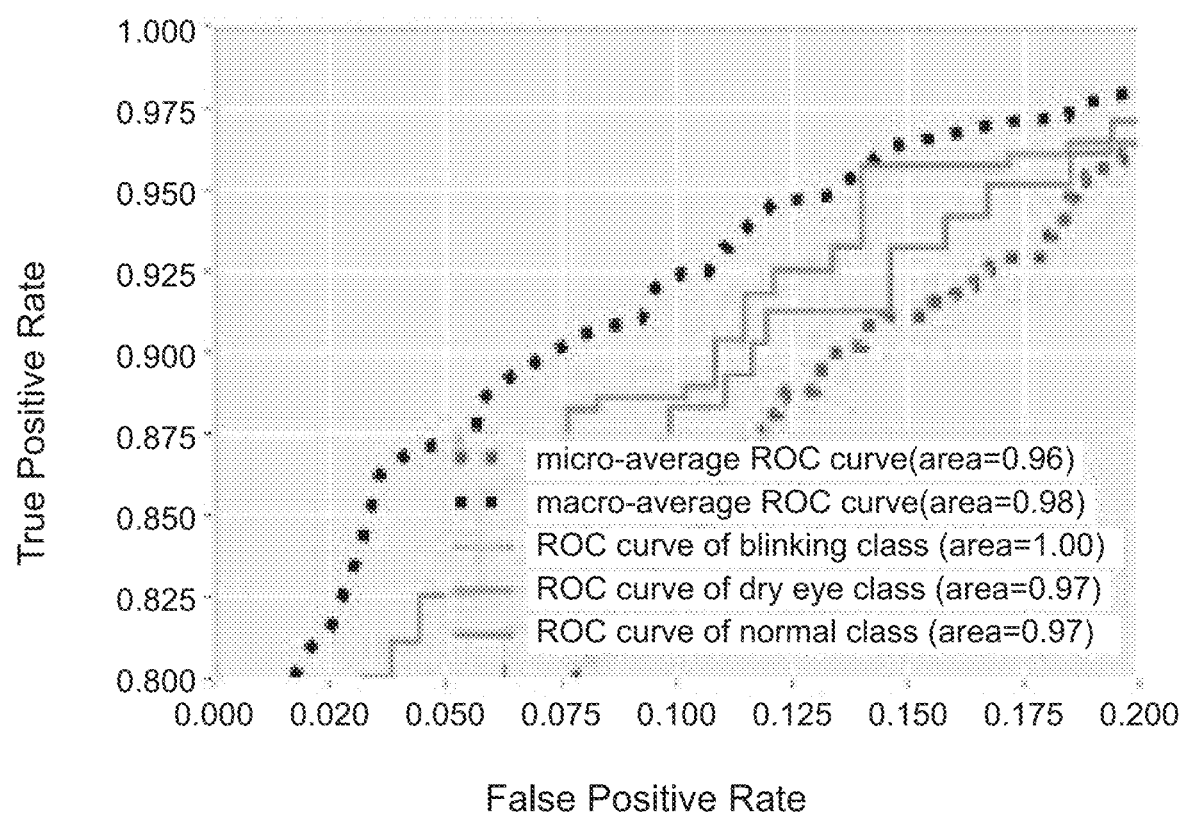

FIGS. 14A-14C show an assessment in a training process of each model. From the ResNst50V2 model, in order to correctly classify the dry eye group, the normal group, and the blinking group, respective AUCs were 0.99, 0.99, and 1.0.

Figure 15:
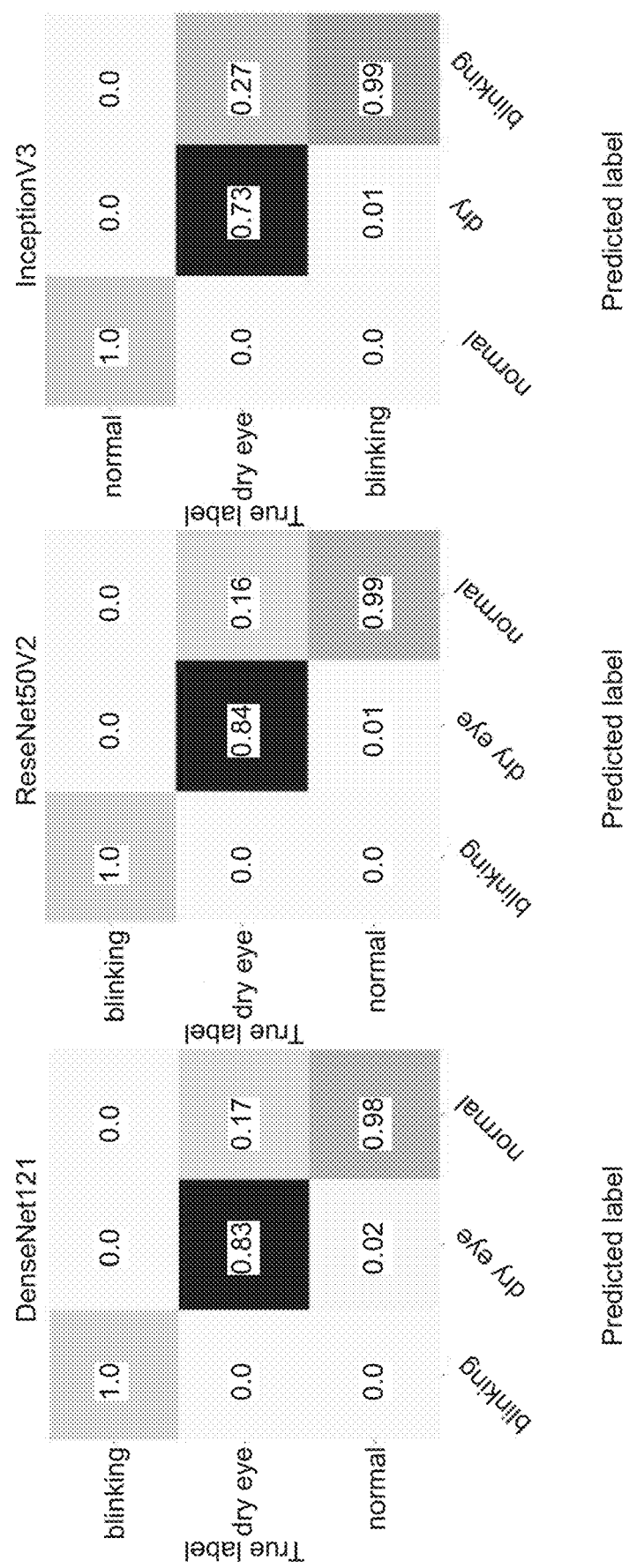
FIG. 15 is a diagram for explaining the first test example.
Figure 17A:
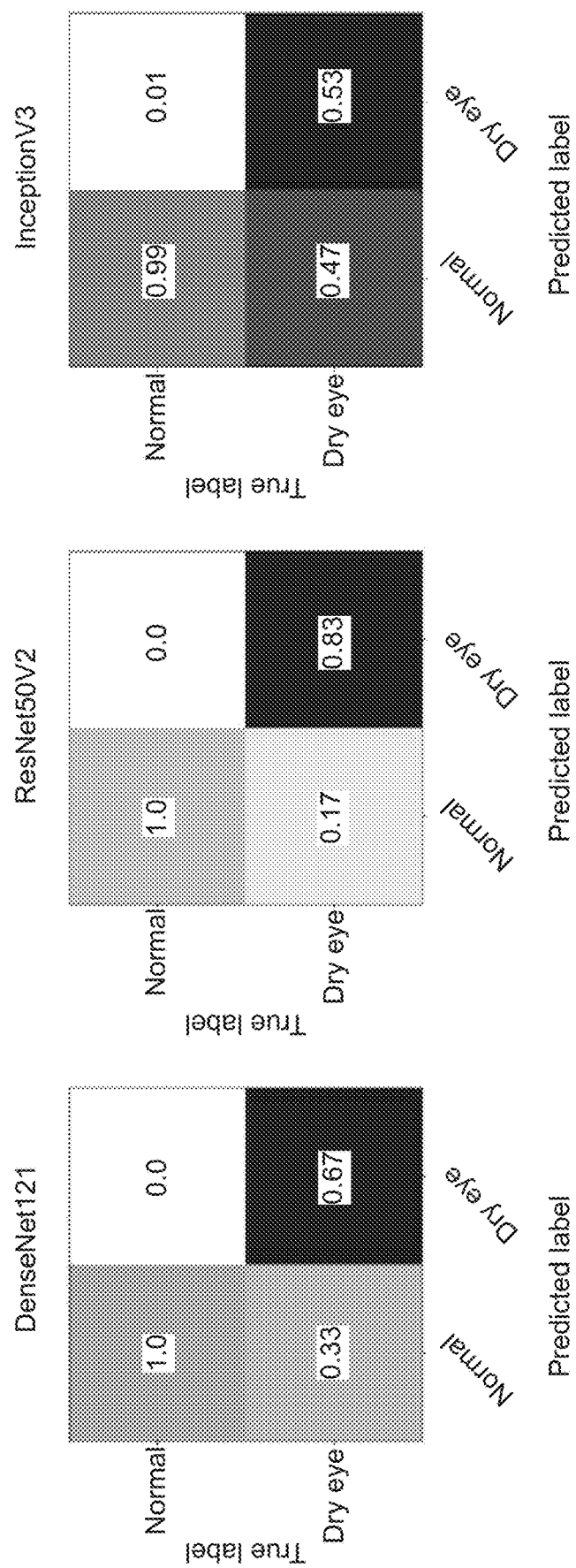
FIGS. 17A and 17B are diagrams for explaining the first test example.
Figure 17B:
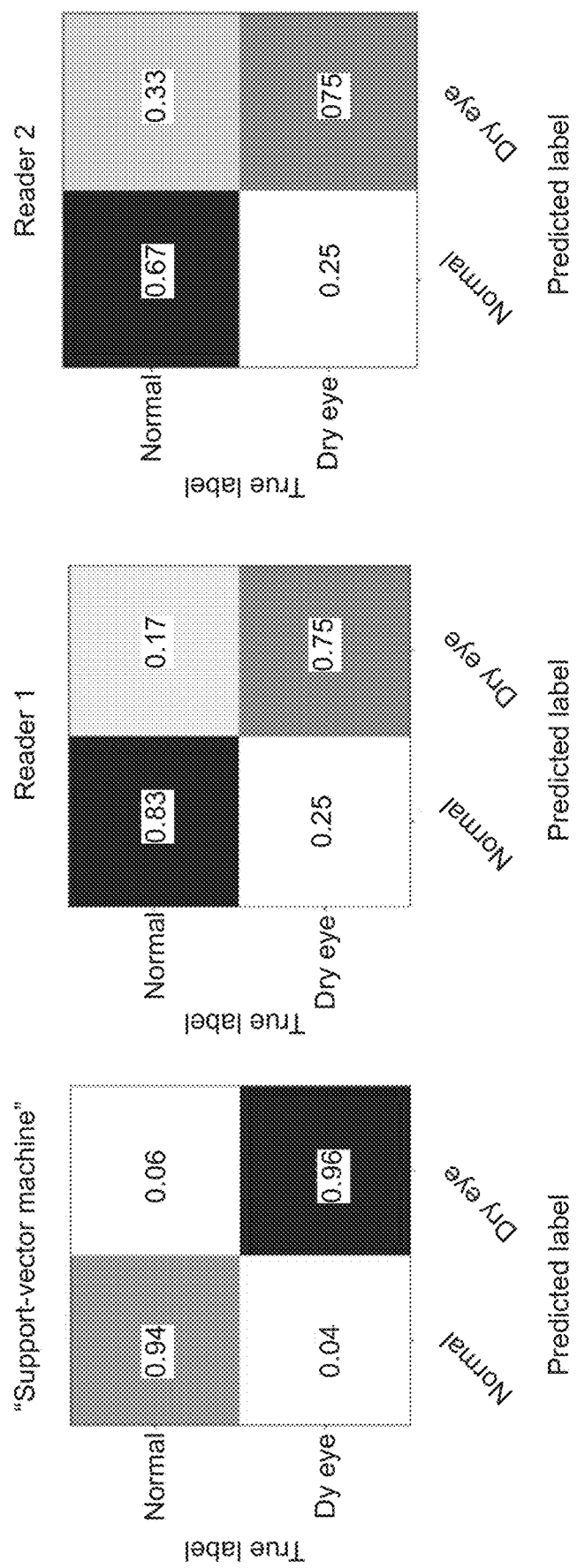

FIG. 15 shows confusion matrices corresponding to the three CNN models.

FIGS. 16A, 16B, 17A, and 17B show a comparison between the performance of binary classification by the human specialists and the SVM model. With respect to the two corneal specialists, agreement rates based on the 10 duplicate frames were 90% and 80%, respectively.

The classification performances of the two specialists with respect to the binary classification task were 0.865 and 0.710, respectively. The accuracy of SVM classification was 0.950, which was significantly higher than the two specialists (p=0.022 and p<0.001 with respect to each of the two specialists). Accuracy scores of the DenseNet201, ResNet502, and Inception V3 CNN models were 0.835, 0.915, and 0.710, respectively. The three CNN models exhibited scores lower than the SVM classification (respectively p=0.032, 0.182, and p<0.001).

All of the moving images were correctly classified by all of the CNN models. Average classification accuracy of test videos for DenseNet121, ResNst50V2, and Inception V3 models were 0.84, 0.91, and 0.80, respectively.

Figure 18A:
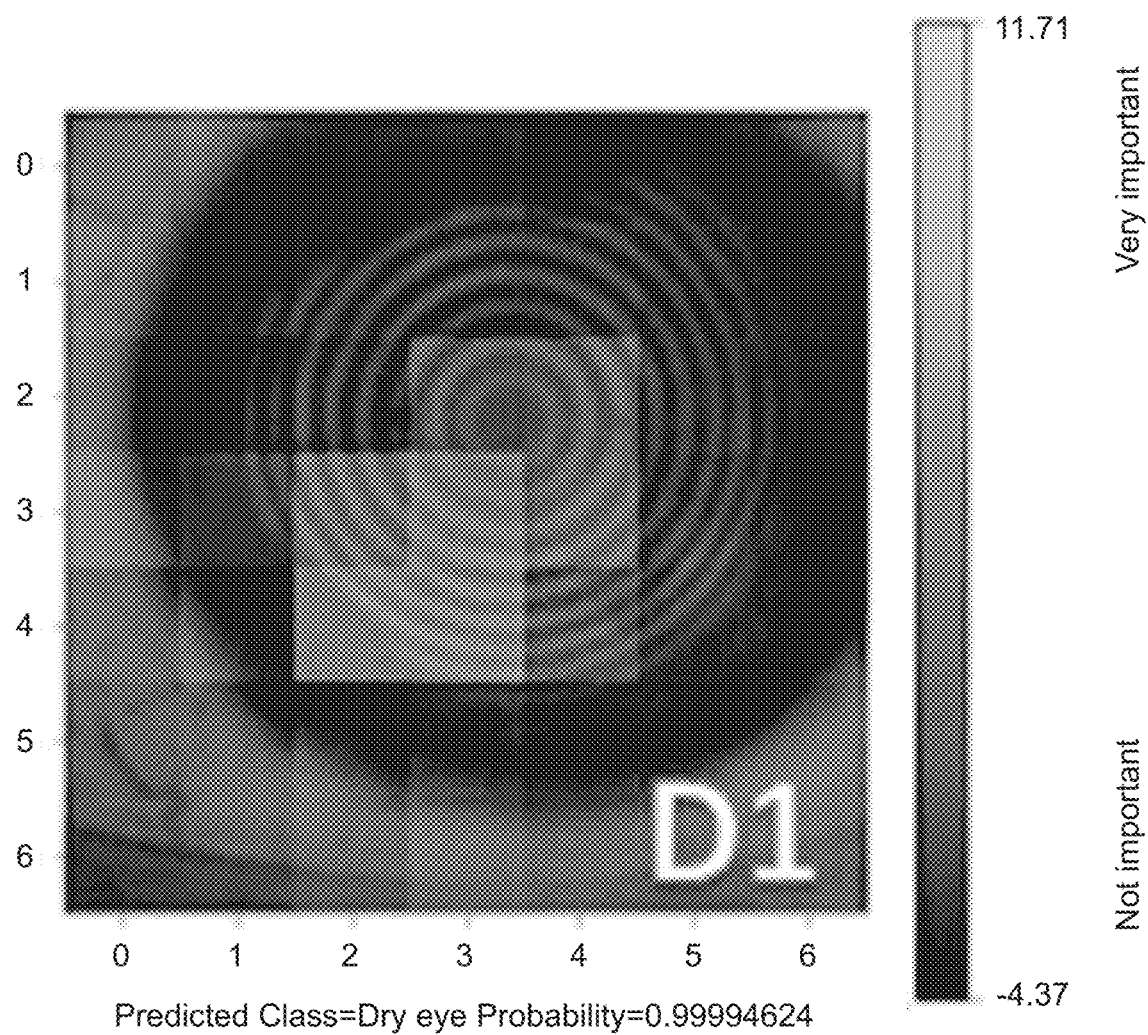
FIGS. 18A, 18B, and 18C are diagrams for explaining the first test example.
Figure 18B:
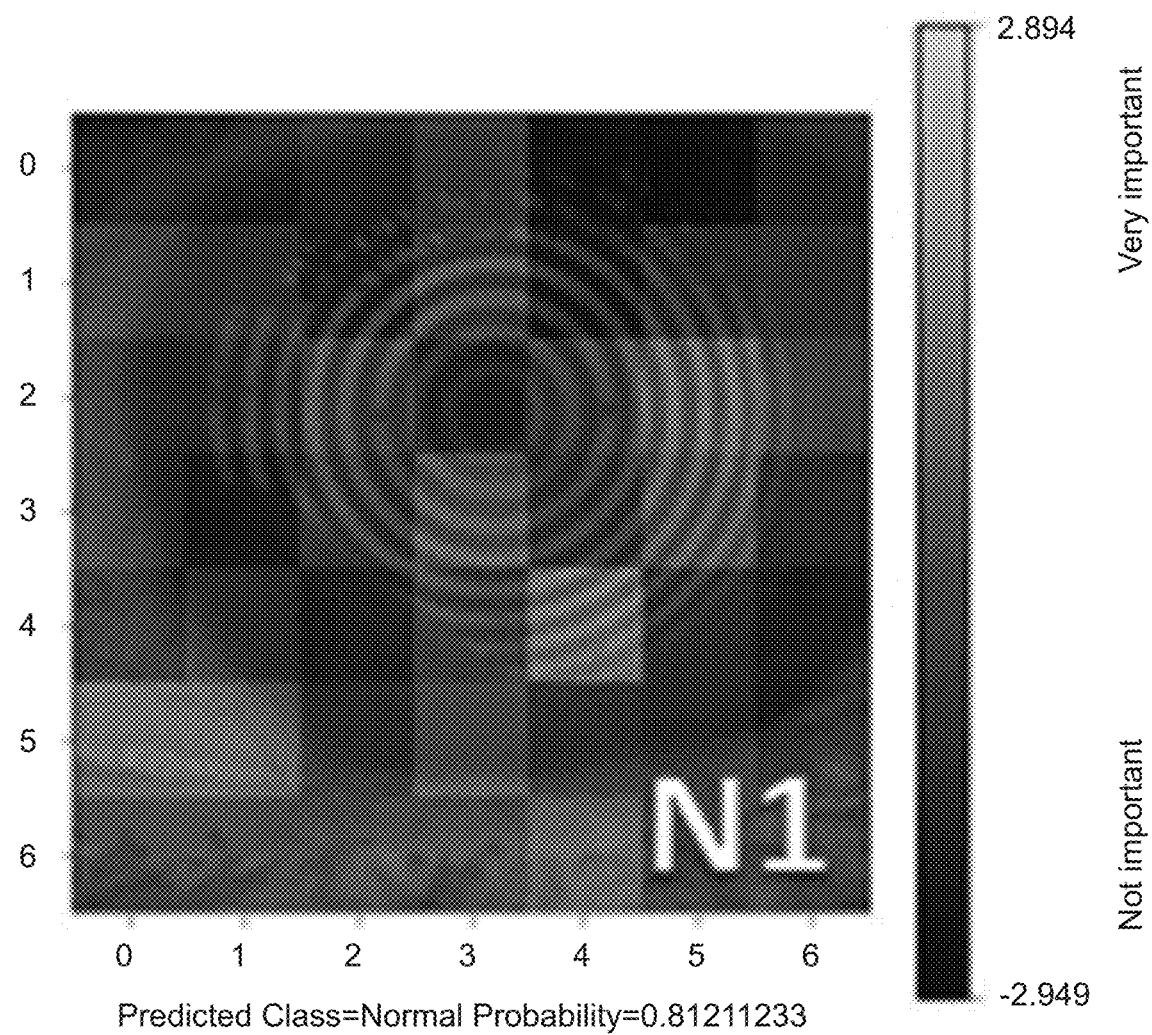
Figure 18C:
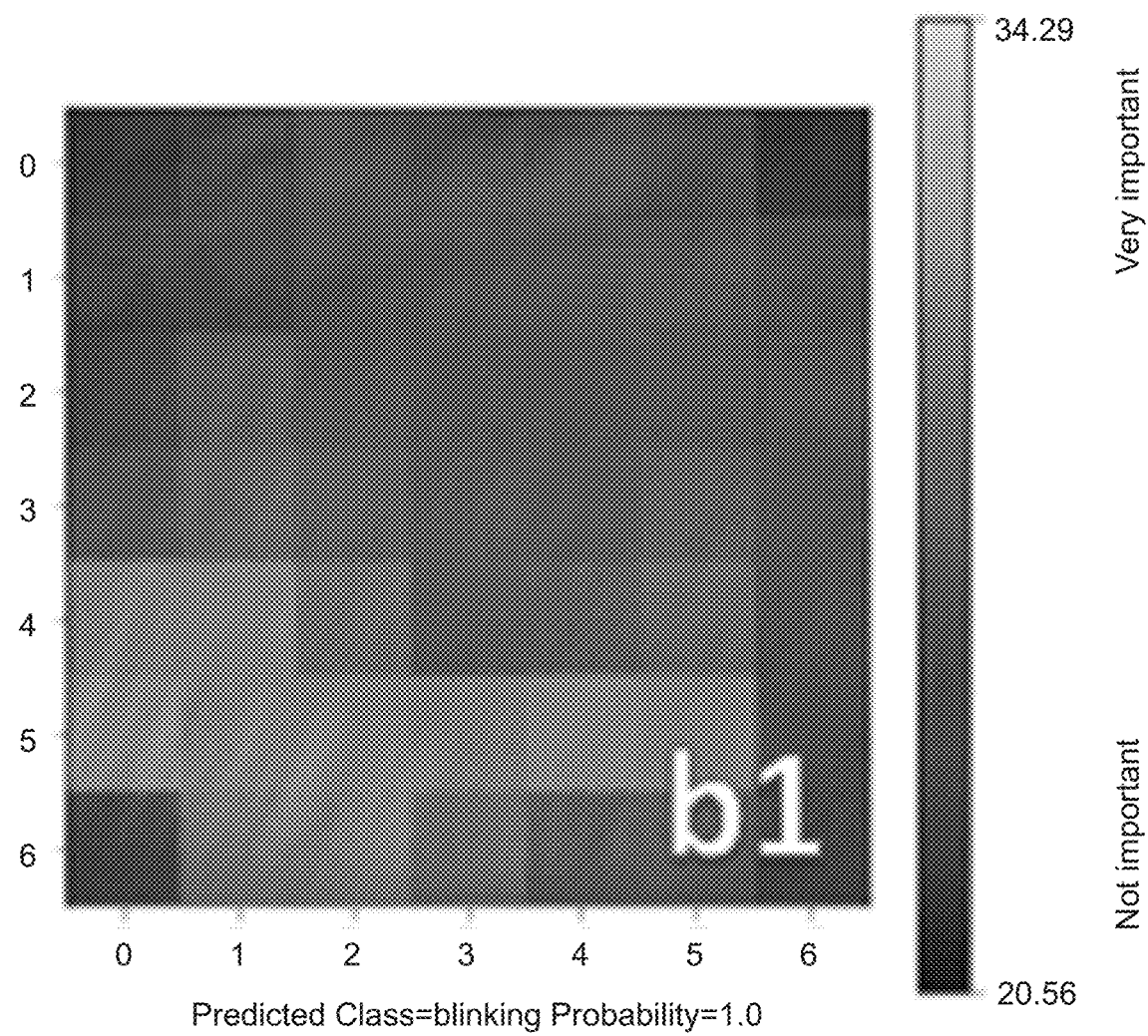

FIGS. 18A-18C show 15 examples of CAM generated by the ResNst50V2 and DenseNet121 models. The CAMs are conceivably capable of clinically valid spatial inference. In most of the images correctly classified as being normal, regions of higher importance were widely scattered by a Mayer's reflex on the corneal surface.

Figure 19:
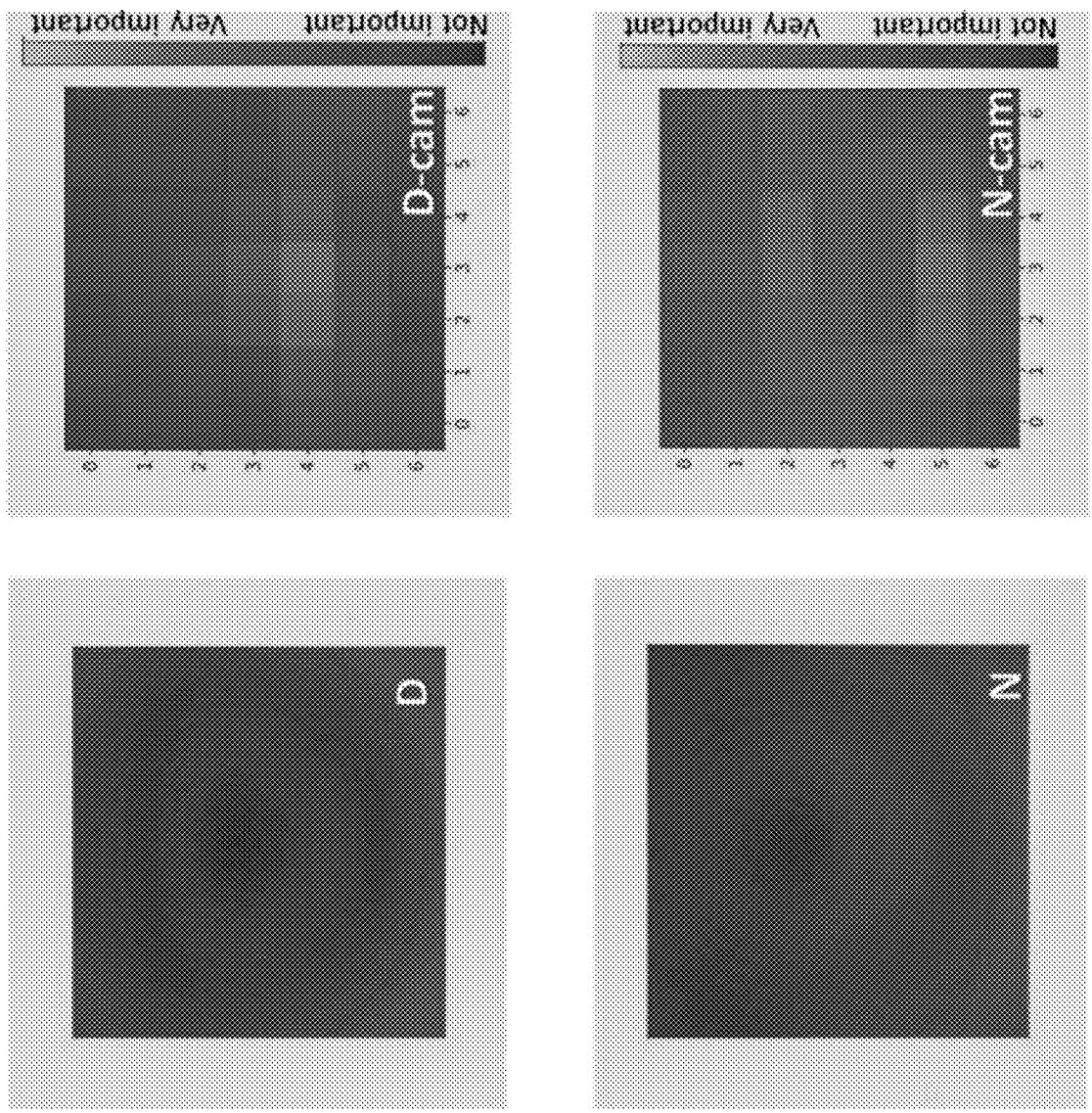
FIG. 19 is a diagram for explaining the first test example.

FIG. 19 shows averaged images corresponding to averaged CAMs based on a re-test subset. Misclassified frames and CAMs corresponding thereto have been excluded.

Sixth Example

In an embodiment, the predetermined ophthalmic disease is keratoconus, and the characteristics of the ocular surface are a change in a corneal shape of the subject's eye that occurs as a reaction to external stress with respect to the subject's eye such as emitting air pulses.

Hereinafter, test examples with respect to diagnosis support of keratoconus will be shown.

Second Test Example: Diagnosis Support of Keratoconus

Keratoconus is a progressive ophthalmic disease characterized by thinning and forward protrusion of the cornea and, given that onset and progression differ from each other, early detection of the ophthalmic disease is difficult. Progress of the disease causes impaired visual performance such as myopia and astigmatism and, in some cases, a corneal transplant is required.

While a human diagnoses keratoconus using an examination with a slit lamp microscopy or corneal shape analysis (corneal topography), early detection with the former is difficult since making a definite judgment requires the cornea to protrude to a certain degree while the latter carries a risk of intervention of bias due to a reliance on subjective observation of corneal topography.

The present inventors carried out tests involving supporting diagnoses of keratoconus using a moving image of an ocular surface of a subject's eye. Methods and results were as described below.

1. Method
1-1. Subject's Eye

Two subjects' eyes data sets were prepared. As the first subjects' eyes data set, a total of 447 eyes (of which 131 were normal eyes and 101 were diseased eyes) of 232 patients having visited ophthalmic medical institutions in Brazil were considered subjects' eyes. As the second subjects' eyes data set, a total of 502 eyes (of which 259 were normal eyes and 243 were diseased eyes) of 502 patients having visited ophthalmic medical institutions in Iran were considered subjects' eyes.

1-2. Preliminarily Classification of Diseased Eyes and Normal Eyes

All subjects' eyes were classified into keratoconus eyes and normal eyes by two independent corneal specialists based on clinical indexes such as slit-lamp evidence of central protrusion of the corneal with Fleischer ring or Vogt striae, presence of an irregular cornea based on distorted keratometry mires or distortion of retinoscopic red reflex.

1-3. Photography of Moving Image

Air pulses were emitted towards the subject's eye using Corvis ST (Oculus Optikgerate GmbH) and a moving image of a change in the shape of the cornea that occurs as a reaction to the air pulses was photographed. The moving image was photographed at a speed of 4300 frames/second. When the air pulse reaches its maximum the cornea is at its highest concavity. When the air pulse is switched off, the cornea returned to its original shape passing through a second applanation state. When the cornea finally returns to its natural convex shape, the photography of the moving image was ended. During the photography, scattered light from the cornea was recorded using blue LED light (470 nm, Ultraviolet free).

1-4. Pre-Processing of Moving Image
1-4-1. Measurement of Interpixel Distance Using Skeletal Image of Cornea Respective mask processing and binarization processing were performed and the corneal image was thinned so as to retain pixels indicating a morphological skeleton of the cornea. The obtained skeletal image of the cornea was compared to each reference segment to calculate a deviation between pixels.

Figure 20:
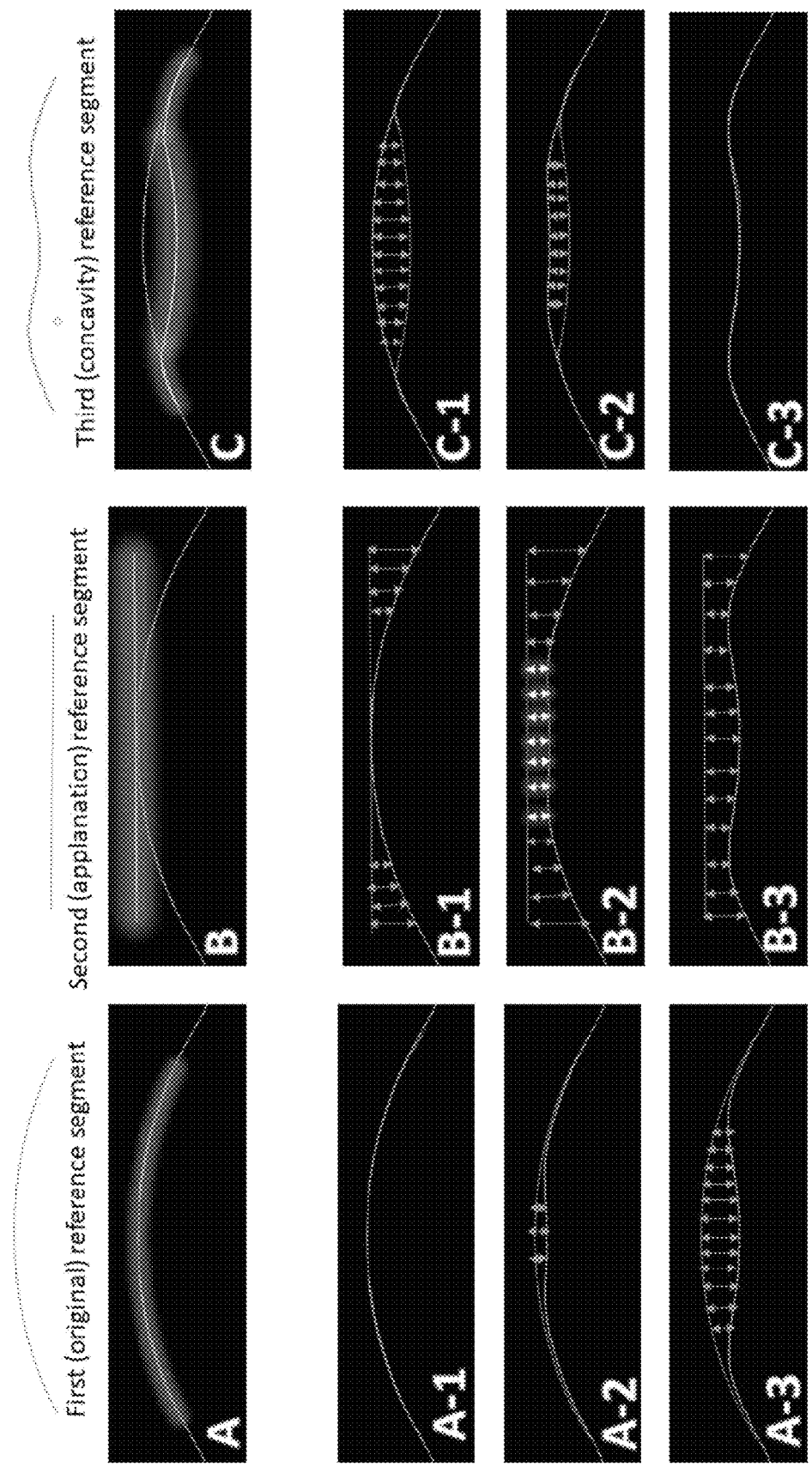
FIG. 20 is a diagram for explaining a second test example.

FIG. 20 is a flow chart of a calculation of a distance between respective pixels of a skeletal image of the cornea and a reference segment. Processing was repeated for each skeletal image until 140 numerical arrays representing 140 moving image frames were obtained. As shown in FIG. 20, three reference segments were provided including a first reference segment (original reference segment) denoted by A, a second reference segment (applanation reference segment) denoted by B, and a third reference segment (reference segment at maximum concavity) denoted by C. 1 to 3 represent states of the skeletal images, in which A-1, B-1, and C-1 denote corneal skeletal images at original positions, A-2, B-2, and C-2 denote corneal skeletal images during applanation, and A-3, B-3, and C-3 denote corneal skeletal images at maximum concavity.

1-4-2. Visualization of Measured Interpixel Distance

Numerical arrays calculated from the three reference segments were converted into heatmaps and the measured interpixel distances were visualized.

Figure 21:
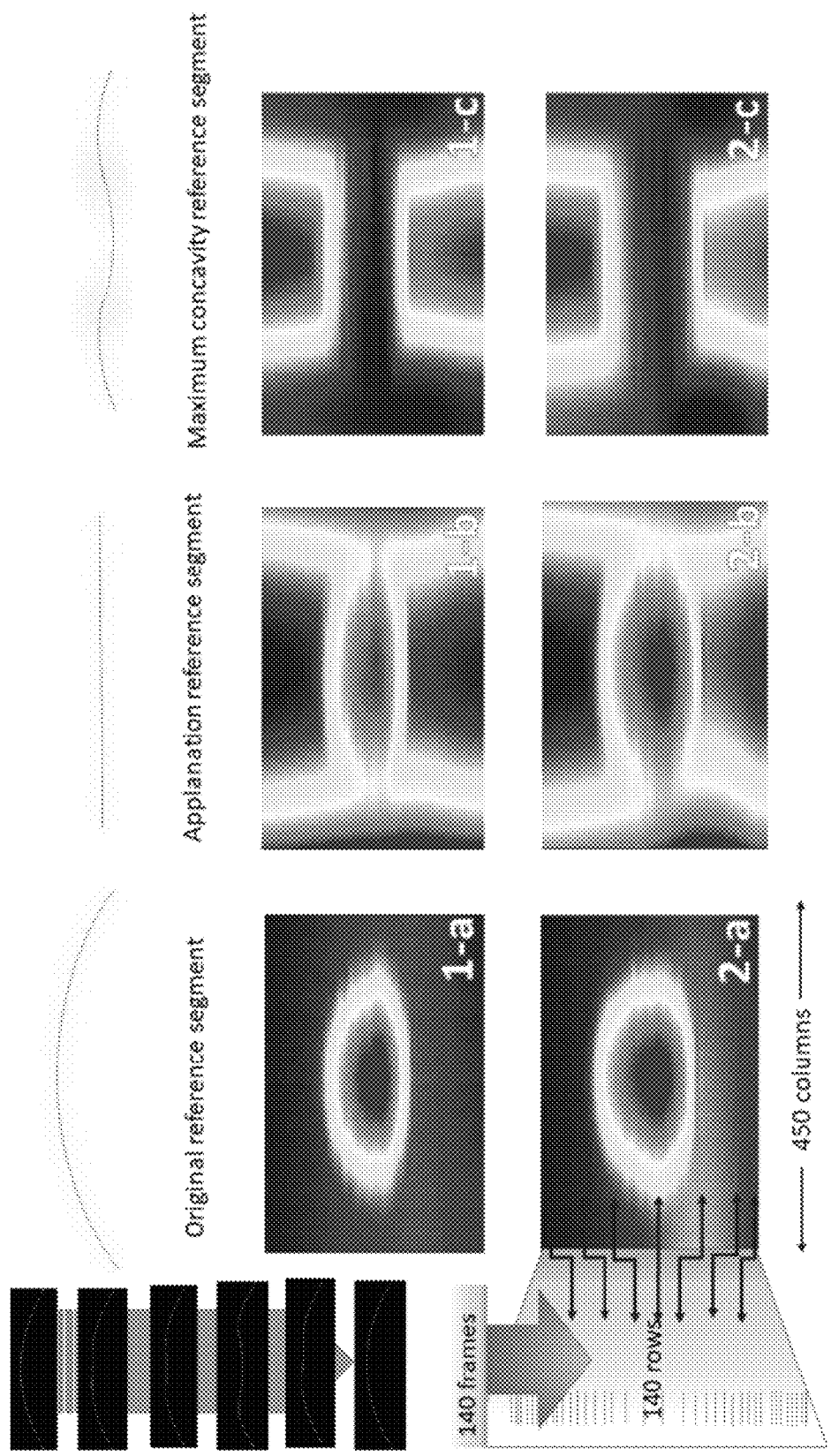
FIG. 21 is a diagram for explaining the second test example.

FIG. 21 shows visualized images of interpixel distances. With respect to a total of 140 frames, each visualized image has 140 numerical arrays in a vertical direction and 450 columns in a lateral direction.

1-4-3. Generation of Pseudoimage from Visualized Image

A pseudoimage was generated by concatenating numerical arrays corresponding to three visualized images obtained from a same moving image.

Figure 22:
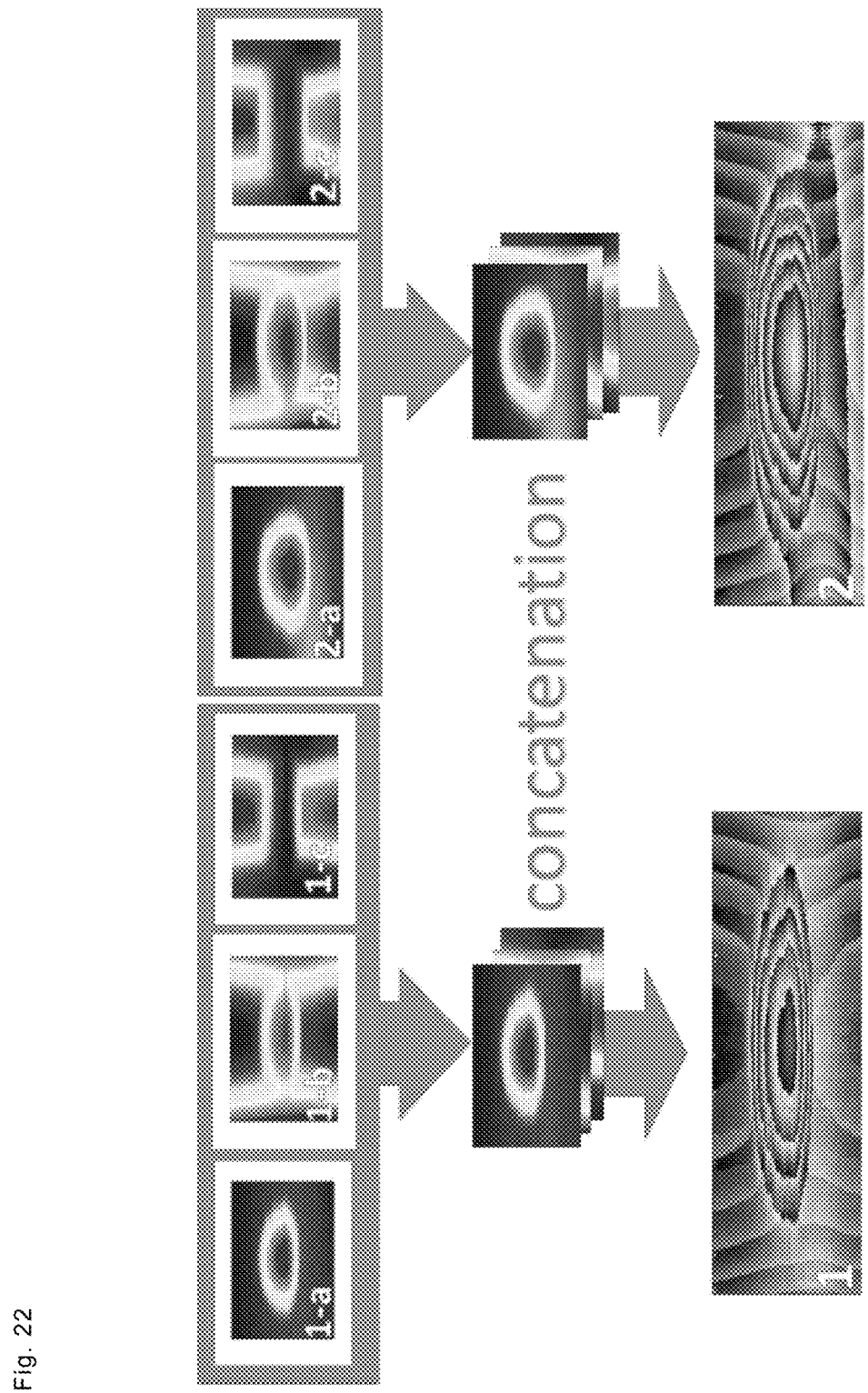
FIG. 22 is a diagram for explaining the second test example.

FIG. 22 shows a conceptual diagram of the generation of pseudoimages. 1-a, 1-b, and 1-c denote pseudoimages generated by concatenating, based on color channels, three numerical arrays obtained from a first video, and 2-a, 2-b, and 2-c denote pseudoimages generated by concatenating, based on color channels, three numerical arrays obtained from a second video.

1-5. Construction of Mathematical Model
1-5-1. Construction of Mathematical Model Transfer learning based on a CNN architecture (DenseNet121) trained in advance was adopted. The architecture is based on the ImageNet dataset containing 140 million images across 1000 categories and features high accuracy. Each frame was individually analyzed using the architecture trained in advance.

Figure 23:
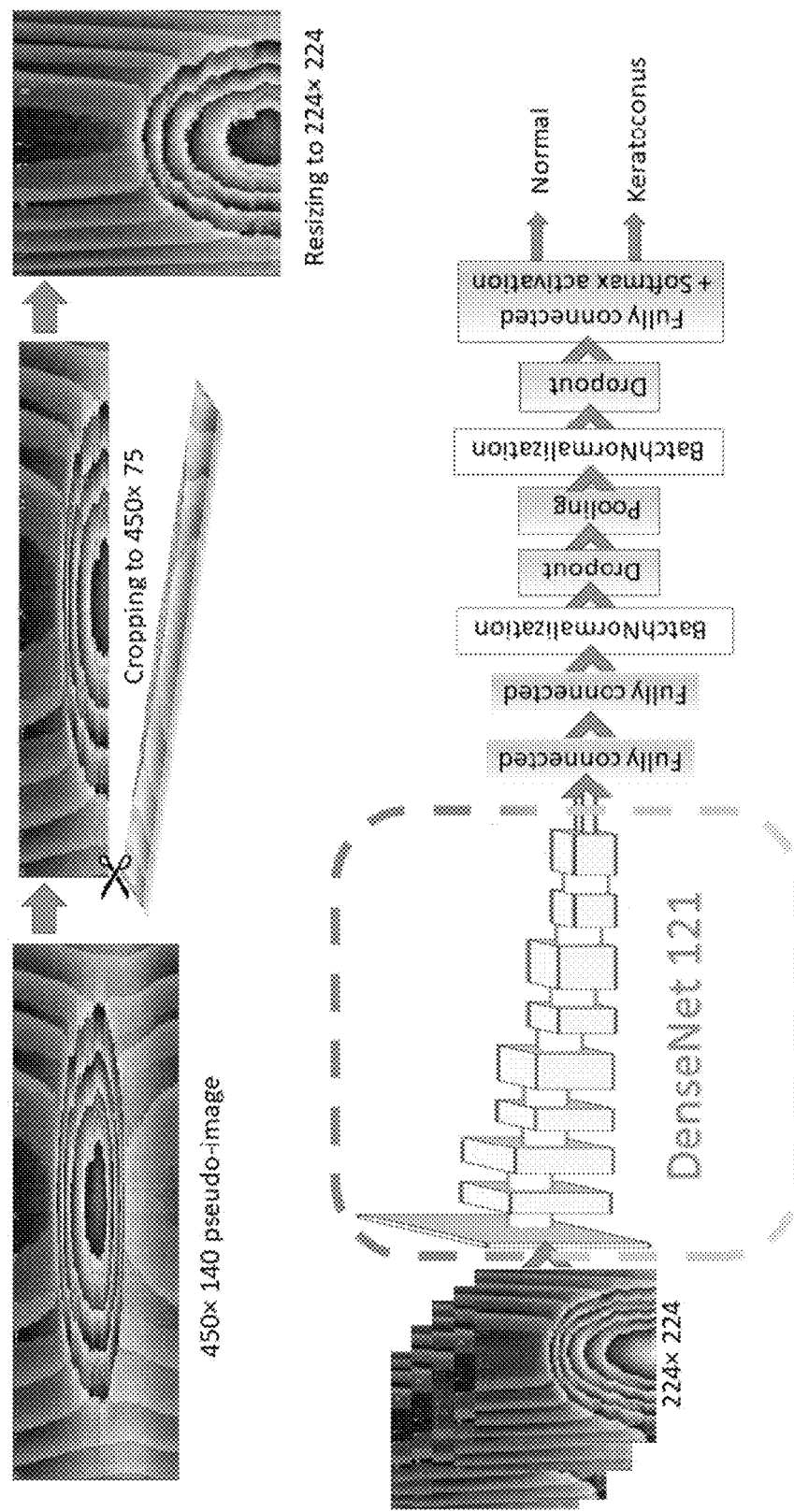
FIG. 23 is a diagram for explaining the second test example.

FIG. 23 shows the architecture of the constructed model and a conceptual diagram of inputting images into the model. The prepared pseudoimages were cropped, resized, and then input into the constructed model.

2. Result

Figure 24B:
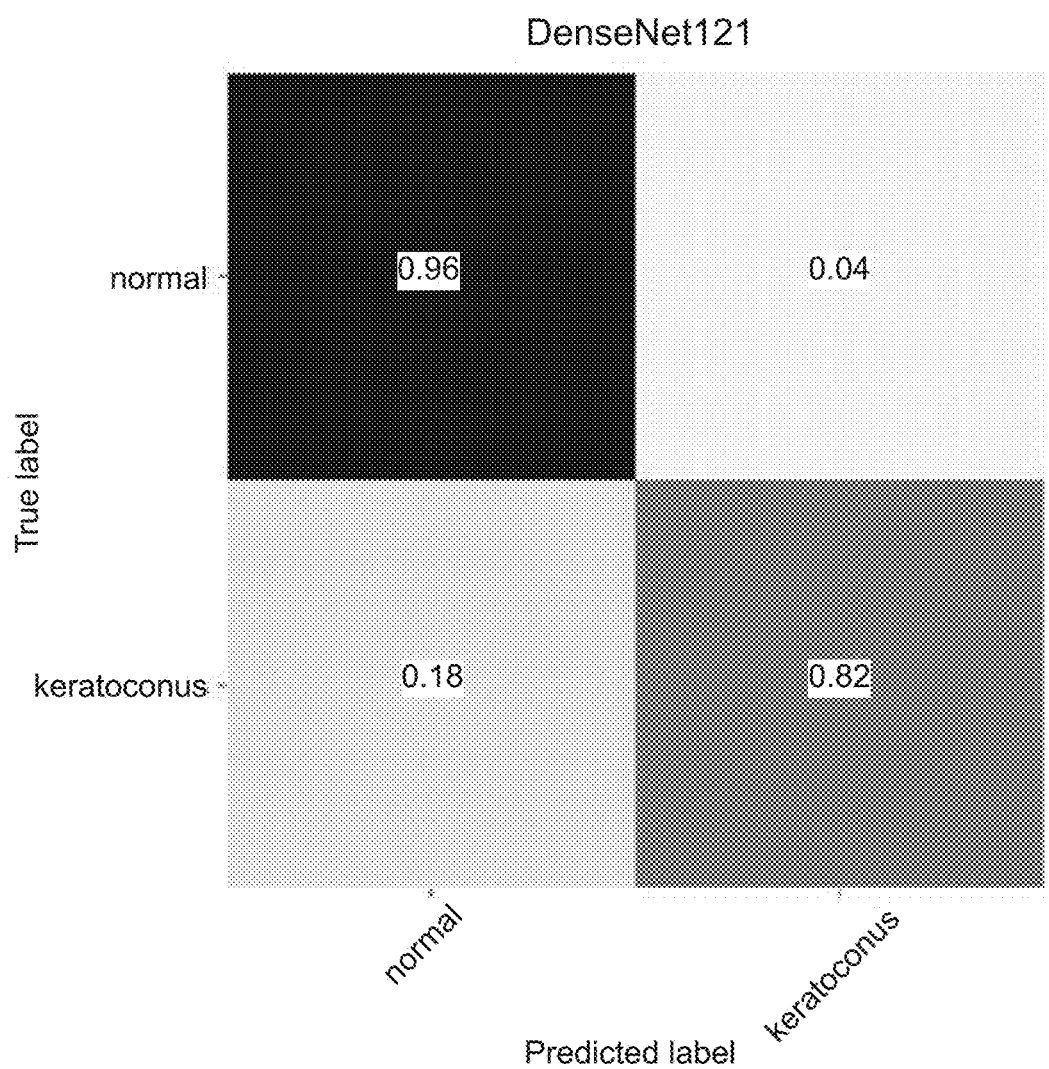

FIGS. 24A and 24B show an accuracy (top left diagram), a loss function (bottom left diagram), and a confusion matrix (right diagram) with respect to the number of epochs (number of iterations) of training of the constructed model.

Figure 25:
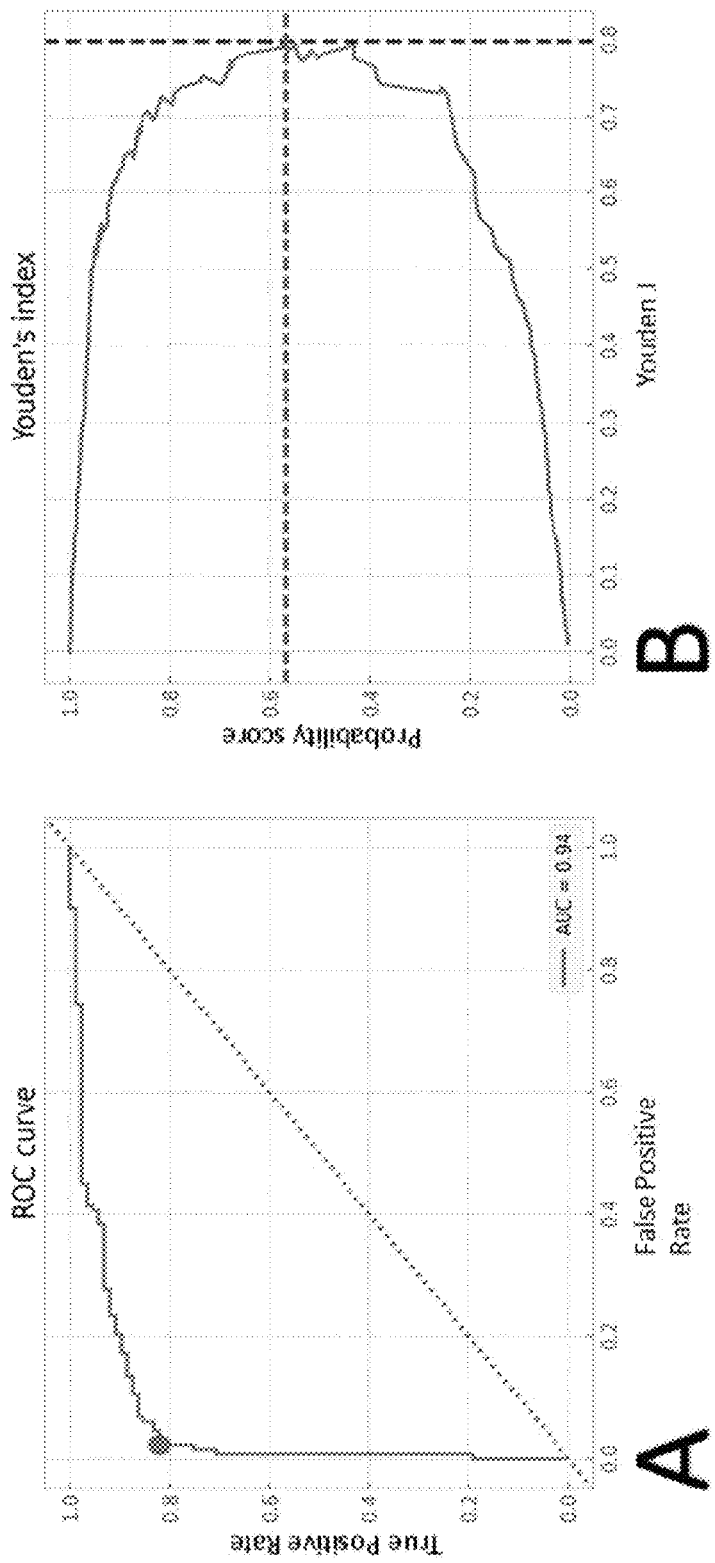
FIG. 25 is a diagram for explaining the second test example.

FIG. 25 shows an ROC curve and Youden's index.

FIG. 26 shows receiver operating characteristic (ROC) curves of various classifiers for a binary classification task into keratoconus and normal in a data set to be externally validated.

Figure 27A:
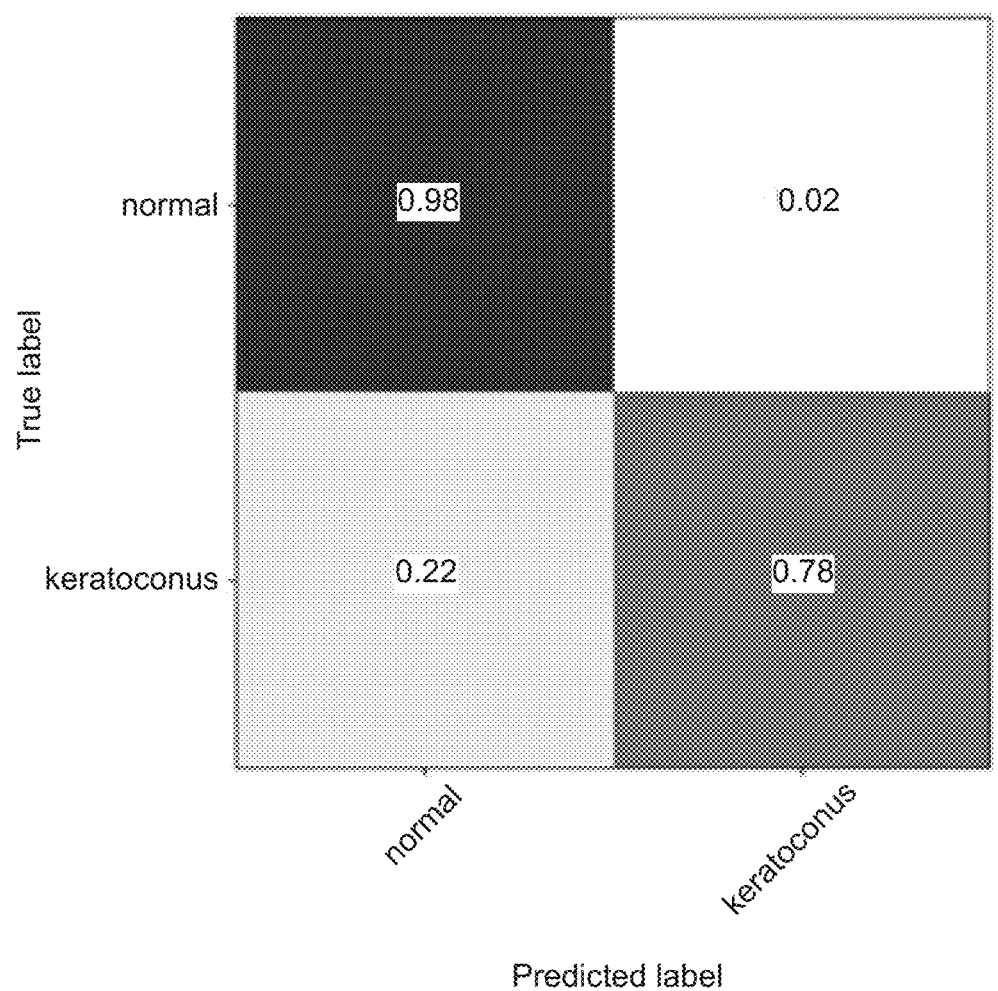

FIGS. 27A and 27B show detection error trade-off curves and confusion matrices of the various classifiers for a binary classification task into keratoconus and normal in a data set to be externally validated.

Figure 28A:
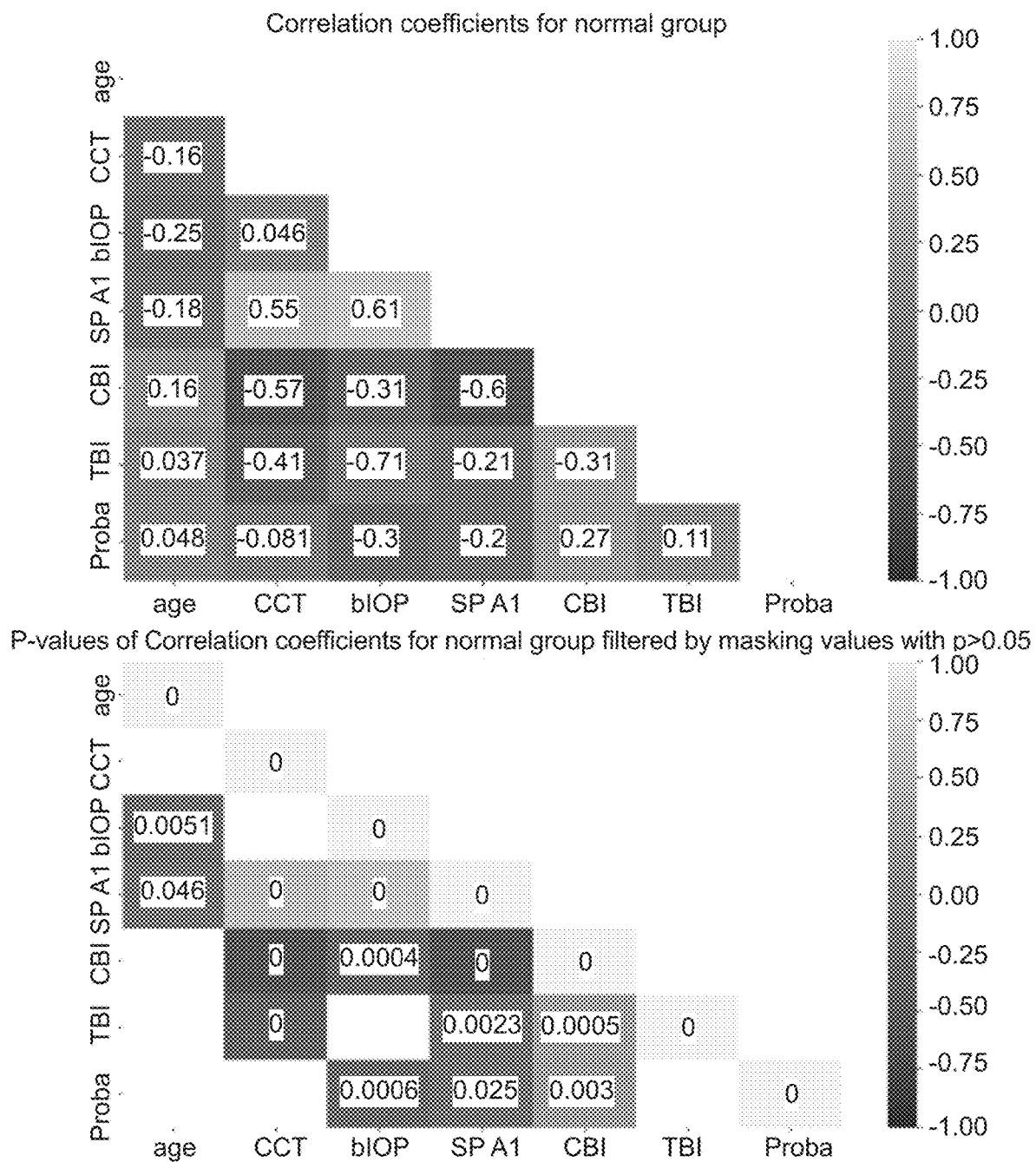

FIGS. 28A and 28B show Spearman rank-correlation coefficient between respective parameters and heat maps thereof, and display of only P values less than 0.05 in the normal group and the keratoconus group.

FIG. 29 is a CAM activation map related to the classification of normal eyes by the constructed model.

FIG. 30 is a CAM activation map related to the classification of diseased eyes by the constructed model.

Third Test Example: Diagnosis Support of Keratoconus

The present inventors carried out tests involving supporting diagnoses of keratoconus using a moving image of an ocular surface of a subject's eye. Methods and results were as described below.

1. Method
1-1. Subject's Eye

Two subjects' eyes data sets were prepared. As the first subjects' eyes data set, a total of 447 eyes of 224 patients having visited ophthalmic medical institutions in Iran were considered subjects' eyes. As the second subjects' eyes data set, a total of 219 eyes of 110 patients having visited ophthalmic medical institutions in Brazil were considered subjects' eyes.

1-2. Preliminarily Classification of Diseased Eyes and Normal Eyes

A preliminarily classification of the subjects' eyes into diseased eyes and normal eyes was performed in a similar manner to the second test example.

1-3. Photography of Moving Image

Moving images of the subjects' eyes were photographed in a similar manner to the second test example.

1-4. Pre-Processing of Moving Image

The toral duration of each moving image was about 10 seconds, and a resolution of each frame was 576×224, and a RCG (root clock generator) moving image coding/decoding format of 30 frames/second. The moving images were converted into AVI codec (to enable frames to be accessed from the Matlab platform), the resolution of the frames was adjusted, and the frames were trimmed so as to correspond to deep learning models.

FIG. 31 shows images obtained by pre-processing from a moving image of a subject's eye. After mask processing using a center trimming mask, processing corresponding to each frame was performed.

Figure 32:
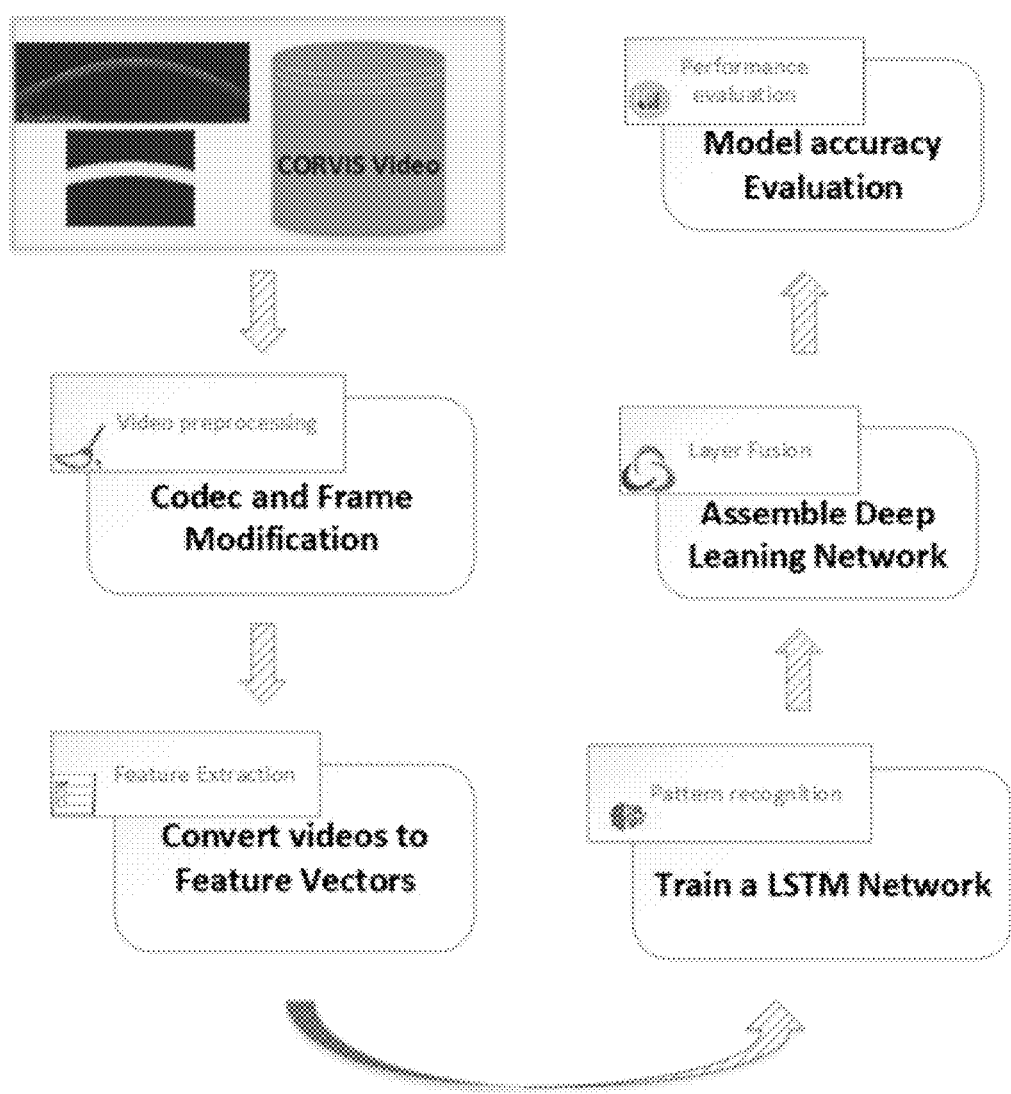
FIG. 32 is a diagram for explaining the third test example.

In addition, FIG. 32 is a flow chart showing an overview of the present test.

1-5. Analysis of Corneal Moving Image (Characteristic Extraction)

The moving images of the subjects' eyes were converted into a set of feature vector sequences using GoogleNet convolutional neural network (CNN) architecture trained in advance. The architecture is based on the ImageNet dataset containing 14 million images of 1000 categories and features high accuracy.

1-6. Training of Long Short-Term Memory (LSTM)

Since moving images that record a change in the shape of the cornea that occurs as a reaction to the air pulses contain temporal characteristics, an LSTM model that utilizes a temporal property of the characteristics for detecting keratoconus was developed. The LSTM model includes an input layer in a form of a vector format, a bi-directional LSTM (BiLSTM) layer with 2000 hidden units, a dropout layer, a fully connected layer with an output size of 2, a Softmax layer, and a classification layer. About 90% of the data was used for training the LSTM model and about 10% of the data was used for model validation.

(Overall Framework)

Figure 33:
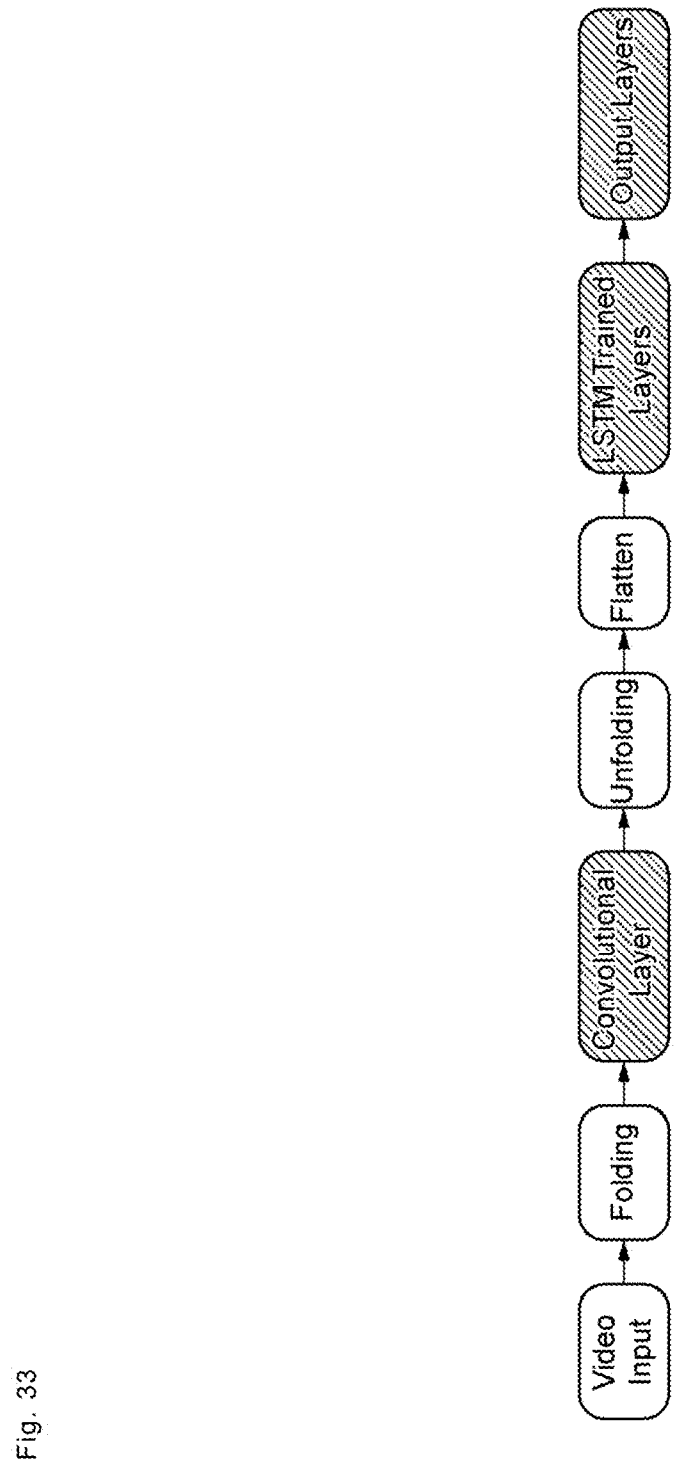
FIG. 33 is a diagram for explaining the third test example.

FIG. 33 is a flow chart showing an overview of steps in chronological order of the approach of the present test. Each moving image was initially converted into 139 sequences, each with 1024 characteristics (extracting characteristics). After the sequences are unfolded and flattened (converted to a vector with 139×1024 elements), the sequences were input into the LSTM training layer to utilize the temporal property of the moving image for keratoconus detection. The approach of the present test has such a framework, and an advantage of the approach is that the constructed model can classify directly input moving images.

(Scenario Design)

In the present test, two different scenarios were designed. In a first scenario, among a total of 666 moving images obtained from 666 eyes by combining all data sets collected in different regions, 85% was selected for development, 10% for fine tuning, and 5% for testing and the performance of the model was assessed. In a second scenario, in order to secure generalizability, a model was developed based on the data set (data set for development) collected in Brazil and the model was validated/re-tested based on the data set (data set for independent validation) collected in Iran.

(Comparison of Performance Between Human Specialists and Constructed Model)

30 moving images of normal eyes and 30 moving images of keratoconus eyes were randomly selected from the second subjects' eyes data set (the data set for independent validation) and three keratoconus specialists were asked to diagnose keratoconus solely based on the moving images. Outputs of the model and responses by the human specialists were compared with each other based on the AUC index.

2. Result

Figure 34:
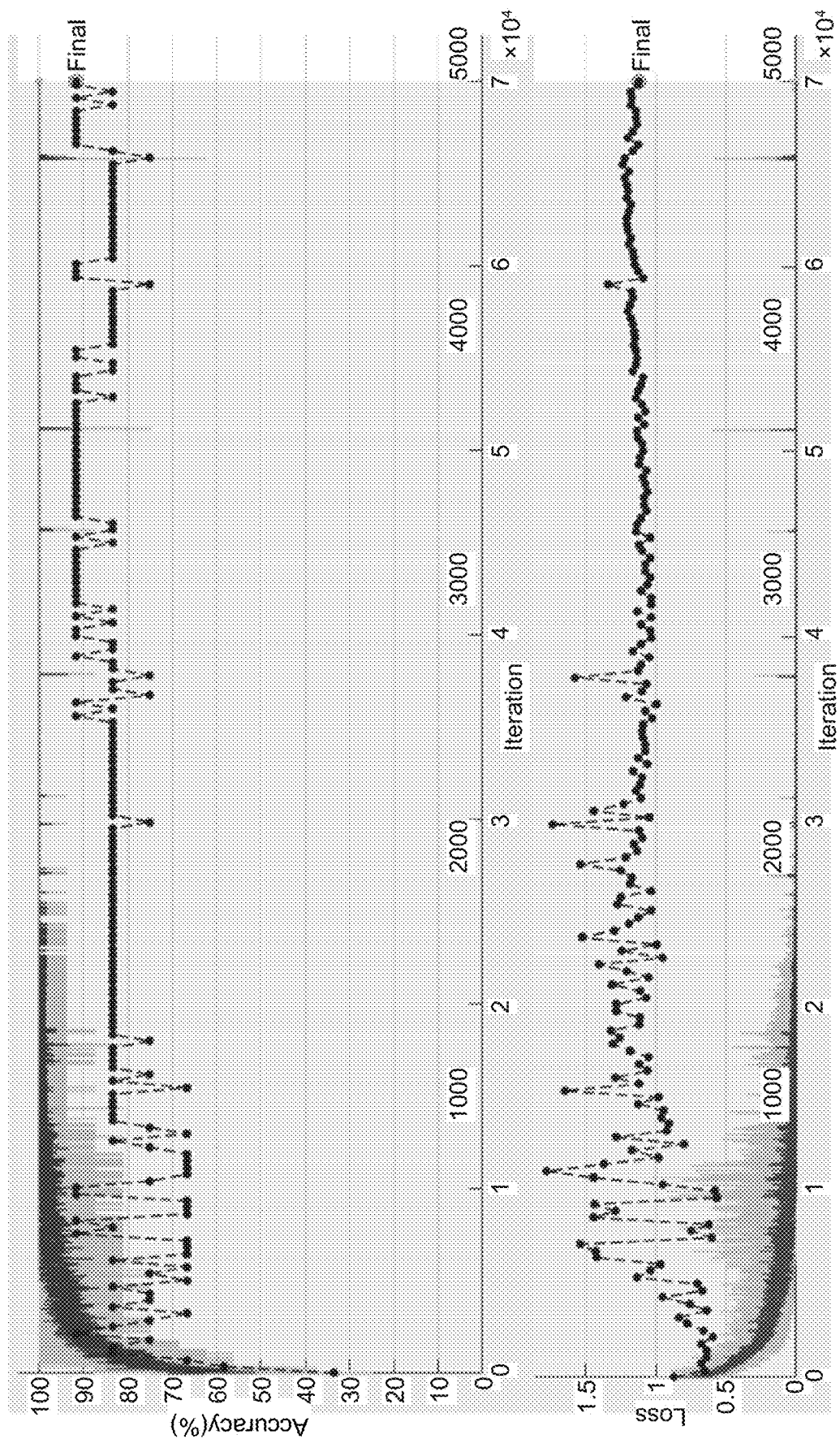
FIG. 34 is a diagram for explaining the third test example.

FIG. 34 shows an accuracy (upper half) and a loss function (lower half) with respect to the number of epochs (number of iterations) of the LSTM training. The LSTM model achieved an accuracy of approximately 90% or higher when the number of epochs exceeded about 3000.

Figure 35:
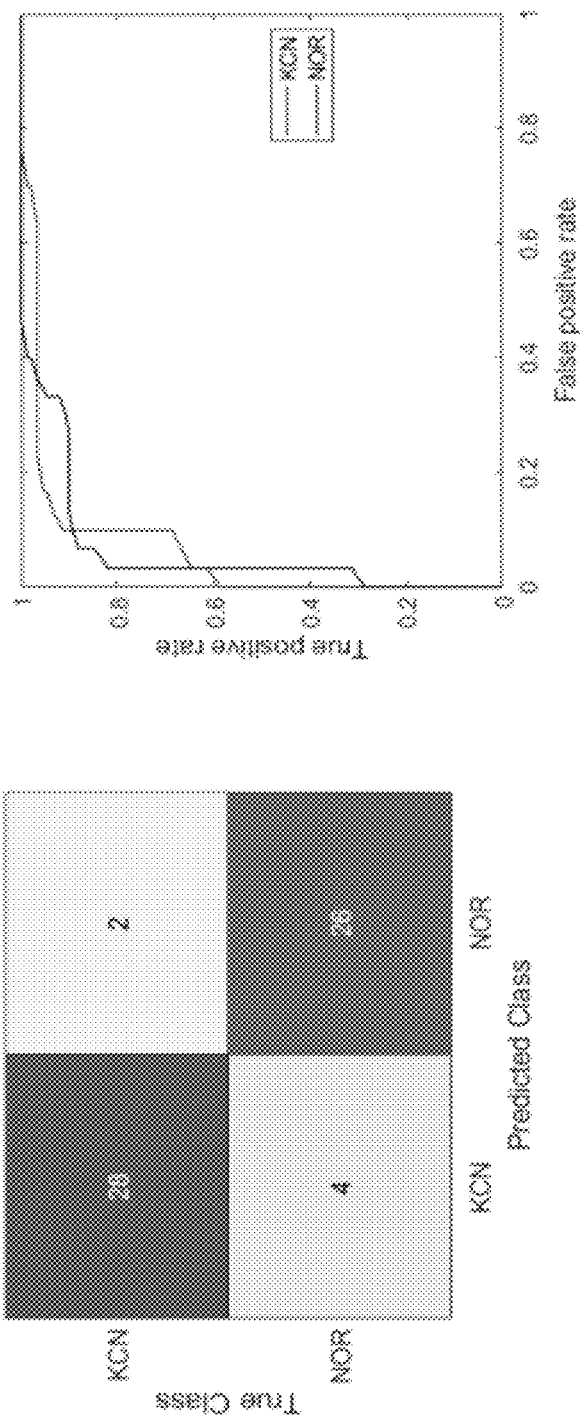
FIG. 35 is a diagram for explaining the third test example.

The model based on the first scenario achieved an AUC of 0.94 and an accuracy of 90%. FIG. 35 shows an ROC curve and a confusion matrix.

Figure 36:
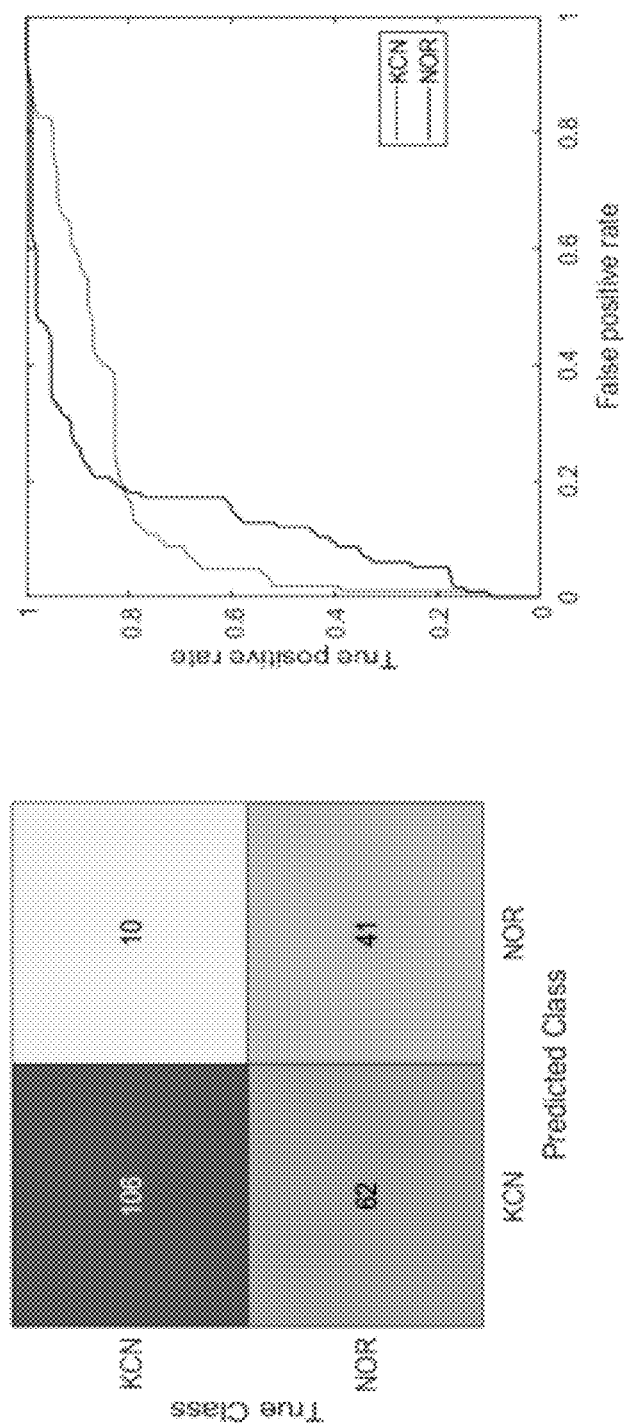
FIG. 36 is a diagram for explaining the third test example.

The model based on the second scenario achieved an AUC of 0.86 and an accuracy of 678. FIG. 36 shows an ROC curve and a confusion matrix.

INDUSTRIAL APPLICABILITY

Since the present invention enables the possibility of being affected by an ophthalmic disease to be discovered by a simple operation of photographing and inputting a moving image of an eyeball without the need for complex machines and complicated examinations, the present invention can be expected to provide an eye checkup service at regular intervals in a relatively inexpensive manner or used as a self-diagnostic tool by a subject and, accordingly, contribute toward the development of ophthalmic practice and extending the human health span which is an urgent global issue.

In addition, since the possibility of being affected by an ophthalmic disease can be discovered without the intervention of subjective opinions or bias of an observer with respect to an eyeball or a moving image of the eyeball, the diagnosis support information according to the present embodiment is expected to contribute as a second opinion that can set a user's mind at ease.

Furthermore, since the possibility of being affected by an ophthalmic disease can be discovered by an operation of photographing and inputting a moving image of an eyeball without the need for complicated examinations or findings, even a medical institution without a highly specialized and knowledgeable physician or a physician without sufficient experience can utilize the diagnosis support information according to the present embodiment and provide efficient diagnoses in a simple manner.

Moreover, the diagnosis support information according to the present embodiment is expected to be analyzed by an AI as big data and to improve diagnostic accuracy of ophthalmologists.

REFERENCE SIGNS LIST 1 ophthalmic system
10 ophthalmic apparatus
20 imaging apparatus
N communication network
71 processor
72 communication IF
73 storage apparatus
74 input apparatus
75 output apparatus
110 storage unit
120 acquiring unit
130 analyzing unit
140 assessing unit
150 diagnosis support information generating unit
160 output control unit
170 model constructing unit

What is claimed is:

1. An ophthalmic system, comprising:
an imaging apparatus; and
a processor in communication with the imaging apparatus, the processor is configured to:
acquire a moving image of a subject's eye captured by the imaging apparatus that opposes a subject;
specify an analysis object region in the subject's eye based on the moving image and analyze a spatial and/or temporal distribution of information related to characteristics of a surface of the subject's eye in the analysis object region;
assess a possibility of the subject's eye being affected by a predetermined ophthalmic disease based on the distribution of information related to the characteristics and which generates a classification result of classifying the subject's eye into a predetermined classification group related to the affection of the ophthalmic disease in accordance with a degree of the possibility;
generate diagnosis support information that supports a diagnosis of the ophthalmic disease in the subject's eye based on the classification result; and
control output of the diagnosis support information,
wherein the processor assesses the possibility of the subject's eye being affected by the predetermined ophthalmic disease using a learned mathematical model having been trained based on a moving image of a reference eye, and the moving image of a reference eye used for training of the learned mathematical model is a moving image which has been classified with respect to the ophthalmic disease using an index related to a subjective report submitted as a response by a patient with the reference eye and/or an index of a clinical parameter submitted as a response by a physician and which has been labeled with a result of the classification, and
wherein the learned mathematical model receives the moving image of the subject's eye, converts the moving image of the subject's eye to a set of feature vector sequences, input the set of feature vector sequences into a long short-term memory (LSTM) training layer that utilizes a temporal property, and based on an output of the LSTM training layer, assesses the possibility of the subject's eye being affected by the predetermined ophthalmic disease and classifies the subject's eye into the predetermined classification group related to the affection of the ophthalmic disease in accordance with the degree of the possibility.

2. The ophthalmic system according to claim 1, wherein the ophthalmic disease is dry eye, and
the characteristics of the surface of the subject's eye are an interference fringe before and after eyeblink and/or a tear meniscus height in the subject's eye.

3. The ophthalmic system according to claim 1, wherein the ophthalmic disease is keratoconus, and
the characteristics of the surface of the subject's eye are a change in a corneal shape of the subject's eye that occurs as a reaction to external stress with respect to the subject's eye.

4. The ophthalmic system according to claim 1, wherein the predetermined classification group is a classification group in accordance with the degree of the possibility of the subject's eye being affected by the ophthalmic disease and includes a group of which the possibility is equal to or higher than a first reference value and a group of which the possibility is equal to or lower than a second reference value.

5. The ophthalmic system according to claim 1, wherein the processor is further configured to:
analyze a change over time of the distribution of information related to the characteristics by sequentially processing each of one or more frames constituting the moving image, and assess the possibility that the subject's eye is affected by the ophthalmic disease based on at least one or more of the analysis object region, the distribution of information related to the characteristics, and the change over time of the distribution and generates a classification result of classifying the subject's eye into a predetermined classification group related to affection by the ophthalmic disease in accordance with the degree of the possibility.

6. The ophthalmic system according to claim 1, wherein the processor is further configured to:
assess a change over time of the distribution of information related to the characteristics by comparing results of processing one or more frames constituting the moving image, and
assess the possibility that the subject's eye is affected by the ophthalmic disease based on at least one or more of the analysis object region, the distribution of information related to the characteristics, and the change over time of the distribution and generates a classification result of classifying the subject's eye into a predetermined classification group related to affection by the ophthalmic disease in accordance with the degree of the possibility.

7. The ophthalmic system according to claim 1, wherein the processor is further configured to:
calculate a level of importance of one or more divisions obtained by dividing the analysis object region in a predetermined ratio based on the distribution of information related to the characteristics in the analysis object region and analyzes a spatial and/or temporal distribution of divisions of which the level of importance is equal to or higher than a predetermined threshold, and
assess the possibility that the subject's eye is affected by the ophthalmic disease based on at least one or more of the analysis object region, the distribution of information related to the characteristics, and the distribution of the divisions and generates a classification result of classifying the subject's eye into a predetermined classification group related to affection by the ophthalmic disease in accordance with a degree of the possibility.

8. The ophthalmic system according to claim 1, wherein the predetermined classification group is a classification group in accordance with the degree of the possibility of the subject's eye being affected by the ophthalmic disease and includes a group of which the possibility is equal to or higher than a first reference value and a group of which the possibility is equal to or higher than a second reference value, and
the diagnosis support information includes a classification result of classifying the subject's eye into the classification group and a still image and/or one or more moving images generated based on one or more frames constituting a basis for the generation of the classification result.

9. An information processing method comprising by one or a plurality of computers executing:
acquiring a moving image of a subject's eye captured by an imaging apparatus that opposes a subject;
specifying an analysis object region in the subject's eye based on the moving image and analyzing a spatial and/or temporal distribution of information related to characteristics of a surface of the subject's eye in the analysis object region;
assessing a possibility of the subject's eye being affected by a predetermined ophthalmic disease based on the distribution of information related to the characteristics and generating a classification result of classifying the subject's eye into a predetermined classification group related to the affection of the ophthalmic disease in accordance with a degree of the possibility;
generating diagnosis support information that supports a diagnosis of the ophthalmic disease in the subject's eye based on the classification result; and
controlling output of the diagnosis support information,
wherein the assessing the possibility of the subject's eye being affected by the predetermined ophthalmic disease is performed using a learned mathematical model having been trained based on a moving image of a reference eye, and the moving image of a reference eye used for training of the learned mathematical model is a moving image which has been classified with respect to the ophthalmic disease using an index related to a subjective report submitted as a response by a patient with the reference eye and/or an index of a clinical parameter submitted as a response by a physician and which has been labeled with a result of the classification, and
wherein the learned mathematical model receives the moving image of the subject's eye, converts the moving image of the subject's eye to a set of feature vector sequences, input the set of feature vector sequences into a long short-term memory (LSTM) training layer that utilizes a temporal property, and based on an output of the LSTM training layer, assesses the possibility of the subject's eye being affected by the predetermined ophthalmic disease and classifies the subject's eye into the predetermined classification group related to the affection of the ophthalmic disease in accordance with the degree of the possibility.

10. A program causing one or a plurality of computers to execute:
acquiring a moving image of a subject's eye captured by an imaging apparatus that opposes a subject;
specifying an analysis object region in the subject's eye based on the moving image and analyzing a spatial and/or temporal distribution of information related to characteristics of a surface of the subject's eye in the analysis object region;
assessing a possibility of the subject's eye being affected by a predetermined ophthalmic disease based on the distribution of information related to the characteristics and generating a classification result of classifying the subject's eye into a predetermined classification group related to the affection of the ophthalmic disease in accordance with a degree of the possibility;
generating diagnosis support information that supports a diagnosis of the ophthalmic disease in the subject's eye based on the classification result; and
controlling output of the diagnosis support information,
wherein the assessing the possibility of the subject's eye being affected by the predetermined ophthalmic disease is performed using a learned mathematical model having been trained based on a moving image of a reference eye, and the moving image of a reference eye used for training of the learned mathematical model is a moving image which has been classified with respect to the ophthalmic disease using an index related to a subjective report submitted as a response by a patient with the reference eye and/or an index of a clinical parameter submitted as a response by a physician and which has been labeled with a result of the classification, and
wherein the learned mathematical model receives the moving image of the subject's eye, converts the moving image of the subject's eye to a set of feature vector sequences, input the set of feature vector sequences into a long short-term memory (LSTM) training layer that utilizes a temporal property, and based on an output of the LSTM training layer, assesses the possibility of the subject's eye being affected by the predetermined ophthalmic disease and classifies the subject's eye into the predetermined classification group related to the affection of the ophthalmic disease in accordance with the degree of the possibility.

* * * * *